US012574142B2

(12) United States Patent
Zhu et al.

(10) Patent No.: US 12,574,142 B2
(45) Date of Patent: Mar. 10, 2026

(54) ENCODING METHOD AND APPARATUS

(71) Applicant: HUAWEI TECHNOLOGIES CO., LTD., Shenzhen (CN)

(72) Inventors: Huiying Zhu, Shanghai (CN); Pengpeng Dong, Shanghai (CN); Zhiyuan Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/077,061

(22) Filed: Dec. 7, 2022

(65) Prior Publication Data

US 2023/0103108 A1     Mar. 30, 2023

Related U.S. Application Data

(63) Continuation of application No. PCT/CN2021/092560, filed on May 10, 2021.

(30) Foreign Application Priority Data

Jun. 8, 2020     (CN) .......................... 202010514547.9

(51) Int. Cl.
*H04L 1/00*          (2006.01)

(52) U.S. Cl.
CPC .................................. *H04L 1/0009* (2013.01)

(58) Field of Classification Search
None
See application file for complete search history.

(56) References Cited

U.S. PATENT DOCUMENTS 9,444,494 B2     9/2016  Summerson et al.
9,843,413 B2     12/2017  Badr et al.

| | | | | |
|---|---|---|---|---|
| 12,224,860 | B1* | 2/2025 | Shattil ................. | H04J 13/0003 |
| 2003/0229840 | A1 | 12/2003 | Pattavina | |
| 2018/0048426 | A1* | 2/2018 | Yang ..................... | H04L 1/0059 |
| 2018/0212764 | A1* | 7/2018 | Shi ..................... | H04N 21/6377 |
| 2020/0028624 | A1* | 1/2020 | Fouli ..................... | H04L 1/0061 |
| 2020/0382625 | A1* | 12/2020 | Medard ............ | H04W 28/0257 |
| 2022/0376707 | A1* | 11/2022 | Bioglio .............. | H03M 13/616 |
| 2024/0121026 | A1* | 4/2024 | Zhu ........................ | H04W 24/08 |
| 2024/0137149 | A1* | 4/2024 | Tan ................... | H03M 13/3761 |
| 2024/0235762 | A1* | 7/2024 | Tan ........................ | H04L 1/1812 |

FOREIGN PATENT DOCUMENTS

| | | |
|---|---|---|
| CN | 105515728 A | 4/2016 |
| CN | 108347295 A | 7/2018 |
| EP | 1040611 B1 | 6/2002 |

OTHER PUBLICATIONS

Intel Corporation, ATandT, Use cases and options for network coding in IAB. 3GPP TSG RAN Meeting #86, Sitges, Spain, Dec. 9-12, 2019, RP-192535, 8 pages.

* cited by examiner

*Primary Examiner* — Anh Vu H Ly

(74) *Attorney, Agent, or Firm* — Rimon PC

(57)          ABSTRACT

Embodiments of this application provide an encoding method and an apparatus for network encoding. A plurality of to-be-encoded data units are divided into a plurality of groups for separate encoding, and the quantity of to-be-encoded data units included in each group is less than the quantity of all to-be-encoded data units. According to the method, correlation of the encoded data is reduced, and a capability of the encoded data against channel fading and channel change is improved, to increase the receiving reliability of the encoded data.

20 Claims, 16 Drawing Sheets

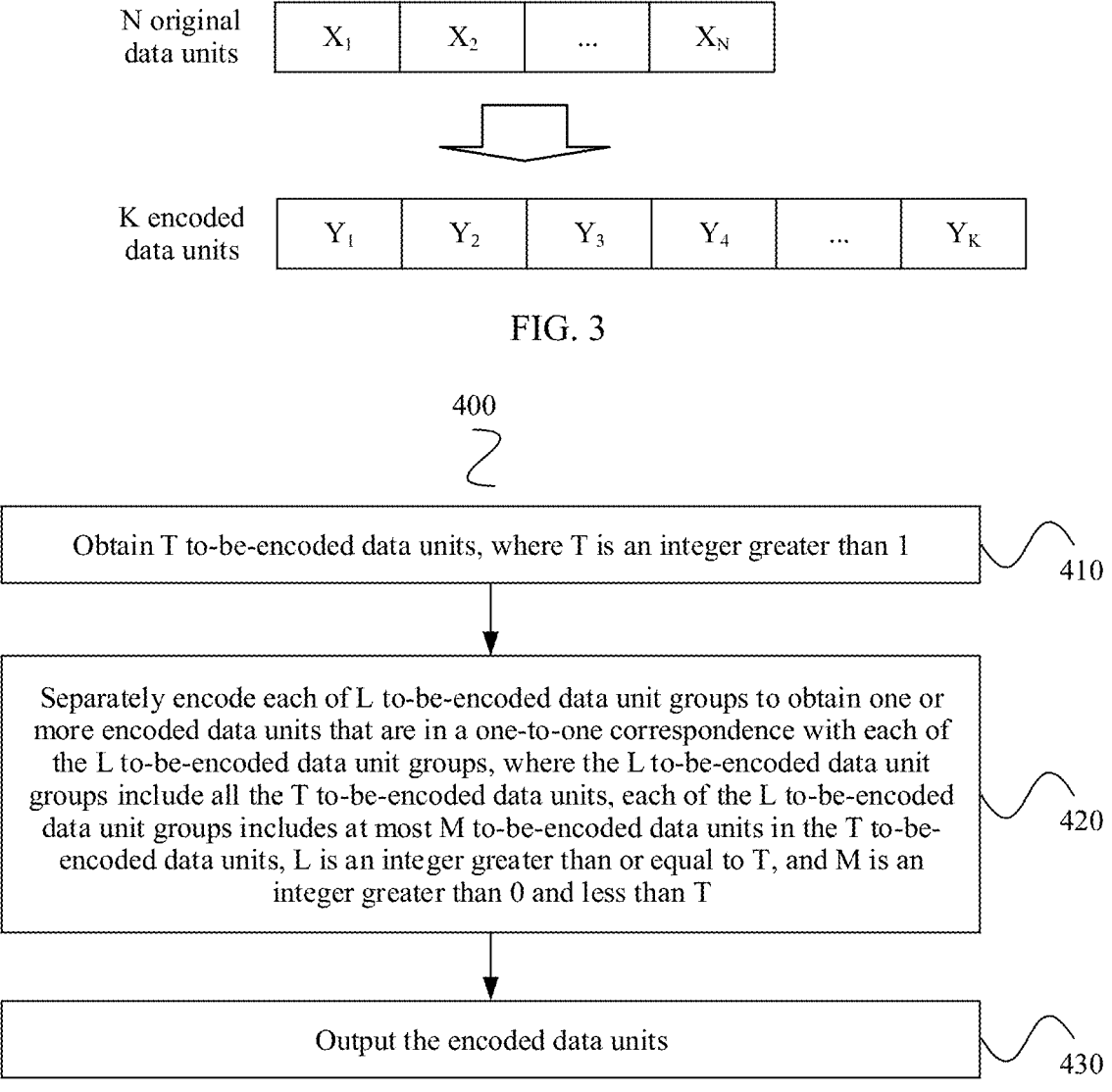

Obtain T to-be-encoded data units, where T is an integer greater than 1          410

Separately encode each of L to-be-encoded data unit groups to obtain one or more encoded data units that are in a one-to-one correspondence with each of the L to-be-encoded data unit groups, where the L to-be-encoded data unit groups include all the T to-be-encoded data units, each of the L to-be-encoded data unit groups includes at most M to-be-encoded data units in the T to-be-encoded data units, L is an integer greater than or equal to T, and M is an integer greater than 0 and less than T          420

Output the encoded data units          430

FIG. 4

ENCODING METHOD AND APPARATUS

CROSS-REFERENCE TO RELATED APPLICATIONS

This application is a continuation of International Application No. PCT/CN2021/092560, filed on May 10, 2021, which claims priority to Chinese Patent Application No. 202010514547.9, filed on Jun. 8, 2020. The disclosures of the aforementioned applications are hereby incorporated by reference in their entireties.

TECHNICAL FIELD

This application relates to the field of communication technologies, and in particular, to an encoding method and an apparatus.

BACKGROUND

In a random linear network coding (RLNC) technology, after encoding a plurality of original data units to obtain encoded data, a transmitting end processes the encoded data and sends the encoded data. However, in the RLNC technology, linearly correlated encoded data may be generated, affecting the receiving reliability of the encoded data. Therefore, how to reduce linear correlation of encoded data and improve the receiving reliability of encoded data becomes a problem that urgently needs to be resolved in the encoding technology.

SUMMARY

Embodiments of this application provide an encoding method and an apparatus.

According to a first aspect, an embodiment of this application provides an encoding method. The method may be performed by a terminal or a network device, or may be performed by a component (for example, a processor, a chip, or a chip system) of the terminal or the network device. The method includes: obtaining T to-be-encoded data units, where T is an integer greater than 1; separately encoding each of L to-be-encoded data unit groups to obtain one or more encoded data units that are in a one-to-one correspondence with each of the L to-be-encoded data unit groups, where the L to-be-encoded data unit groups include all the T to-be-encoded data units, each of the L to-be-encoded data unit groups includes at most M to-be-encoded data units in the T to-be-encoded data units, L is an integer greater than or equal to T, and M is an integer greater than 0 and less than T; and outputting the encoded data units. Optionally, L satisfies $T \leq L \leq T+M-1$. It may be understood that a specific encoding type is not limited in this application. For example, the encoding type may be block encoding, convolutional encoding, or random linear encoding, or the encoding type may be network encoding (for example, block network encoding, convolutional network encoding, or random linear network coding).

In the foregoing method, to-be-encoded data units are divided into a plurality of to-be-encoded data unit groups for separate encoding, and a quantity of to-be-encoded data units included in each to-be-encoded data unit group is less than the total number of to-be-encoded data units. In the method, the to-be-encoded data units are selectively encoded, so that correlation of encoded data can be reduced, and a capability of the encoded data against channel fading and a channel change can be improved, thereby increasing the receiving reliability of the encoded data and improve spectral efficiency.

It may be understood that there may be a plurality of different implementations for encoding the to-be-encoded data unit group. For example, a to-be-encoded data unit in a to-be-encoded data unit group may be encoded by using an encoding matrix, or a to-be-encoded data unit in a to-be-encoded data unit group may be encoded by using an encoding kernel. The encoding kernel may be understood as an encoding vector, and the encoding kernel may also be referred to as a convolution kernel, an encoding kernel vector, a coefficient vector, or the like. Optionally, the encoding kernel is included in the encoding matrix. For example, the encoding kernel may include all non-zero elements in one row or one column of the encoding matrix. M may be understood as a convolution depth, an encoding constraint degree, a constraint length, a convolution constraint length, a memory depth, an encoding depth, an encoding kernel size, an encoding kernel length, or an encoding kernel depth corresponding to encoding. T, L, and M may be collectively referred to as encoding parameters. Optionally, one or more of the foregoing encoding parameters may be predefined, or may be configured by the network device.

Optionally, each of the L to-be-encoded data unit groups does not simultaneously include the first to-be-encoded data unit and the last to-be-encoded data unit in the T to-be-encoded data units, or one or more of the L to-be-encoded data unit groups include the first to-be-encoded data unit and the last to-be-encoded data unit in the T to-be-encoded data units.

When each of the L to-be-encoded data unit groups does not simultaneously include the first to-be-encoded data unit and the last to-be-encoded data unit in the T to-be-encoded data units, encoding complexity can be reduced, and storage overheads in an encoding process can be reduced.

When the one or more of the L to-be-encoded data unit groups include the first to-be-encoded data unit and the last to-be-encoded data unit in the T to-be-encoded data units, because more to-be-encoded data units may participate in encoding, a higher encoding gain can be obtained, and the capability of the encoded data against the channel fading and the channel change can be improved, thereby improving the receiving reliability of the encoded data and improve the spectral efficiency.

With reference to the first aspect, in some implementations of the first aspect, the T to-be-encoded data units include N original data units, each of the L to-be-encoded data unit groups includes at most M original data units in the N original data units, N is an integer greater than 1, and M is an integer greater than 0 and less than N. N, L, and M may be collectively referred to as encoding parameters.

In the foregoing implementation, optionally, the quantity L of the to-be-encoded data unit groups satisfies $N \leq L \leq N+M-1$. Optionally, an implementation of the obtaining one or more encoded data units that are in a one-to-one correspondence with each of the L to-be-encoded data unit groups is: obtaining one encoded data unit that is in a one-to-one correspondence with each of the L to-be-encoded data unit groups.

In the foregoing implementation, the original data units can be selectively encoded, so that correlation of encoded data of the original data units can be reduced, and a capability of the encoded data of the original data units against the channel fading and the channel change can be improved, to improve receiving reliability of the encoded data of the original data units and improve the spectral efficiency.

In the foregoing implementation, optionally, each of the L to-be-encoded data unit groups does not simultaneously include the first original data unit and the last original data unit in the N original data units. Alternatively, the one or more of the L to-be-encoded data unit groups include the first original data unit and the last original data unit in the N original data units.

In the foregoing implementation, optionally, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, or identification information of an original data unit (for example, an index of the original data unit) corresponding to an encoding start location. In a multi-hop system, the header information may further include identification information of a transmitting end. The header information is added, so that a receiving end can identify, based on the header information, the encoded data unit used for decoding, to correctly decode the encoded data unit, and further improve the spectral efficiency.

With reference to the first aspect, in some implementations of the first aspect, the L to-be-encoded data unit groups may be obtained in a sliding window manner, and each of the L to-be-encoded data unit groups is encoded separately to obtain one encoded data unit that is in a one-to-one correspondence with each of the L to-be-encoded data unit groups. It may be understood that the L to-be-encoded data unit groups obtained in the sliding window manner include all original data units in the N original data units. In this case, M may be understood as a maximum quantity of original data units that can be included in a sliding window. In an implementation of the sliding window, different to-be-encoded data unit groups can be obtained, diversity of the to-be-encoded data units is increased, a higher encoding gain is obtained, encoding efficiency is improved, and spectral efficiency is improved.

In the foregoing implementation, optionally, when each of the L to-be-encoded data unit groups does not simultaneously include the first original data unit and the last original data unit in the N original data units, it may be understood as that a cyclic shift (that is, an end-around cyclic shift) is not performed when the sliding window slides. When the one or more of the L to-be-encoded data unit groups include the first original data unit and the last original data unit in the N original data units, it may be understood as that a cyclic shift is performed on the sliding window. The cyclic shift is not performed on the sliding window during sliding. This can reduce encoding complexity during encoding and also reduce storage overheads during encoding. The cyclic shift is performed on the sliding window during sliding. Because more to-be-encoded data units may participate in encoding, the higher encoding gain can be obtained, and the capability of the encoded data against the channel fading and the channel change can be improved, to improve the receiving reliability of the encoded data and improve the spectral efficiency.

With reference to the first aspect, in some implementations of the first aspect, the T to-be-encoded data units include N original data units and P interleaved data units, each of the L to-be-encoded data unit groups includes at most M original data units and/or interleaved data units in the N original data units and the P interleaved data units, N is an integer greater than 1, P is an integer greater than 1, and M is an integer greater than 0 and less than N+P. N, P, L, and M may be collectively referred to as encoding parameters.

In the foregoing implementation, optionally, the quantity L of the to-be-encoded data unit groups satisfies N+P≤L≤N+P+M−1. Optionally, an implementation of the obtaining one or more encoded data units that are in a one-to-one correspondence with each of the L to-be-encoded data unit groups is: obtaining one encoded data unit that is in a one-to-one correspondence with each of the L to-be-encoded data unit groups.

The foregoing implementation may be understood as interleaving the N original data units and then obtaining the to-be-encoded data unit groups through division. In addition to reducing correlation of the encoded data, interleaving can further improve the capability of the encoded data against the channel fading and the channel change, to further improve the receiving reliability of the encoded data and improve the spectral efficiency.

In the foregoing implementation, optionally, each of the L to-be-encoded data unit groups does not simultaneously include the first data unit and the last data unit in the N+P original data units and interleaved data units, which may be understood as that a cyclic shift (that is, an end-around cyclic shift) is not performed when the sliding window slides. Alternatively, the one or more of the L to-be-encoded data unit groups include the first data unit and the last data unit in the N+P original data units and interleaved data units, which may be understood as that a cyclic shift is performed on the sliding window. Whether the first data unit or the last data unit is an original data unit or an interleaved data unit depends on arrangement of the original data units and the interleaved data units. This is not limited in this application.

In the foregoing implementation, optionally, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

With reference to the first aspect, in some implementations of the first aspect, the L to-be-encoded data unit groups may be obtained in a sliding window manner, and each of the L to-be-encoded data unit groups is encoded separately to obtain one encoded data unit that is in a one-to-one correspondence with each of the L to-be-encoded data unit groups. It may be understood that the L to-be-encoded data unit groups obtained in the sliding window manner include all original data units and interleaved data units in the N original data units and the P interleaved data units. In this case, M may be understood as a maximum quantity of original data units and/or interleaved data units that can be included in a sliding window.

Optionally, when each of the L to-be-encoded data unit groups does not simultaneously include the first data unit and the last data unit in the N+P original data units and interleaved data units, it may be understood as that a cyclic shift (that is, an end-around cyclic shift) is not performed when the sliding window slides. When the one or more of the L to-be-encoded data unit groups include the first data unit and the last data unit in the N+P original data units and interleaved data units, it may be understood as that a cyclic shift is performed on the sliding window.

With reference to the first aspect, in some implementations of the first aspect, the T to-be-encoded data units include B original data blocks, each of the L to-be-encoded data unit groups includes at most M original data blocks in the B original data blocks, B is an integer greater than 1, and M is an integer greater than 0 and less than B. The original data block may be usually understood as a to-be-encoded data unit larger than an original data unit. For example, the B original data blocks may include original data units, where a $b^{th}$ original data block includes $N_b$ original data units, and b is an integer greater than 0 and less than or equal to B. Alternatively, the original data block may include an original data unit and an interleaved data unit, where a $b^{th}$ original data block includes $N_b$ original data units and interleaved data units, and b is an integer greater than 0 and less than or equal to B. B, L, $N_b$, and M may be collectively referred to as encoding parameters. When the original data block includes an interleaved data unit, interleaving can further improve the capability of the encoded data against the channel fading and the channel change, to further improve the receiving reliability of the encoded data and improve the spectral efficiency.

In the foregoing implementation, optionally, the quantity L of the to-be-encoded data unit groups satisfies $B \le L \le B+M-1$. Optionally, an implementation of the obtaining one or more encoded data units that are in a one-to-one correspondence with each of the L to-be-encoded data unit groups is: obtaining a plurality of encoded data units that are in a one-to-one correspondence with each of the L to-be-encoded data unit groups.

The foregoing implementation may be understood as dividing the B original data blocks into the L to-be-encoded data unit groups, and separately encoding the L to-be-encoded data unit groups, where L satisfies $B \le L \le B+M-1$. In this implementation, M may also be understood as an inter-block convolution depth. In this implementation, selective inter-block joint encoding can be performed on original data units included in two or more original data blocks, and therefore inter-block transmission error correction can be supported, to further improve encoding reliability and a capability of data transmission against a channel random error, and further improve the spectral efficiency.

In the foregoing implementation, optionally, each of the L to-be-encoded data unit groups does not simultaneously include the first original data block and the last original data block in the B original data blocks. Alternatively, the one or more of the L to-be-encoded data unit groups include the first original data block and the last original data block in the B original data blocks.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

With reference to the first aspect, in some implementations of the first aspect, the L to-be-encoded data unit groups may be obtained in a sliding window manner, and each of the L to-be-encoded data unit groups is encoded separately to obtain a plurality of encoded data units that are in a one-to-one correspondence with each of the L to-be-encoded data unit groups. It may be understood that the L to-be-encoded data unit groups obtained in the sliding window manner include all original data blocks in the B original data blocks. In this case, M may be understood as a maximum quantity of original data blocks that can be included in a sliding window.

In the foregoing implementation, optionally, when each of the L to-be-encoded data unit groups does not simultaneously include the first original data block and the last original data block in the B original data blocks, it may be understood as that a cyclic shift (that is, an end-around cyclic shift) is not performed when the sliding window slides. When the one or more of the L to-be-encoded data unit groups include the first original data block and the last original data block in the B original data blocks, it may be understood as that a cyclic shift is performed on the sliding window.

With reference to the first aspect, in some implementations of the first aspect, the T to-be-encoded data units include B original data blocks and Q interleaved data blocks, each of the L to-be-encoded data unit groups includes at most M original data blocks and/or interleaved data blocks in the B original data blocks and the Q interleaved data blocks, B is an integer greater than 1, Q is an integer greater than 1, and M is an integer greater than 0 and less than B+Q. The original data block includes an original data unit, and the interleaved data block includes an interleaved data unit. B, Q, L, and M may be collectively referred to as encoding parameters.

In the foregoing implementation, optionally, the quantity L of the to-be-encoded data unit groups satisfies B+Q≤L≤B+Q+M−1. Optionally, a specific implementation of the obtaining one or more encoded data units that are in a one-to-one correspondence with each of the L to-be-encoded data unit groups is: obtaining a plurality of encoded data units that are in a one-to-one correspondence with each of the L to-be-encoded data unit groups.

The foregoing implementation may be understood as interleaving the original data units in the B original data blocks and then obtaining the to-be-encoded data unit groups through division. With reference to inter-block encoding, in addition to supporting inter-block transmission error correction, interleaving can further improve the capability of the encoded data against the channel fading and the channel change, to further improve the receiving reliability of the encoded data and improve the spectral efficiency.

In the foregoing implementation, optionally, each of the L to-be-encoded data unit groups does not simultaneously include the first data block and the last data block in the B+Q original data blocks and interleaved data blocks, which may be understood as that a cyclic shift (that is, an end-around cyclic shift) is not performed when the sliding window slides. Alternatively, the one or more of the L to-be-encoded data unit groups include the first data block and the last data block in the B+Q original data blocks and interleaved data blocks, which may be understood as that a cyclic shift is performed on the sliding window. Whether the first data block or the last data block is an original data block or an interleaved data block depends on arrangement of the original data blocks and the interleaved data blocks. This is not limited in this application.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

With reference to the first aspect, in some implementations of the first aspect, the L to-be-encoded data unit groups may be obtained in a sliding window manner, and each of the L to-be-encoded data unit groups is encoded separately to obtain one encoded data unit that is in a one-to-one correspondence with each of the L to-be-encoded data unit groups. It may be understood that the L to-be-encoded data unit groups obtained in the sliding window manner include all original data blocks and interleaved data blocks in the B original data blocks and the Q interleaved data blocks. In this case, M may be understood as a maximum quantity of original data blocks and/or interleaved data blocks that can be included in a sliding window.

Optionally, when each of the L to-be-encoded data unit groups does not simultaneously include the first data block and the last data block in the B+Q original data blocks and interleaved data blocks, it may be understood as that a cyclic shift (that is, an end-around cyclic shift) is not performed when the sliding window slides. When one or more of the L to-be-encoded data unit groups include the first data block and the last data block in the B+Q original data blocks and interleaved data blocks, it may be understood as that a cyclic shift is performed on the sliding window.

In any one of the first aspect or the possible implementations of the first aspect, optionally, the T to-be-encoded data units include an error data unit, and there are one or more error data units. Each of the L to-be-encoded data unit groups does not include the error data unit, or the one or more of the L to-be-encoded data unit groups include the error data unit. When one or more of the L to-be-encoded data unit groups include the error data unit, the foregoing method further includes: generating and outputting first indication information indicating the error data unit, where the first indication information may be carried in the header information. The optional implementation method may be performed by a relay apparatus or a forwarding apparatus, for example, may be a relay network device, a relay terminal, a forwarding network device, or a forwarding terminal, or may be a processor, a chip, or a chip system in the relay network device, the relay terminal, the forwarding network device, or the forwarding terminal. The relay apparatus first receives to-be-forwarded data units. However, due to a fading characteristic of a wireless channel, the relay apparatus may fail to correctly receive some to-be-forwarded data units. These to-be-forwarded data units that cannot be correctly received by the relay apparatus may be understood as the foregoing error data units. According to the foregoing method, the relay apparatus can appropriately re-encode to-be-forwarded data when forwarding the data, to improve the receiving reliability of the encoded data and improve the spectral efficiency in a relay forwarding scenario.

When each of the L to-be-encoded data unit groups does not include the error data unit, and each of the L to-be-encoded data unit groups is separately encoded to generate one or more encoded data units that are in a one-to-one correspondence with each of the L to-be-encoded data unit groups, an encoded data unit corresponding to the error data unit is not generated. In the implementation method, optionally, the method further includes: generating and outputting second indication information, where the second indication information indicates that the encoded data unit corresponding to the error data unit is incomplete, and the second indication information may be carried in the header information, or may be carried in a control protocol data unit (PDU), or may be carried in a media access control (MAC) control element (CE). The second indication information enables a receiving apparatus to complete decoding of received data when the encoded data unit corresponding to the error data unit is absent. The encoded data unit corresponding to the error data unit is not generated, so that transfer or diffusion of the error data unit can be avoided, decoding reliability of the receiving end is improved, and a waste of spectrum resources for transmitting the error data unit can be reduced.

When each of the L to-be-encoded data unit groups does not include the error data unit, and each of the L to-be-encoded data unit groups is separately encoded to generate one or more encoded data units that are in a one-to-one correspondence with each of the L to-be-encoded data unit groups, the error data unit may be further set to 0, or it may also be understood as that the error data unit does not participate in encoding. In the implementation method, optionally, the method further includes: generating and outputting third indication information, where the third indication information indicates the error data unit, and the third indication information may be carried in the header information, or may be carried in a control PDU, or may be carried in a MAC CE. The third indication information enables the receiving apparatus to complete decoding of received data when the error data unit is absent. In the implementation method, transfer or diffusion of the error data unit can be avoided, and the capability of the encoded data of the to-be-encoded data units against the channel fading and the channel change can be improved, to improve data receiving reliability and improve the spectral efficiency.

When one or more of the L to-be-encoded data unit groups include the error data unit, and each of the L to-be-encoded data unit groups is separately encoded to generate one or more encoded data units that are in a one-to-one correspondence with each of the L to-be-encoded data unit groups, the error data unit participates in encoding. In the implementation method, the foregoing first indication information indicating the error data unit is further generated and output. The first indication information may be carried in the header information, or may be carried in a control PDU, or may be carried in a MAC CE. The first indication information enables the receiving apparatus to complete decoding of received data when the encoded data unit corresponding to the error data unit is included. In this implementation, implementation complexity of the relay apparatus can be reduced, and the capability of the encoded data of the to-be-encoded data units against the channel fading and the channel change can be improved, to improve data receiving reliability and improve the spectral efficiency.

According to a second aspect, an embodiment of this application provides an encoding method. The method may be performed by a terminal or a network device, or may be performed by a component (for example, a processor, a chip, or a chip system) of the terminal or the network device. The method includes: obtaining T to-be-encoded data units, where T is an integer greater than 1; and encoding the T to-be-encoded data units $O_1$, $O_2$, . . . , $O_T$ to obtain K encoded data units $A_1$, $A_2$, . . . , $A_K$, where K is greater than or equal to T, and the K encoded data units satisfy:

$$[A_1, A_2, \ldots, A_K] = [O_1, O_2, \ldots, O_T] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than T. When the submatrix is a square matrix, the foregoing oblique diagonals include a main diagonal of the square matrix and an oblique diagonal parallel to the main diagonal.

In the foregoing method, the encoding matrix including the submatrix is used to encode the to-be-encoded data units, and a feature of the non-zero element in the GF(q) existing on the oblique diagonal of the submatrix in the encoding matrix is used, so that correlation of encoded data can be reduced, and a capability of the encoded data against channel fading and a channel change can be improved, to improve receiving reliability of the encoded data and improve spectral efficiency.

With reference to the second aspect, in some implementations of the second aspect, the T to-be-encoded data units include N original data units $X_1$, $X_2$, . . . , $X_N$, the N original data units are encoded to obtain K encoded data units $A_1$, $A_2$, . . . , $A_K$, K is greater than or equal to N, and the K encoded data units satisfy:

$$[A_1, A_2, \ldots, A_K] = [X_2, \ldots, X_N] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than N. When the submatrix is a square matrix, the foregoing oblique diagonals include a main diagonal of the square matrix and an oblique diagonal parallel to the main diagonal. R=N/K may be understood as a code rate. N, K, R, and M may be collectively referred to as encoding parameters.

In the foregoing implementation, a possible encoding matrix H satisfies:

$$H = [H_{left}^{N \times N} H_{right}^{N \times (K-N)}] = H_1$$

The encoding matrix H (which may be denoted as $H_1$) is an N*K-dimensional matrix, and includes an N*N-dimensional submatrix $H_{left}^{N \times N}$ and an N*(K–N)-dimensional submatrix $H_{right}^{N \times (K-N)}$. Non-zero elements in the GF(q) exist on a main diagonal of the submatrix $H_{left}^{N \times N}$ and M–1 oblique diagonals parallel to the main diagonal. The encoding matrix is used, so that correlation of encoded data of at least N original data units can be reduced, and a capability of the encoded data of the original data units against the channel fading and the channel change can be improved, to improve receiving reliability of the encoded data of the original data units and improve the spectral efficiency.

In the foregoing implementation, another possible encoding matrix H satisfies:

$$H = [H_{left}^{N \times (N+M-1)} H_{right}^{N \times (K-N-M+1)}] = H_2$$

The encoding matrix H (which may be denoted as $H_2$) is an N*K-dimensional matrix, and includes an N*(N+M–1)-dimensional submatrix $H_{left}^{N \times (N+M-1)}$ and an N*(K–N–M+1)-dimensional submatrix $H_{right}^{N \times (K-N-M+1)}$. A non-zero element in the GF(q) exists on M oblique right diagonals of the submatrix $H_{left}^{N \times (N+M-1)}$. The encoding matrix is used, so that encoding and left decoding complexity can be reduced, correlation of encoded data of at least N original data units can be reduced, and a capability of the encoded data of the original data units against the channel fading and the channel change can be improved, to improve receiving reliability of the encoded data of the original data units and improve the spectral efficiency.

In the foregoing implementation, another possible encoding matrix H satisfies:

$$H = [I_N H'] = H_3$$

$I_N$ is an N*N-dimensional identity matrix. The matrix H' is $H_1$ or $H_2$, the matrix H' includes one or more column vectors in $H_1$, or the matrix H' includes one or more column vectors in $H_2$. The encoding matrix is used, a decoding delay of the encoded data units can be reduced, correlation of encoded data of at least N original data units can be reduced, and a capability of the encoded data of the original data units against the channel fading and the channel change can be improved, to improve receiving reliability of the encoded data of the original data units and improve the spectral efficiency.

In the foregoing implementation, optionally, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, or identification information of an original data unit (for example, an index of the original data unit) corresponding to an encoding start location. In a multi-hop system, the header information may further include identification information of a transmitting end.

With reference to the second aspect, in some implementations of the second aspect, the T to-be-encoded data units include N original data units $X_1$, $X_2$, . . . , $X_N$ and P interleaved data units $X_1'$, $X_2'$, . . . , $X_P'$, the N original data units and the P interleaved data units are encoded to obtain K encoded data units $A_1$, $A_2$, . . . , $A_K$, K is greater than or equal to N+P, and the K encoded data units satisfy:

$$[A_1, A_2, \ldots, A_K] = [X_1, X_2, \ldots, X_N, X_1', X_2', \ldots, X_P'] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than N+P. When the submatrix is a square matrix, the foregoing oblique diagonals include a main diagonal of the square matrix and an oblique diagonal parallel to the main diagonal. In this case, it may be considered that the T to-be-encoded data units $O_1$, $O_2$, . . . , $O_T$ in the method 400 are the N original data units $X_1$, $X_2$, . . . , $X_N$ and the P interleaved data units $X_1'$, $X_2'$, . . . , $X_P'$. It may be understood that an arrangement sequence of the N original data units and the P interleaved data units in $[X_1, X_2, \ldots, X_N, X_1', X_2', \ldots, X_P']$ is not limited in this application, and $[X_1, X_2, \ldots, X_N, X_1', X_2', \ldots, X_P']$ indicates that the N original data units and the P interleaved data units are included. However, the N+P data units may be arranged in any sequence. This is not limited in this application. R=N/K may be understood as a code rate. N, K, R, and M may be collectively referred to as encoding parameters.

In the foregoing implementation, a possible encoding matrix H satisfies:

$$H = [H_{left}^{(N+P) \times (N+P)} H_{right}^{(N+P) \times (K-N-P)}] = H_4$$

The encoding matrix H (which may be denoted as $H_4$) is an (N+P)*K-dimensional matrix, and includes an (N+P)* (N+P)-dimensional submatrix $H_{left}^{(N+P) \times (N+P)}$ and an (N+p)* (K−N−P)-dimensional submatrix $H_{right}^{(N+P) \times (K-N-P)}$. Non-zero elements in the GF(q) exist on a main diagonal of the submatrix $H_{left}^{(N+P) \times (N+P)}$ and M−1 oblique diagonals parallel to the main diagonal.

In the foregoing implementation, another possible encoding matrix H satisfies:

$$H = [H_{left}^{(N+P) \times (N+P+M-1)} H_{right}^{(N+P) \times (K-N-P-M+1)}] = H_5$$

The encoding matrix H (which may be denoted as $H_5$) is an (N+P)*K-dimensional matrix, and includes an (N+P)* (N+P+M−1)-dimensional submatrix $H_{left}^{(N+P) \times (N+P+M-1)}$ and an (N+P)*(K−N−P−M+1)-dimensional submatrix $H_{right}^{(N+P) \times (K-N-P-M+1)}$. A non-zero element in the GF(q) exists on M oblique diagonals of the submatrix $H_{left}^{(N+P) \times (N+P+M-1)}$.

In the foregoing implementation, another possible encoding matrix H satisfies:

$$H = [I_{N+P} H'] = H_6$$

$I_{N+P}$ is an (N+P)*(N+P)-dimensional identity matrix. The matrix H' is $H_4$ or $H_5$, the matrix H' includes one or more column vectors in $H_4$, or the matrix H' includes one or more column vectors in $H_5$.

In the foregoing implementation, optionally, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

According to a third aspect, an embodiment of this application provides an encoding method. The method may be performed by a terminal or a network device, or may be performed by a component (for example, a processor, a chip, or a chip system) of the terminal or the network device. The method includes: obtaining T to-be-encoded data units, where T is an integer greater than 1; and encoding the T to-be-encoded data units $O_1$, $O_2$, . . . , $O_T$ to obtain D encoded data blocks $C_1$, $C_2$, . . . , $C_D$ including encoded data units, where D is greater than or equal to T, and the D encoded data blocks satisfy:

$$[C_1, C_2, \ldots, C_D] = [O_1, O_2, \ldots, O_T] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than T. When the submatrix is a square matrix, the foregoing oblique diagonals include a main diagonal of the square matrix and an oblique diagonal parallel to the main diagonal.

In the foregoing method, the encoding matrix including the submatrix is used to encode the to-be-encoded data unit, and a feature of the non-zero matrix including the element in the GF(q) existing on the oblique diagonal of the submatrix in the encoding matrix is used, so that correlation of encoded data can be reduced, and a capability of the encoded data against channel fading and a channel change can be improved, to improve receiving reliability of the encoded data and improve spectral efficiency.

With reference to the third aspect, in some implementations of the third aspect, the T to-be-encoded data units include B>1 original data blocks $BL_1, \ldots, BL_B$ including original data units, or the T to-be-encoded data units include B>1 original data blocks $BL_1, \ldots, BL_B$ including original data units and an interleaved data unit. The B original data blocks are encoded to obtain D encoded data blocks $C_1$, $C_2, \ldots, C_D$ including encoded data units, where D is greater than or equal to B, and the D encoded data blocks satisfy:

$$[C_1, C_2, \ldots, C_D] = [BL_1, \ldots, BL_B] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than B. When the submatrix is a square matrix, the foregoing oblique diagonals include a main diagonal of the square matrix and an oblique diagonal parallel to the main diagonal. B, D, and M may be collectively referred to as encoding parameters. When the original data block includes an interleaved data unit, interleaving can further improve the capability of the encoded data against the channel fading and the channel change, to further improve the receiving reliability of the encoded data and improve the spectral efficiency.

In the foregoing implementation, a possible encoding matrix H satisfies:

$$H = [H_{left}^{B \times B} H_{right}^{B \times (D-B)}] = H_7$$

The encoding matrix H (which may be denoted as $H_7$) is a B*D-dimensional matrix, and includes a B*B-dimensional submatrix $H_{left}^{B \times B}$ and a B*(D−B)-dimensional submatrix $H_{right}^{B \times (D-B)}$. In this example, there is no special requirement on the submatrix $H_{right}^{B \times (D-B)}$ included in the foregoing H. For example, an element in $H_{right}^{B \times (D-B)}$ may be randomly obtained in the GF(q). A non-zero matrix including elements in the GF(q) exists on a main diagonal of the submatrix $H_{left}^{B \times B}$ and M−1 oblique diagonals parallel to the main diagonal.

In the foregoing implementation, another possible encoding matrix H satisfies:

$$H = [H_{left}^{B \times (B+M-1)} H_{right}^{B \times (D-B-M+1)}] = H_8$$

The encoding matrix H (which may be denoted as $H_8$) is a B*D-dimensional matrix, and includes a B*(B+M−1)-dimensional submatrix $H_{left}^{B \times (B+M-1)}$ and a B*(D−B−M+1)-dimensional submatrix $H_{right}^{B \times (D-B-M+1)}$. A non-zero matrix including an element in the GF(q) exists on M oblique diagonals of the submatrix $H_{left}^{B \times (B+M-1)}$.

In the foregoing implementation, another possible encoding matrix H satisfies:

$$H = [I_B H'] = H_9$$

The B*B-dimensional matrix $I_B$ includes B*B $N_b \times N_b$-dimensional identity matrices, $N_b$ represents a quantity of original data units included in an original data block b, $1 \leq b \leq B$, and quantities of original data units included in different original data blocks may be the same or may be different. The matrix H' is $H_7$ or $H_8$, the matrix H' includes one or more column vectors in $H_7$, or the matrix H' includes one or more column vectors in $H_8$.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

With reference to the third aspect, in some implementations of the third aspect, the T to-be-encoded data units include B original data blocks $BL_1, \ldots, BL_B$ and Q interleaved data blocks $BL_1', \ldots, BL_Q'$. An original data block b in the B original data blocks includes $N_b$ original data units, and an interleaved data block q' in the Q interleaved data blocks includes $N_q$ interleaved data units. The B original data blocks and the Q interleaved data blocks are encoded to obtain D encoded data blocks $C_1, C_2, \ldots, C_D$ including encoded data units, where D is greater than or equal to B+Q, and the D encoded data blocks satisfy:

$$[C_1, C_2, \ldots, C_D] = [BL_1, \ldots, BL_B, BL_1', \ldots, BL_Q'] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than B+Q. When the submatrix is a square matrix, the foregoing oblique diagonals include a main diagonal of the square matrix and an oblique diagonal parallel to the main diagonal. It may be understood that an arrangement sequence of the B original data blocks and the Q interleaved data blocks in $[BL_1, \ldots, BL_B, BL_1', \ldots, BL_Q']$ is not limited in this application, and $[BL_1, \ldots, BL_B, BL_1', \ldots, BL_Q']$ indicates that the B original data blocks and the Q interleaved data blocks are included. However, the B+Q data blocks may be arranged in any sequence. This is not limited in this application. B, Q, $N_b$, $N_q$, D, and M may be collectively referred to as encoding parameters.

In the foregoing implementation, a possible encoding matrix H satisfies:

$$H = [H_{left}^{(B+Q) \times (B+Q)} H_{right}^{(B+Q) \times (D-B-Q)}] = H_{10}$$

The encoding matrix H (which may be denoted as $H_{10}$) is a (B+Q)*D-dimensional matrix, and includes a (B+Q)*(B+Q)-dimensional submatrix $H_{left}^{(B+Q)\times(B+Q)}$ and a (B+Q)*(D–B–Q)-dimensional submatrix $H_{right}^{(B+Q)\times(D-B-Q)}$. A non-zero matrix including elements in the GF(q) exists on a main diagonal of the submatrix $H_{left}^{(B+Q)\times(D-B-Q)}$ and M–1 oblique diagonals parallel to the main diagonal.

In the foregoing implementation, another possible encoding matrix H satisfies:

$$H=[H_{left}^{(B+Q)\times(B+Q+M-1)} \quad H_{right}^{(B+Q)\times(D-Q-M+1)}]=H_{11}$$

The encoding matrix H (which may be denoted as $H_{11}$) is a (B+Q)*D-dimensional matrix, and includes a (B+Q)*(B+Q+M–1)-dimensional submatrix $H_{right}^{(B+Q)\times(D-B-Q-M+1)}$ and a (B+Q)*(D–B–Q–M+1)-dimensional submatrix $H_{right}^{(B+Q)\times(D-B-Q-M+1)}$. A non-zero matrix including an element in the GF(q) exists on M oblique diagonals of the submatrix $H_{left}^{(B+Q)\times(B+Q+M-1)}$.

In the foregoing implementation, another possible encoding matrix H satisfies:

$$H=[I_{B+Q}H']=H_{12}$$

A (B+Q)*(B+Q)-dimensional matrix $I_{B+Q}$ includes (B+Q)* (B+Q) $(N_b+N_{q'})\times(N_b+N_{q'})$-dimensional identity matrices. The matrix H' is $H_{10}$ or $H_{11}$, the matrix H' includes one or more column vectors in $H_{10}$, or the matrix H' includes one or more column vectors in $H_{11}$.

In the foregoing implementation, optionally, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

According to a fourth aspect, an embodiment of this application provides an apparatus that can implement the method according to any one of the first aspect, the second aspect, the third aspect, the possible implementations of the first aspect, the possible implementations of the second aspect, or the possible implementations of the third aspect. The apparatus includes a corresponding unit or component configured to perform the foregoing method. The unit included in the apparatus may be implemented by software and/or hardware. For example, the apparatus may be a terminal, a network device, a server, or a centralized controller, or a chip, a chip system, or a processor that can support the terminal, the network device, the server, or the centralized controller in implementing the foregoing method.

According to a fifth aspect, an embodiment of this application provides an apparatus. The apparatus includes a processor, where the processor is coupled to a memory, and the memory is configured to store a program or instructions.

When the program or the instructions are executed by the processor, the apparatus is enabled to implement the method according to any one of the first aspect, the second aspect, the third aspect, the possible implementations of the first aspect, the possible implementations of the second aspect, or the possible implementations of the third aspect.

According to a sixth aspect, an embodiment of this application provides a computer-readable storage medium. The computer-readable storage medium stores a computer program or instructions. When the computer program or the instructions are executed, a computer is enabled to perform the method according to any one of the first aspect, the second aspect, the third aspect, the possible implementations of the first aspect, the possible implementations of the second aspect, or the possible implementations of the third aspect.

According to a seventh aspect, an embodiment of this application provides a computer program product. The computer program product includes computer program code. When the computer program code is run on a computer, the computer is enabled to perform the method according to any one of the first aspect, the second aspect, the third aspect, the possible implementations of the first aspect, the possible implementations of the second aspect, or the possible implementations of the third aspect.

According to an eighth aspect, an embodiment of this application provides a chip. The chip includes a processor, where the processor is coupled to a memory, and the memory is configured to store a program or instructions. When the program or the instructions are executed by the processor, the chip is enabled to implement the method according to any one of the first aspect, the second aspect, the third aspect, the possible implementations of the first aspect, the possible implementations of the second aspect, or the possible implementations of the third aspect.

BRIEF DESCRIPTION OF DRAWINGS

FIG. 3 is a schematic diagram of encoding according to this application;

FIG. 4 is a schematic flowchart of an encoding method according to this application;

DESCRIPTION OF EMBODIMENTS

Figure 1:
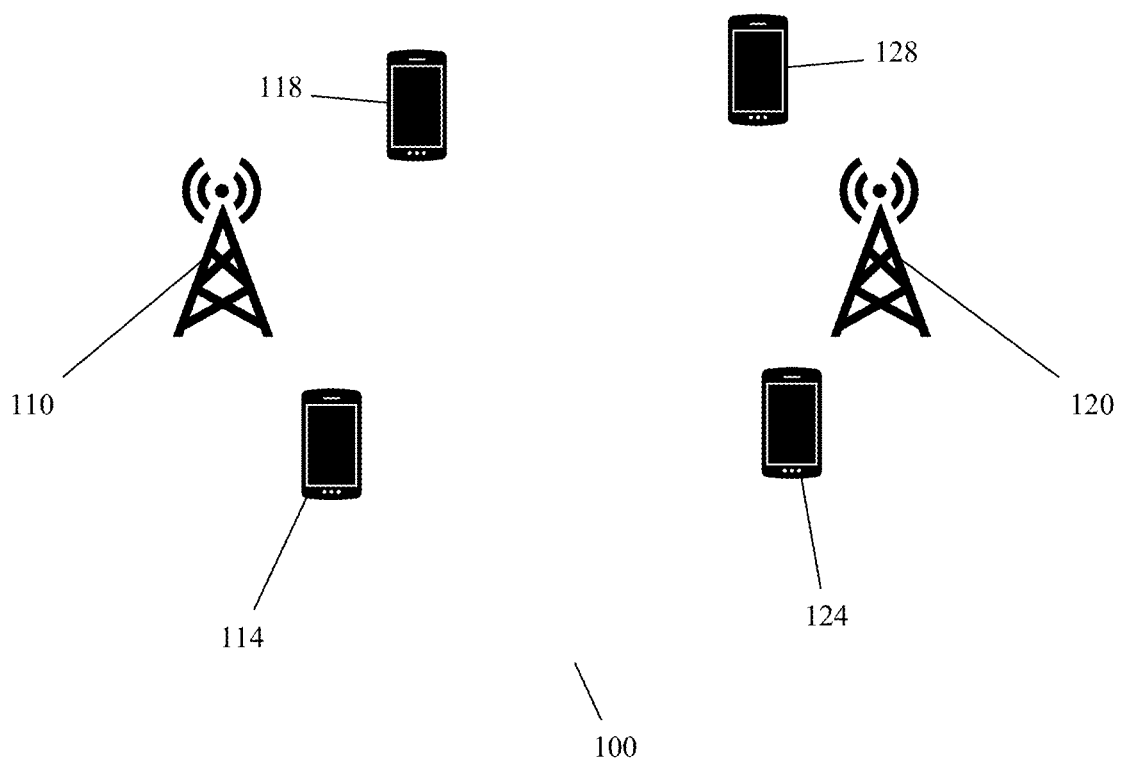
FIG. 1 is a schematic diagram of a communication system to which embodiments of this application are applied.

A method and an apparatus provided in embodiments of this application may be applied to a communication system. FIG. 1 is a schematic diagram of a structure of a communication system. The communication system 100 includes one or more network devices (where a network device 110 and a network device 120 are shown in the figure), and one or more terminals that communicate with the one or more network devices. A terminal 114 and a terminal 118 shown in FIG. 1 communicate with the network device 110, and a terminal 124 and a terminal 128 shown in FIG. 1 communicate with the network device 120. It may be understood that the network device and the terminal may also be referred to as communication devices.

The method and the apparatus provided in embodiments of this application may be applied to various communication systems, for example, a 4th generation (4th generation, 4G) communication system, a 4.5G communication system, a 5G communication system, a system integrating a plurality of communication systems, or a future evolved communication system (for example, a 5.5G communication system or a 6G communication system). The communication systems include, for example, a long term evolution (LTE) system, a new radio (NR) system, a wireless fidelity (Wi-Fi) system, a communication system related to the 3rd generation partnership project (3GPP), and another communication system of this type.

The method and the apparatus provided in embodiments of this application may be applied to a plurality of communication scenarios, for example, a scenario of transmission between a network device and a terminal, a scenario of transmission between terminals, a scenario of relay transmission between a network device and a terminal, a scenario of dual connectivity (DC), multi-connectivity, or multi-hop transmission between a plurality of network devices and terminals.

Figure 2:
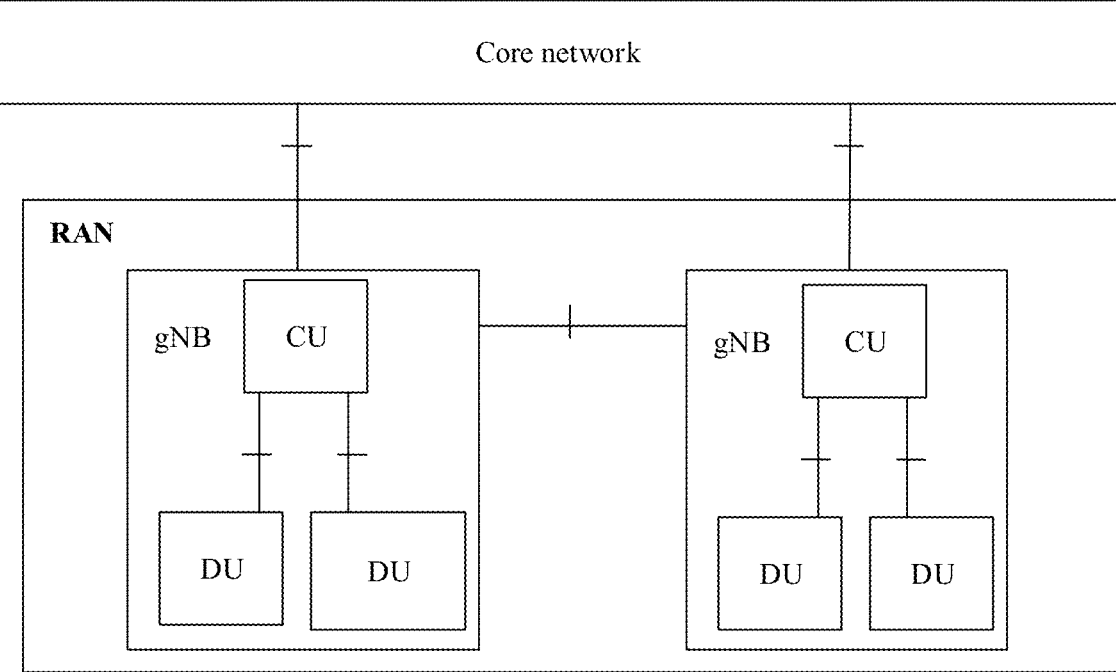
FIG. 2 is a schematic diagram of an example of an architecture of a communication system.

FIG. 2 is a schematic diagram of an example of a possible architecture of a communication system. As shown in FIG. 2, a network device in a radio access network (radio access network, RAN) is a base station (for example, a gNodeB or a gNB) with an architecture in which a central unit (CU) and a distributed unit (DU) are separated. The RAN may be connected to a core network (for example, an LTE core network or a 5G core network). The CU and the DU may be understood as division of the base station from a perspective of logical functions. The CU and the DU may be physically separated or physically deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are distributed to the CU, but functions of a radio link control (RLC) layer, a media access control (MAC) layer, and a physical (physical) layer are distributed to the DU. It may be understood that, division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. In one design, some functions of the RLC layer and functions of a protocol layer above the RLC layer are distributed to the CU, and remaining functions of the RLC layer and functions of a protocol layer below the RLC layer are distributed to the DU. In another design, functions of the CU or the DU may alternatively be obtained through division based on a service type or another system requirement. For example, division is performed based on a latency, a function whose processing time needs to satisfy a latency requirement is distributed to the DU, and a function whose processing time does not need to satisfy the latency requirement is distributed to the CU. The network architecture shown in FIG. 2 may be applied to a 5G communication system, and may alternatively share one or more components or resources with an LTE system. In another design, the CU may alternatively have one or more functions of the core network. One or more CUs may be disposed together, or may be disposed separately. For example, the CUs may be disposed on a network side for centralized management. The DU may have a plurality of radio frequency functions, and the radio frequency functions may be remotely set.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that embodiments provided in this application are also applicable to an architecture in which the CU and the DU are not separated.

In this application, the network device may be any device having a wireless transceiver function. The network device includes but is not limited to: an evolved NodeB (NodeB, eNB, or e-NodeB, evolved NodeB) in LTE, a base station (gNodeB or gNB) or a transmission reception point (TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support networks that use a same technology mentioned above, or may support networks that use different technologies mentioned above. The base station may include one or more co-site or non-co-site TRPs. The network device may alternatively be a radio controller, a CU, and/or a DU in a cloud radio access network (CRAN) scenario. The network device may alternatively be a server, a wearable device, a machine communication device, a vehicle-mounted device, or the like. An example in which the network device is a base station is used for description below. The plurality of network devices may be base stations of a same type or base stations of different types. The base station may communicate with the terminal device, or may communicate with the terminal device through a relay station. The terminal device may communicate with a plurality of base stations using different technologies. For example, the terminal device may communicate with a base station supporting an LTE network, may communicate with a base station supporting a 5G network, or may support a dual connection to the base station supporting the LTE network and the base station supporting the 5G network.

The terminal is a device having a wireless transceiver function, and may be deployed on the land, including an indoor or outdoor device, a hand-held device, a wearable device, or a vehicle-mounted device, or may be deployed on the water (for example, on a ship), or may be deployed in the air (for example, on a plane, a balloon, or a satellite). The terminal may be a mobile phone, a tablet computer (Pad), a computer having a wireless transceiver function, a virtual reality (VR) terminal device, an augmented reality (AR) terminal device, a terminal in industrial control, a vehicle-mounted terminal device, a terminal in self driving, a terminal in assisted driving, a terminal in telemedicine, a terminal in a smart grid, a terminal in transportation safety, a terminal in a smart city, a terminal in a smart home, or the like. An application scenario is not limited in embodiments of this application. Sometimes, the terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE agent, a UE apparatus, or the like. The terminal may be fixed or movable.

By way of example and not limitation, the terminal in this application may be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart jewelry for monitoring physical signs.

In this application, the terminal may be a terminal in an internet of things (internet of things, IoT) system. IoT is an important component in development of future information technologies. A main technical feature of the IoT is to connect an object to a network by using a communication technology, to implement an intelligent network of human-machine interconnection and thing-thing interconnection. The terminal in this application may be a terminal in machine type communication (MTC). The terminal in this application may be an in-vehicle module, an onboard component, an automotive chip, or an on board unit that is built in a vehicle as one or more components or units. The vehicle may implement a method in this application by using the in-vehicle module, the onboard component, the automotive chip, or the on board unit that is built in the vehicle. Therefore, embodiments of this application may be applied to an internet of vehicles, for example, vehicle-to-everything (V2X), long term evolution-vehicle (LTE-V), and vehicle-to-vehicle (V2V).

To effectively reduce frequent feedback overhead and performance losses in a communication process, network encoding becomes an important technical direction. To be specific, an original data unit is encoded and redundant information is added to cope with problems such as packet loss or errors in wireless communication, to improve data transmission reliability.

Network encoding includes many types, such as block network encoding, convolutional network encoding, and random linear network coding (RLNC). In these encoding technologies, an encoding operation is performed on an original data unit to obtain a corresponding encoded data unit. For example, FIG. 3 is used as an example. N original data units are encoded to obtain K encoded data units. A code rate may be approximately represented as R=N/K. Because K is usually greater than or equal to N, R is usually greater than 0 and less than or equal to 1. A data unit in this application may also be referred to as a data packet, a data segment, or a data block.

The RLNC is used as an example. With reference to FIG. 3, the N original data units are respectively represented as $X_1$, $X_2$, . . . , $X_N$, and the N original data units may be included in one original data block. In this application, a data block may also be referred to as a data group, a data generation, or a data batch. In this application, an original data block may also be referred to as a to-be-encoded data block. When the N original data units are encoded by using the RLNC, the N original data units may be multiplied by K encoding vectors to obtain the K encoded data units (which are respectively represented as $Y_1$, $Y_2$, . . . , $Y_K$). For example, the K encoding vectors may be respectively represented as $[g_{1,1}, g_{1,2}, . . . , g_{1,N}]$, $[g_{2,1}, g_{2,2}, . . . , g_{2,N}]$, . . . , $[g_{K,1}, g_{K,2}, . . . , g_{K,N}]$, where each encoding vector includes N encoding coefficients, and an $n^{th}$ encoding coefficient in a $k^{th}$ encoding vector is represented as $g_{k,n}$. The encoding coefficient in the encoding vector may be randomly selected from a finite field or a Galois field (Galois field, GF), where the GF is a field including a limited quantity of elements, and a GF(q) may represent a GF including q elements. The K encoded data units $Y_1$, $Y_2$, . . . , $Y_K$ obtained by multiplying the N original data units $X_1$, $X_2$, . . . , $X_N$ by the K encoding vectors may satisfy:

$$Y_1 = g_{1,1} * X_1 + g_{1,2} * X_2 + \ldots + g_{1,N} * X_N$$

$$Y_2 = g_{2,1} * X_1 + g_{2,2} * X_2 + \ldots + g_{2,N} * X_N$$

$$\ldots$$

$$Y_K = g_{K,1} * X_1 + g_{K,2} * X_2 + \ldots + g_{K,N} * X_N$$

A $k^{th}$ encoded data unit $Y_k = g_{k,1} * X_1 + g_{k,2} * X_2 + \ldots + g_{K,N} * X_N$ may carry, in a header, information indicating an encoding vector $[g_{k,1}, g_{k,2}, . . . , g_{k,N}]$, so that a receiving end can decode received data based on the encoding vector. It may be understood that the foregoing K encoding vectors may be included in one encoding matrix, and the encoding matrix satisfies:

$$\begin{bmatrix} g_{1,1} & g_{1,2} & \cdots & g_{1,N} \\ g_{2,1} & g_{2,2} & \cdots & g_{2,N} \\ \vdots & \vdots & \ddots & \vdots \\ g_{K,1} & g_{K,2} & \cdots & g_{K,N} \end{bmatrix}$$

The multiplying the N original data units by the K encoding vectors to obtain the K encoded data units may also be understood as multiplying the N original data units by the encoding matrix to obtain the K encoded data units. It may be understood that the encoding matrix may also be referred to as a generator matrix, a convolution generator matrix, or a coefficient matrix. For ease of description, vectors in this application are all written in a form of row vectors, but may alternatively be represented in a form of column vectors. This is not limited in this application.

In a network encoding technology, after encoding a plurality of original data units to obtain encoded data, a transmitting end processes the encoded data and sends the encoded data. However, in the network encoding technology, linearly correlated encoded data may be generated, affecting receiving reliability of the encoded data. Therefore, how to reduce linear correlation of the encoded data and improve the receiving reliability of the encoded data becomes a problem that urgently needs to be resolved in the encoding technology.

Embodiments of this application provide an encoding method and an apparatus for network encoding. In the provided method, a plurality of to-be-encoded data units are divided into a plurality of to-be-encoded data unit groups for separate encoding, and a quantity of to-be-encoded data units included in each to-be-encoded data unit group is less than the total number of all to-be-encoded data units. According to the method, correlation of encoded data can be reduced, and a capability of the encoded data against channel fading and a channel change can be improved, to improve receiving reliability of the encoded data.

The following describes the technical solutions of this application in detail by using embodiments with reference to the accompanying drawings. The following embodiments and implementations may be combined with each other, and same or similar concepts or processes may not be described again in some embodiments. It may be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and/or a memory coupled to the processor.

For ease of understanding of embodiments of this application, some concepts or terms used in this application are first briefly described.

1. Galois field (GF): The GF is a field including a limited quantity of elements, and a GF(q) may represent a GF including q elements, where q is a positive integer. For example, a GF(2) includes two elements: 0 and 1 (which may also be understood as that an element in the GF(2) can be represented in binary), a GF(4) includes four elements: 0, 1, 2, and 3, and the GF(q) includes q elements: $0, 1, \ldots, q-1$.

2. Operation in the GF: In this application, if an element included in an encoding matrix, an encoding vector, or an encoding kernel is an element in the GF, an operation related to encoding may be understood as an operation in the GF.

Multiplication in the GF: An element in the GF may be generated by using a primitive polynomial $P(x)$ on the GF. Polynomial multiplication on the GF may be performed by mapping the element in the GF to a form of a polynomial, mapping a multiplication operation on the GF field to polynomial multiplication, and then performing a modulo operation on the primitive polynomial $P(x)$. For example, when $q=4$, a primitive polynomial of a GF(4) is $P(x)=x^2+x+1$, and 2-bit data (for example, '10', whose corresponding polynomial form is x) is multiplied by 2-bit data (for example, '11', whose corresponding polynomial form is x+1) on the GF(4), $(x*(x+1))$ mod $P(x)=(x^2+x)$ mod $(x^2+x+1)=1$ (mod indicates a modulo operation) is satisfied, and a corresponding binary value is "01". For another example, when $q=4$, 4-bit data (for example, '1011') is multiplied by 2-bit data (for example, '11', whose corresponding polynomial form is x+1) on the GF(4), and the first two bits '10' (whose corresponding polynomial form is x) and the last two bits '11' (whose corresponding polynomial form is x+1) in the 4-bit data '1011' may be separately multiplied by the 2-bit data '11' (whose corresponding polynomial form is x+1) on the GF(4). Then, results that are separately obtained are concatenated to obtain a result of multiplying '1011' by '11' on the GF(4), that is, $(x*(x+1))$ mod $P(x)=(x^2+x)$ mod $(x^2+x+1)=1$, where a corresponding binary value is '01';

$((x+1)*(x+1))$ mod $P(x)=(x^2+2x+1)$ mod $(x^2+x+1)=$ x, where a corresponding binary value is '10'; and '01' and '10' are concatenated to obtain a binary value '0110' corresponding to the result of multiplying '1011' by '11' on the GF(4).

Addition in the GF: Polynomial addition on the GF may be performed by mapping an element in the GF to a polynomial form, and mapping an addition operation on the GF field to polynomial addition (for example, exclusive OR of like-term coefficients). For example, an exclusive OR addition operation on the GF is performed on 2-bit data (for example, '10', whose corresponding polynomial form is x) and 2-bit data (for example, '11', whose corresponding polynomial form is x+1), $x \oplus (x+1)=(x+0) \oplus (x+1)= (x \oplus x)+(0 \oplus 1)=0+1=1$ ($\oplus$ indicates exclusive OR addition) is satisfied, and a corresponding binary value is "01".

FIG. 4 is a schematic flowchart of a communication method 400 according to an embodiment of this application. The method may be performed by a terminal, or may be a chip, a chip system, a processor, or the like that supports the terminal in implementing the method. Alternatively, the method may be performed by a network device, or may be a chip, a chip system, a processor, or the like that supports the network device in implementing the method. As shown in FIG. 4, the method 400 in this embodiment may include a part 410, a part 420, and a part 430.

Part 410: Obtain T to-be-encoded data units, where T is an integer greater than 1.

Part 420: Separately encode each of L to-be-encoded data unit groups to obtain one or more encoded data units that are in a one-to-one correspondence with each of the L to-be-encoded data unit groups, where the L to-be-encoded data unit groups include all the T to-be-encoded data units, each of the L to-be-encoded data unit groups includes at most M to-be-encoded data units in the T to-be-encoded data units, L is an integer greater than or equal to T, and M is an integer greater than 0 and less than T. Optionally, L satisfies $T \leq L \leq T+M-1$. It may be understood that a specific encoding type is not limited in this application. For example, the encoding type may be block encoding, convolutional encoding, or random linear encoding, or the encoding type may be network encoding (for example, block network encoding, convolutional network encoding, or random linear network coding).

Optionally, each of the L to-be-encoded data unit groups does not simultaneously include the first to-be-encoded data unit and the last to-be-encoded data unit in the T to-be-encoded data units, or one or more of the L to-be-encoded data unit groups include the first to-be-encoded data unit and the last to-be-encoded data unit in the T to-be-encoded data units.

It may be understood that there may be a plurality of different implementations for encoding the to-be-encoded data unit group. For example, a to-be-encoded data unit in the to-be-encoded data unit group may be encoded by using an encoding matrix, or a to-be-encoded data unit in the to-be-encoded data unit group may be encoded by using an encoding kernel. The encoding kernel may be understood as an encoding vector, and the encoding kernel may also be referred to as a convolution kernel, an encoding kernel vector, a coefficient vector, a coefficient vector, or the like. Optionally, the encoding kernel is included in the encoding matrix. For example, the encoding kernel may include all non-zero elements in one row or one column of the encoding matrix. M may be understood as a convolution depth, an encoding constraint degree, a constraint length, a convolution constraint length, a memory depth, an encoding depth, an encoding kernel size, an encoding kernel length, or an encoding kernel depth corresponding to encoding. T, L, and M may be collectively referred to as encoding parameters.

Optionally, one or more of the encoding parameters T, L, and M in Part 410 and Part 420 may be predefined, or may be configured by the network device.

Part 430: Output the encoded data units. When the method 400 is performed by the terminal, outputting the encoded data units may be understood as that the terminal sends the encoded data units to the network device or another terminal. When the method 400 is performed by the network device, outputting the encoded data units may be understood as that the network device sends the encoded data units to the terminal or another network device. Sending the encoded data units may also be understood as sending processed encoded data units. The processing includes, for example, one or more of modulation, layer mapping, antenna port mapping, precoding, or resource mapping. When the method 400 is performed by the chip, the chip system, or the processor in the terminal or the network device, outputting the encoded data units may be understood as outputting, in the terminal or the network device through a communication interface, the encoded data units to a module that subsequently processes the encoded data units.

It may be understood that outputting in this application may refer to sending of a signal or data on an air interface, or may refer to outputting a signal or data to another module in an apparatus through a communication interface in the apparatus.

In the method 400, to-be-encoded data units are divided into a plurality of to-be-encoded data unit groups for separate encoding, and a quantity of to-be-encoded data units included in each to-be-encoded data unit group is less than the total number of all to-be-encoded data units. In the method, the to-be-encoded data units are selectively encoded, so that correlation of encoded data can be reduced, and a capability of the encoded data against channel fading and a channel change can be improved, to improve receiving reliability of the encoded data and improve spectral efficiency.

Part 420 in the method 400 may alternatively be replaced with another implementation. In this implementation, the T to-be-encoded data units $O_1$, $O_2$, . . . , $O_T$ are encoded to obtain K encoded data units $A_1$, $A_2$, . . . , $A_K$, where K is greater than or equal to T, and the K encoded data units satisfy:

$$[A_1, A_2, \ldots, A_K] = [O_1, O_2, \ldots, O_T] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than T. When the submatrix is a square matrix, the foregoing oblique diagonals include a main diagonal of the square matrix and an oblique diagonal parallel to the main diagonal. For ease of description, this implementation is briefly referred to as an alternative implementation 420-A below.

Part 420 in the method 400 may alternatively be replaced with another implementation. In this implementation, the T to-be-encoded data units $O_1$, $O_2$, . . . , $O_T$ are encoded to obtain D encoded data blocks $\check{C}_1$, $C_2$, . . . , $C_D$ including encoded data units, where D is greater than or equal to T, and the D encoded data blocks satisfy:

$$[C_1, C_2, \ldots, C_D] = [O_1, O_2, \ldots, O_T] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than T. When the submatrix is a square matrix, the foregoing oblique diagonals include a main diagonal of the square matrix and an oblique diagonal parallel to the main diagonal. For ease of description, this implementation is briefly referred to as an alternative implementation 420-B below.

In a possible implementation (implementation 1-1 for short) of the method 400, the T to-be-encoded data units include N original data units, and each of the L to-be-encoded data unit groups includes at most M original data units in the N original data units, where N is an integer greater than 1, and M is an integer greater than 0 and less than N. This implementation may be understood as that in the method 400, T is equal to N, and the to-be-encoded data unit is an original data unit. N, L, and M may be collectively referred to as encoding parameters.

In the implementation 1-1, Part 410 of the method 400 may be implemented as: obtaining the N original data units. For example, the N original data units are obtained by dividing protocol data units (PDUs) from a protocol layer. The protocol layer may be an RLC layer, a PDCP layer, an RRC layer, a backhaul adaptation protocol (BAP) layer, a MAC layer, an application layer, or the like in a communication protocol. For another example, the N original data units may be received from another apparatus (for example, another network device or terminal).

In the implementation 1-1, optionally, the quantity L of the to-be-encoded data unit groups satisfies $N \leq L \leq N+M-1$. Optionally, in Part 420 of the method 400, the obtaining one or more encoded data units that are in a one-to-one correspondence with each of the L to-be-encoded data unit groups is implemented as: obtaining one encoded data unit that is in a one-to-one correspondence with each of the L to-be-encoded data unit groups.

In the implementation 1-1, optionally, each of the L to-be-encoded data unit groups does not simultaneously include the first original data unit and the last original data unit in the N original data units. Alternatively, the one or more of the L to-be-encoded data unit groups include the first original data unit and the last original data unit in the N original data units.

The foregoing implementation 1-1 may be understood as dividing the N original data units into the L to-be-encoded data unit groups, and separately encoding the L to-be-encoded data unit groups, where L satisfies $N \leq L \leq N+M-1$. In the implementation 1-1, the original data units can be selectively encoded, so that correlation of encoded data of the original data units can be reduced, and a capability of the encoded data of the original data units against the channel fading and the channel change can be improved, to improve receiving reliability of the encoded data of the original data units and improve the spectral efficiency.

Optionally, in the implementation 1-1, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

Optionally, in the implementation 1-1, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, or identification information of an original data unit (for example, an index of the original data unit) corresponding to an encoding start location. In a multi-hop system, the header information may further include identification information of a transmitting end.

In a possible implementation method of the implementation 1-1, the L to-be-encoded data unit groups may be obtained in a sliding window manner, and each of the L to-be-encoded data unit groups is encoded separately to obtain one encoded data unit that is in a one-to-one correspondence with each of the L to-be-encoded data unit groups. It may be understood that the L to-be-encoded data unit groups obtained in the sliding window manner include all original data units in the N original data units. In this case, M may be understood as a maximum quantity of original data units that can be included in a sliding window.

Optionally, when each of the L to-be-encoded data unit groups does not simultaneously include the first original data unit and the last original data unit in the N original data units, it may be understood as that a cyclic shift (that is, an end-around cyclic shift) is not performed when the sliding window slides. When one or more of the L to-be-encoded data unit groups include the first original data unit and the last original data unit in the N original data units, it may be understood as that a cyclic shift is performed on the sliding window.

Figure 5A:
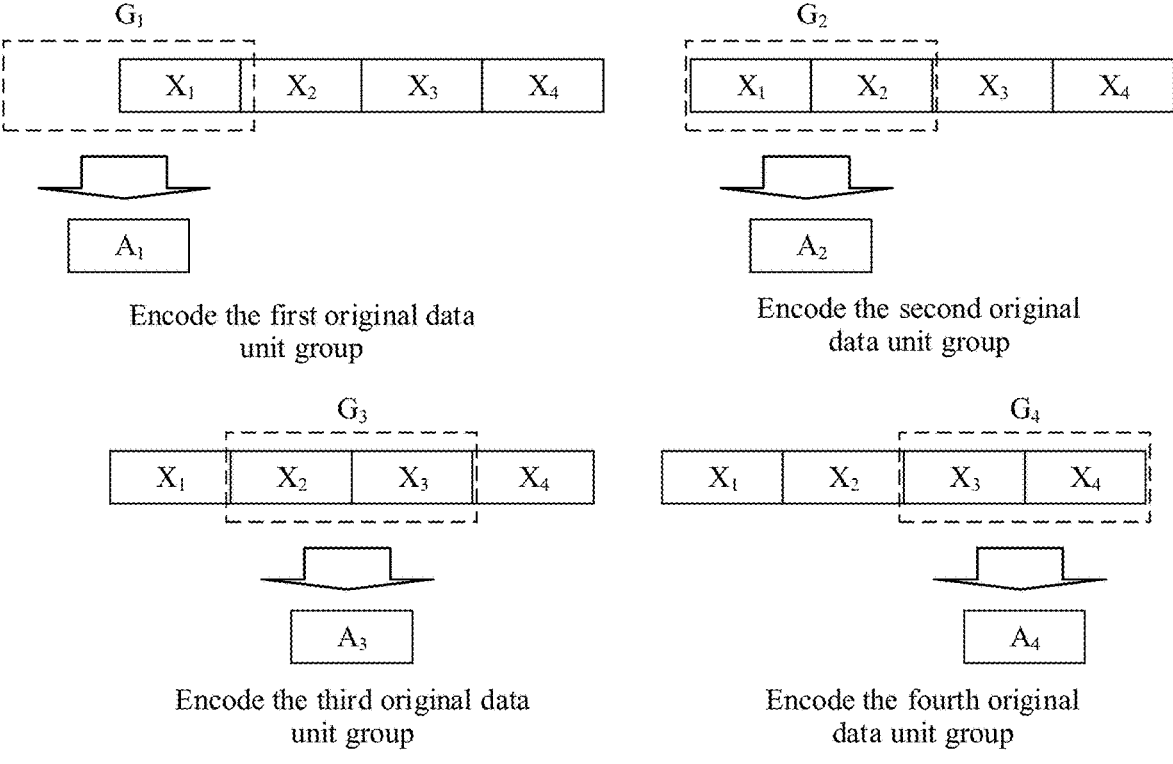
FIG. 5A to FIG. 5C, FIG. 6A to FIG. 6C, FIG. 7A to FIG. 7C, and FIG. 8A to FIG. 8C are also schematic diagrams of encoding according to this application.

In FIG. 5A, an example in which N=4 original data units, each to-be-encoded data unit group includes at most M=2 original data units in the N=4 original data units, there are L=N=4 to-be-encoded data unit groups, and a cyclic shift is not performed on a sliding window is used to describe a implementation of the foregoing implementation 1-1 in a sliding window manner.

In FIG. 5A, the N=4 original data units are respectively represented as $X_1$, $X_2$, $X_3$, $X_4$, a dashed-line box represents the sliding window, and $G_1$, $G_2$, $G_3$, $G_4$ respectively represent the L=N=4 to-be-encoded data unit groups. The first to-be-encoded data unit group $G_1$ includes an original data unit $X_1$, the second to-be-encoded data unit group $G_2$ includes original data units $X_1$ and $X_2$, the third to-be-encoded data unit group $G_3$ includes original data units $X_2$ and $X_3$, and the fourth to-be-encoded data unit group $G_4$ includes original data units $X_3$ and $X_4$. Original data units included in the four to-be-encoded data unit groups in FIG. 5A may also be understood as original data units included in the sliding window. The sliding window shown in FIG. 5A can include at most M=2 original data units, and the sliding window slides rightward at a granularity of an original data unit starting from a location including only $X_1$, to obtain the four to-be-encoded data unit groups $G_1$, $G_2$, $G_3$, $G_4$.

In FIG. 5A, the four to-be-encoded data unit groups $G_1$, $G_2$, $G_3$, $G_4$ each are encoded separately to obtain one encoded data unit that is in a one-to-one correspondence with each to-be-encoded data unit group. Specifically, the original data unit $X_1$ in $G_1$ is encoded to obtain an encoded data unit $A_1$ corresponding to $G_1$, the original data units $X_1$ and $X_2$ in $G_2$ are encoded to obtain an encoded data unit $A_2$ corresponding to $G_2$, the original data units $X_2$ and $X_3$ in $G_3$ are encoded to obtain an encoded data unit $A_3$ corresponding to $G_3$, and the original data units $X_3$ and $X_4$ in $G_4$ are encoded to obtain an encoded data unit $A_4$ corresponding to $G_4$.

A more general implementation in the example in FIG. 5A may be described as follows: The N original data units are represented as $X_1$, $X_n$, ..., $X_N$, ($1 \leq n \leq N$), the L=N to-be-encoded data unit groups are represented as $G_1$, ..., $G_n$, ..., $G_N$, ($1 \leq n \leq N$), and each to-be-encoded data unit group includes at most M original data units in the N original data units. The first to-be-encoded data unit group $G_1$ includes an original data unit $X_1$, ..., an $n^{th}$ to-be-encoded data unit group $G_n$ includes original data units $X_{n-M+1}$, ..., $X_{n-1}$, $X_n$, (n−M+1>0), ..., and an $N^{th}$ to-be-encoded data unit group $G_N$ includes original data units $X_{N-M+1}$, ..., $X_{N-1}$, $X_N$. Each of the L=N to-be-encoded data unit groups is encoded separately to obtain one encoded data unit that is in a one-to-one correspondence with each of the L=N to-be-encoded data unit groups.

For example, an encoding kernel $[h_1, h_2, ..., h_M]$ may be used to encode the to-be-encoded data unit group, and an element in the encoding kernel $[h_1, h_2, ..., h_M]$ may be an element in the GF(q). The first to-be-encoded data unit group $G_1$ is encoded based on the encoding kernel to obtain an encoded data unit $A_1 = X_1 \times h_1$, ..., an $n^{th}$ to-be-encoded data unit group $G_n$ is encoded based on the encoding kernel to obtain an encoded data unit $A_n = X_n \times h_1 + X_{n-1} \times h_2 + ... + X_{n-m+1} \times h_M$, ..., and an $N^{th}$ to-be-encoded data unit group $G_N$ is encoded based on the encoding kernel to obtain an encoded data unit $A_N = X_N \times h_1 + X_{N-1} \times h_2 + ... + X_{N-M+1} \times h_M$.

Figure 5B:
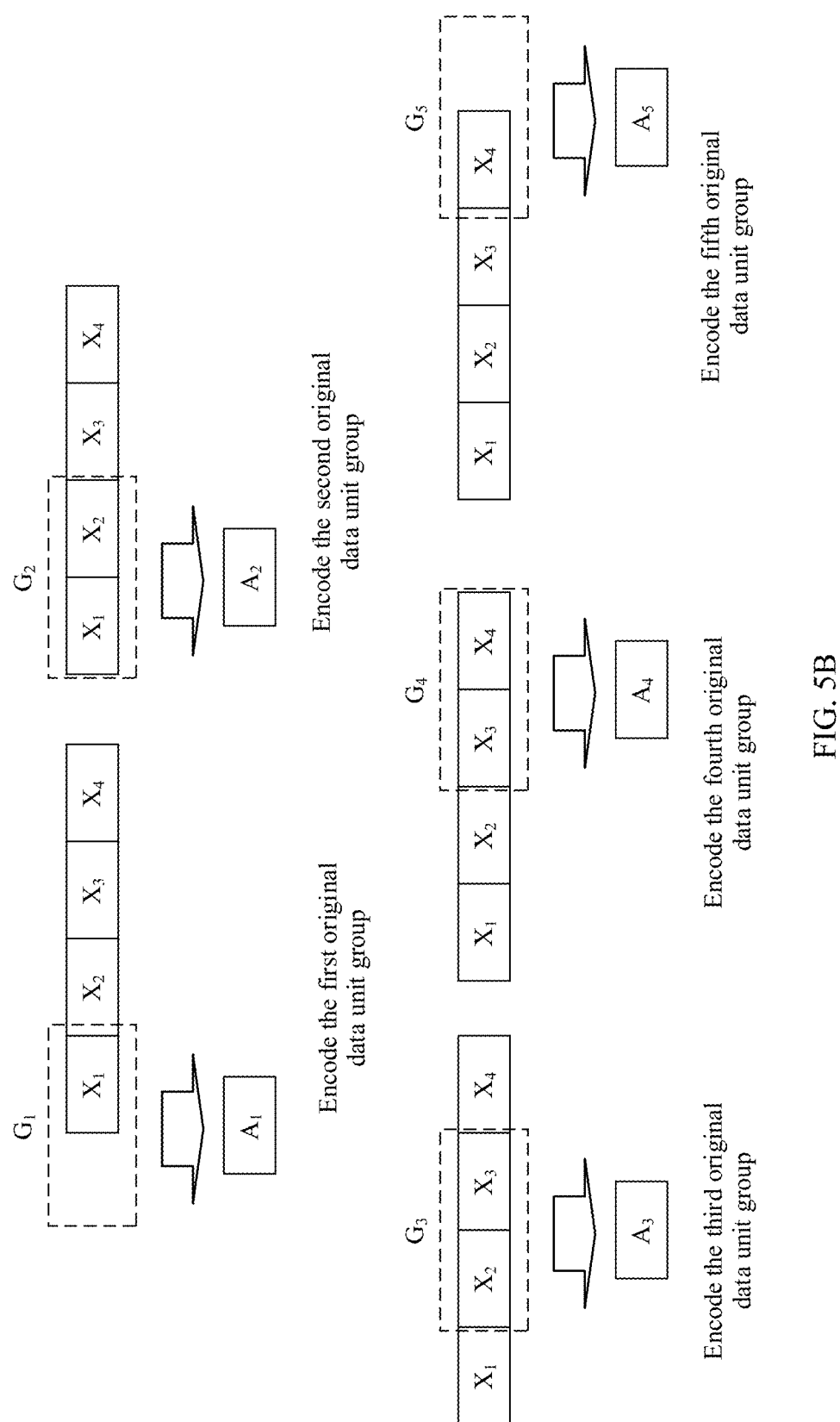

In FIG. 5B, an example in which N=4 original data units, each to-be-encoded data unit group includes at most M=2 original data units in the N=4 original data units, there are L=N+M−1=5 to-be-encoded data unit groups, and a cyclic shift is not performed on a sliding window is used to describe another specific implementation of the foregoing implementation 1-1 in a sliding window manner.

A difference between FIG. 5B and FIG. 5A lies in that the sliding window slides one more time, the fifth to-be-encoded data unit group $G_5$ is added, and $G_5$ includes an original data unit $X_4$.

In FIG. 5B, the five to-be-encoded data unit groups $G_1$, $G_2$, $G_3$, $G_4$, $G_5$ each are encoded separately to obtain one encoded data unit that is in a one-to-one correspondence with each to-be-encoded data unit group. Specifically, an original data unit $X_1$ in $G_1$ is encoded to obtain an encoded data unit $A_1$ corresponding to $G_1$, original data units $X_1$ and $X_2$ in $G_2$ are encoded to obtain an encoded data unit $A_2$ corresponding to $G_2$, original data units $X_2$ and $X_3$ in $G_3$ are encoded to obtain an encoded data unit $A_3$ corresponding to $G_3$, original data units $X_3$ and $X_4$ in $G_4$ are encoded to obtain an encoded data unit $A_4$ corresponding to $G_4$, and the original data unit $X_4$ in $G_5$ is encoded to obtain an encoded data unit $A_5$ corresponding to $G_5$.

A more general implementation in the example in FIG. 5B may be described as follows: The N original data units are represented as $X_1$, ..., $X_n$, ..., $X_N$, ($1 \leq n \leq N$), the L=N+M−1 to-be-encoded data unit groups are represented as $G_1$, ..., $G_n$, ..., $G_N$, $G_N+1$, ..., $G_{N+M-1}$, ($1 \leq n \leq N+M-1$), and each to-be-encoded data unit group includes at most M original data units in the N original data units. The first to-be-encoded data unit group $G_1$ includes an original data unit $X_1$, ..., an $n^{th}$ to-be-encoded data unit group $G_n$ includes original data units $X_{n-M+1}$, ..., $X_{n-1}$, ..., $X_n$, (n−M+1>0), ..., an $N^{th}$ to-be-encoded data unit group $G_N$ includes original data units $X_{N-M+1}$, ..., $X_{N-1}$, $X_N$, an $(N+1)^{th}$ to-be-encoded data unit group $G_{N+1}$ includes original data units $X_{N-M+2}$, ..., $X_{N-1}$, $X_N$, ..., and an (N+M−1) to-be-encoded data unit group $G_{N+M-1}$ includes an original data unit $X_N$. Each of the L=N+M−1 to-be-encoded data unit groups is encoded separately to obtain one encoded data unit that is in a one-to-one correspondence with each of the L=N+M−1 to-be-encoded data unit groups.

For example, an encoding kernel $[h_1, h_2, ..., h_M]$ may be used to encode the to-be-encoded data unit group, and an element in the encoding kernel $[h_1, h_2, ..., h_M]$ may be an element in the GF(q). The first to-be-encoded data unit group $G_1$ is encoded based on the encoding kernel to obtain an encoded data unit $A_1 = X_1 \times h_1$, ..., an $n^{th}$ to-be-encoded data unit group $G_n$ is encoded based on the encoding kernel to obtain an encoded data unit $A_n = X_n \times h_1 + X_{n-1} \times h_2 + \ldots + X_{n-M+1} \times h_M, \ldots$, an $N^{th}$ to-be-encoded data unit group $G_N$ is encoded based on the encoding kernel to obtain an encoded data unit $A_N = X_N \times h_1 + X_{N-1} \times h_2 + \ldots + X_{N-M+1} \times h_M, \ldots$, an $(N+1)^{th}$ to-be-encoded data unit group $G_{N+1}$ is encoded based on the encoding kernel to obtain an encoded data unit $A_{N+1} = X_N \times h_2 + X_{N-1} \times h_3 + \ldots + X_{N-M+2} \times h_M, \ldots$, and an $(N+M-1)^{th}$ to-be-encoded data unit group $G_{N+M-1}$ is encoded based on the encoding kernel to obtain an encoded data unit $A_{N+M-1} = X_N \times h_M$.

Figure 5C:
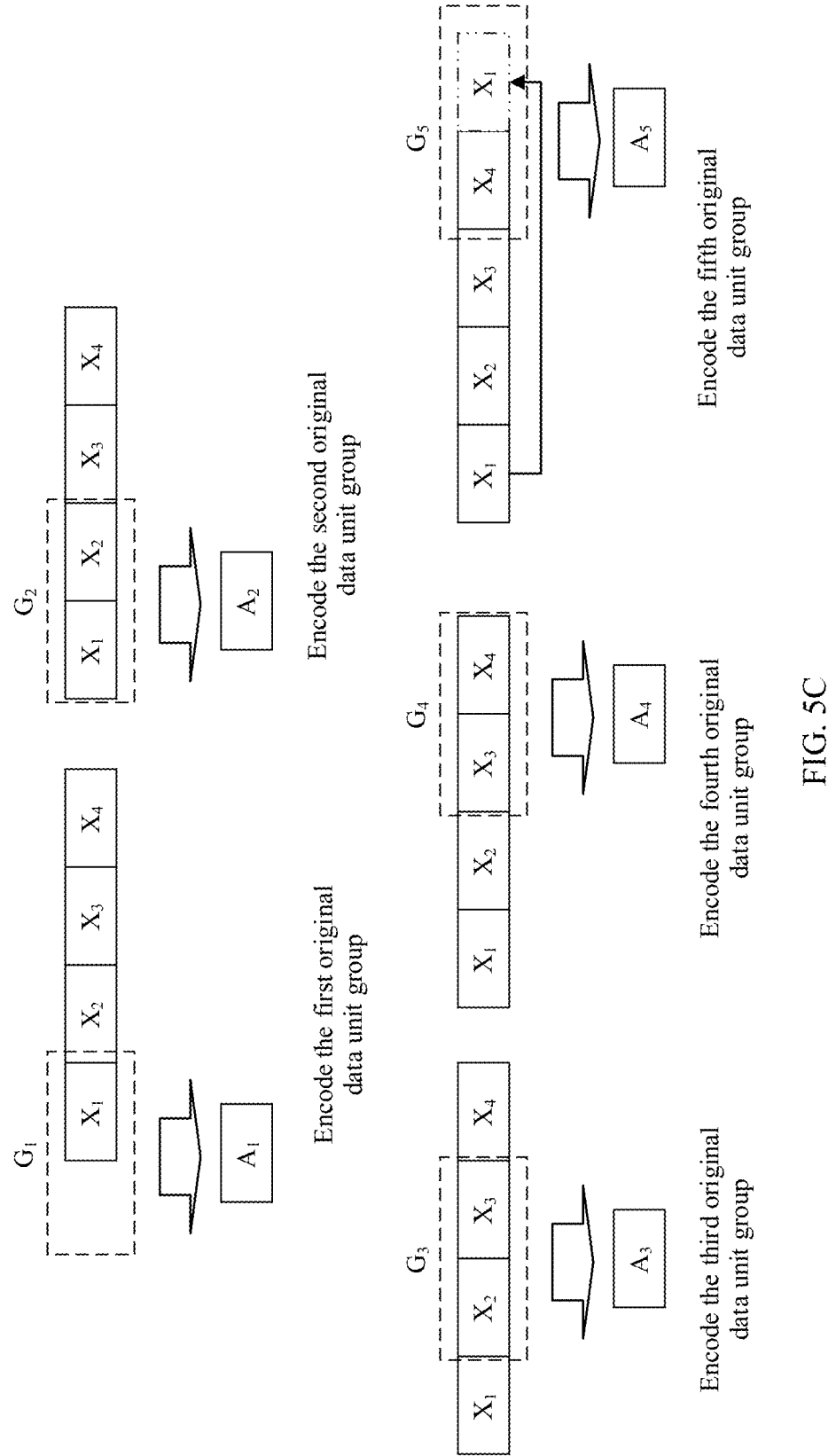

In FIG. 5C, an example in which N=4 original data units, each to-be-encoded data unit group includes at most M=2 original data units in the N=4 original data units, there are L=N+M−1=5 to-be-encoded data unit groups, and a cyclic shift is performed on a sliding window is used to describe another specific implementation of the foregoing implementation 1-1 in a sliding window manner.

A difference between FIG. 5C and FIG. 5B lies in that the fifth to-be-encoded data unit group $G_5$ includes original data units $X_4$ and $X_1$. This may be considered that the cyclic shift is performed on the sliding window when the sliding window is shifted to a location of the fifth to-be-encoded data unit group $G_5$, that is, the first original data unit $X_1$ is cyclically shifted to the fifth to-be-encoded data unit group $G_5$.

In FIG. 5C, the five to-be-encoded data unit groups $G_1$, $G_2$, $G_3$, $G_4$, $G_5$ each are encoded separately to obtain one encoded data unit that is in a one-to-one correspondence with each to-be-encoded data unit group. Specifically, an original data unit $X_1$ in $G_1$ is encoded to obtain an encoded data unit $A_1$ corresponding to $G_1$, original data units $X_1$ and $X_2$ in $G_2$ are encoded to obtain an encoded data unit $A_2$ corresponding to $G_2$, original data units $X_2$ and $X_3$ in $G_3$ are encoded to obtain an encoded data unit $A_3$ corresponding to $G_3$, original data units $X_3$ and $X_4$ in $G_4$ are encoded to obtain an encoded data unit $A_4$ corresponding to $G_4$, and the original data units $X_4$ and $X_1$ in $G_5$ are encoded to obtain an encoded data unit $A_5$ corresponding to $G_5$.

A more general implementation in the example in FIG. 5C may be described as follows: The N original data units are represented as $X_1, \ldots, X_1, \ldots, X_N$, $(1 \leq n \leq N)$, the L=N+M−1 to-be-encoded data unit groups are represented as $G_1, \ldots, G_n, \ldots, G_N, G_{N+1}, \ldots, G_{N+M-1}$, $(1 \leq n \leq N+M-1)$, and each to-be-encoded data unit group includes at most M original data units in the N original data units. The first to-be-encoded data unit group $G_1$ includes an original data unit $X_1, \ldots$, an $n^{th}$ to-be-encoded data unit group $G_n$ includes original data units $X_{n-M+1}, \ldots, X_{n-1}, X_n$, $(n-M+1>0), \ldots$, an $N^{th}$ to-be-encoded data unit group $G_N$ includes original data units $X_{N-M+1}, \ldots, X_{N-1}, X_N$, an $(N+1)^{th}$ to-be-encoded data unit group $G_{N+1}$ includes original data units $X_{N-M+2}, \ldots, X_{N-1}, X_N, X_1, \ldots$, and an $(N+M-1)^{th}$ to-be-encoded data unit group $G_{N+M-1}$ includes original data units $X_N, X_1, \ldots, X_{M-2}, X_{M-1}$. Each of the L=N+M−1 to-be-encoded data unit groups is encoded separately to obtain one encoded data unit that is in a one-to-one correspondence with each of the L=N+M−1 to-be-encoded data unit groups.

For example, an encoding kernel $[h_1, h_2, \ldots, h_M]$ may be used to encode the to-be-encoded data unit group, and an element in the encoding kernel $[h_1, h_2, \ldots, h_M]$ may be an element in the GF(q). The first to-be-encoded data unit group $G_1$ is encoded based on the encoding kernel to obtain an encoded data unit $A_1 = X_1 \times h_1, \ldots$, an $n^{th}$ to-be-encoded data unit group $G_n$ is encoded based on the encoding kernel to obtain an encoded data unit $A_n = X_n \times h_1 + X_{n-1} \times h_2 + \ldots + X_{n-M+1} \times h_M, \ldots$, an $N^{th}$ to-be-encoded data unit group $G_N$ is encoded based on the encoding kernel to obtain an encoded data unit $A_N = X_N \times h_1 + X_{N-1} \times h_2 + \ldots + X_{N-M+1} \times h_M, \ldots$, an $(N+1)^{th}$ to-be-encoded data unit group $G_{N+1}$ is encoded based on the encoding kernel to obtain an encoded data unit $A_{N+1} = X_1 \times h_1 + X_N \times h_2 + \ldots + X_{N-M+2} \times h_M, \ldots$, and an $(N+M-1)^{th}$ to-be-encoded data unit group $G_{N+M-1}$ is encoded based on the encoding kernel to obtain an encoded data unit $A_{N+M-1} = X_N \times h_M + \ldots + X_{M-2} \times h_2 + X_{M-1} \times h_1$.

When an alternative implementation 420-A is used in Part 420, in another possible implementation (implementation 1-2 for short) of the method 400, the T to-be-encoded data units include N original data units $X_1, X_2, \ldots, X_N$, and the N original data units are encoded to obtain K encoded data units $A_1, A_2, \ldots, A_K$, where K is greater than or equal to N, and the K encoded data units satisfy:

$$[A_1, A_2, \ldots, A_K] = [X_1, X_2, \ldots, X_N] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than N. When the submatrix is a square matrix, the foregoing oblique diagonals include a main diagonal of the square matrix and an oblique diagonal parallel to the main diagonal. In this case, it may be considered that the T to-be-encoded data units $O_1$, $O_2, \ldots, O_T$ in the method 400 are the N original data units $X_1, X_2, \ldots, X_N$. R=N/K may be understood as a code rate. N, K, R, and M may be collectively referred to as encoding parameters.

In the implementation 1-2, for a possible implementation of Part 410 of the method 400, refer to the descriptions in the implementation 1-1. Details are not described herein again.

In the implementation 1-2, a possible encoding matrix H satisfies:

$$H = [H_{left}^{N \times N} H_{right}^{N \times (K-N)}] = H_1$$

The encoding matrix H (which may be denoted as $H_1$) is an N*K-dimensional matrix, and includes an N*N-dimensional submatrix $H_{left}^{N \times N}$ and an N*(K−N)-dimensional submatrix $H_{right}^{N \times (K-N)}$. Non-zero elements in the GF(q) exist on a main diagonal of the submatrix $H_{left}^{N \times N}$ and M−1 oblique diagonals parallel to the main diagonal. For example, the submatrix $H_{left}^{N \times N}$ satisfies an example form of the following Table 1:

TABLE 1

| $h_1^{(1)}$ | $h_2^{(1)}$ | ... | $h_M^{(1)}$ | 0 | 0 | 0 | 0 | 0 |
|---|---|---|---|---|---|---|---|---|
| 0 | $h_1^{(2)}$ | $h_2^{(2)}$ | ... | $h_M^{(2)}$ | 0 | 0 | 0 | 0 |
| 0 | 0 | $\ddots$ | $\ddots$ | $\ddots$ | $\ddots$ | 0 | 0 | 0 |
| 0 | 0 | 0 | $h_1^{(n)}$ | $h_2^{(n)}$ | ... | $h_M^{(n)}$ | 0 | 0 |
| 0 | 0 | 0 | 0 | $\ddots$ | $\ddots$ | $\ddots$ | $\ddots$ | 0 |
| 0 | 0 | 0 | 0 | 0 | $h_1^{(N-M+1)}$ | $h_2^{(N-M+1)}$ | ... | $h_M^{(N-M+1)}$ |
| 0 | 0 | 0 | 0 | 0 | 0 | $h_1^{(N-M+2)}$ | $h_2^{(N-M+2)}$ ... | $h_{M-1}^{(N-M+2)}$ |
| 0 | 0 | 0 | 0 | 0 | 0 | $\ddots$ | $\ddots$ | $\vdots$ |
| 0 | 0 | 0 | 0 | 0 | 0 | 0 | $h_1^{(N-1)}$ | $h_2^{(N-1)}$ |
| 0 | 0 | 0 | 0 | 0 | 0 | 0 | 0 | $h_1^{(N)}$ |

In the foregoing example, elements on the main diagonal of $H_{left}^{N\times N}$ and the M−1 oblique diagonals parallel to the main diagonal may be abbreviated as $\{h_i^{(1)}, h_i^{(2)}, \ldots, h_i^{(n-i+1)}\}$, $1\le i\le M$, where when i=1, $\{h_i^{(1)}, h_i^{(2)}, \ldots, h_i^{(N-i+1)}\}$ indicates an element on the main diagonal; when i=2, ... M, $\{h_i^{(1)}, h_i^{(2)}, \ldots, h_i^{(N-i+1)}\}$ indicates an element on the M−1 oblique diagonals parallel to the main diagonal. For any $1\le i\le M$, there is at least one non-zero element in the GF(q) in $\{h_i^{(1)}, h_i^{(2)}, \ldots, h_i^{(N-i+1)}\}$. In addition, for any $1\le i\le M$, values of N−i+1 elements in $\{h_i^{(1)}, h_i^{(2)}, \ldots, h_i^{(N-i+1)}\}$ may be the same, or may be partially or completely different. When for any $1\le i\le M$, values of N−i+1 elements in $\{h_i^{(1)}, h_i^{(2)}, \ldots, h_i^{(N-i+1)}\}$ are the same, $H_{left}^{N\times N}$ is an upper triangular Toeplitz (Toeplitz) matrix. In this example, there is no special requirement on the submatrix $H_{right}^{N\times(K-N)}$ included in the foregoing H. For example, an element in $H_{right}^{N\times(K-N)}$ may be randomly obtained in the GF(q). It may be understood that when N=4 and M=2, $H_{left}^{N\times N}$ satisfying the form of Table 1 may be used to implement encoding shown in FIG. 5A.

In the implementation 1-2, another possible encoding matrix H satisfies:

$$H=[H_{left}^{N\times(N+M-1)}\,H_{right}^{N\times(K-N-M+1)}]=H_2$$

The encoding matrix H (which may be denoted as $H_2$) is an N*K-dimensional matrix, and includes an N*(N+M−1)-dimensional submatrix $H_{left}^{N\times(N+M-1)}$ and an N*(K−N−M+1)-dimensional submatrix $H_{right}^{N\times(K-N-M+1)}$. A non-zero element in the GF(q) exists on M oblique diagonals of the submatrix $H_{left}^{N\times(N+M-1)}$. For example, the submatrix $H_{left}^{N\times(N+M-1)}$ satisfies an example form of the following Table 2:

TABLE 2

|  |  |  |  |  |  |  |  |  |  |  |  |
|---|---|---|---|---|---|---|---|---|---|---|---|
| $h_1^{(1)}$ | $h_2^{(1)}$ | ... | $h_M^{(1)}$ | 0 | 0 | 0 | 0 | 0 | 0 | 0 | 0 |
| 0 | $h_1^{(2)}$ | $h_2^{(2)}$ | ... | $h_M^{(2)}$ | 0 | 0 | 0 | 0 | 0 | 0 | 0 |
| 0 | 0 | ⋱ | ⋱ | ⋱ | ⋱ | 0 | 0 | 0 | 0 | 0 | 0 |
| 0 | 0 | 0 | $h_1^{(n)}$ | $h_2^{(n)}$ | ... | $h_M^{(n)}$ | 0 | 0 | 0 | 0 | 0 |
| 0 | 0 | 0 | 0 | ⋱ | ⋱ | ⋱ | ⋱ | 0 | 0 | 0 | 0 |
| 0 | 0 | 0 | 0 | 0 | $h_1^{(N-M+1)}$ | $h_2^{(N-M+1)}$ | ... | $h_M^{(N-M+1)}$ | 0 | 0 | 0 |
| 0 | 0 | 0 | 0 | 0 | 0 | $h_1^{(N-M+2)}$ | $h_2^{(N-M+2)}$ | ... | $h_{M-1}^{(N-M+2)}$ | $h_M^{(N-M+2)}$ | 0 |
| 0 | 0 | 0 | 0 | 0 | 0 | ⋱ | ⋱ | ⋱ | ⋱ | 0 | 0 |
| 0 | 0 | 0 | 0 | 0 | 0 | 0 | $h_1^{(N-1)}$ | $h_2^{(N-1)}$ | ... | $h_M^{(N-1)}$ | 0 |
| 0 | 0 | 0 | 0 | 0 | 0 | 0 | 0 | $h_1^{(N)}$ | $h_2^{(N)}$ | ... | $h_M^{(N)}$ |

In the foregoing example, an element on an $i^{th}$ oblique diagonal in $H_{left}^{N\times(N+M-1)}$ may be abbreviated as $\{h_i^{(1)}, h_i^{(2)}, \ldots, h_i^{(N)}\}$, $1\le i\le M$. For any $1\le i\le M$, there is at least one non-zero element in the GF(q) in $\{h_i^{(1)}, h_i^{(2)}, \ldots, h_i^{(N)}\}$. In addition, for any $1\le i\le M$, values of N elements in $\{h_i^{(1)}, h_i^{(2)}, \ldots, h_i^{(N)}\}$ may be the same, or may be partially or completely different. In this example, there is no special requirement on the submatrix $H_{right}^{N\times(K-N-M+1)}$ included in the foregoing H. For example, an element in $H_{right}^{N\times(K-N-M+1)}$ may be randomly obtained in the GF(q). It may be understood that when N=4 and M=2, $H_{left}^{N\times(N+M-1)}$ satisfying the form of Table 2 may be used to implement encoding shown in FIG. 5B.

For another example, the submatrix $H_{left}^{N\times(N+M-1)}$ satisfies an example form of the following Table 3:

TABLE 3

|  |  |  |  |  |  |  |  |  |  |  |  |
|---|---|---|---|---|---|---|---|---|---|---|---|
| $h_1^{(1)}$ | $h_2^{(1)}$ | ... | $h_M^{(1)}$ | 0 | 0 | 0 | 0 | 0 | $h_1^{(N+1)}$ | ... | $h_{M-1}^{(N+1)}$ |
| 0 | $h_1^{(2)}$ | $h_2^{(2)}$ | ... | $h_M^{(2)}$ | 0 | 0 | 0 | 0 | 0 | ⋱ | ⋮ |
| 0 | 0 | ⋱ | ⋱ | ⋱ | ⋱ | 0 | 0 | 0 | 0 | 0 | $h_1^{(N+M-1)}$ |
| 0 | 0 | 0 | $h_1^{(n)}$ | $h_2^{(n)}$ | ... | $h_M^{(n)}$ | 0 | 0 | 0 | 0 | 0 |
| 0 | 0 | 0 | 0 | ⋱ | ⋱ | ⋱ | ⋱ | 0 | 0 | 0 | 0 |
| 0 | 0 | 0 | 0 | 0 | $h_1^{(N-M+1)}$ | $h_2^{(N-M+1)}$ | ... | $h_M^{(N-M+1)}$ | 0 | 0 | 0 |
| 0 | 0 | 0 | 0 | 0 | 0 | $h_1^{(N-M+2)}$ | $h_2^{(N-M+2)}$ | $h_{M-1}^{(N-M+2)}$ | $h_M^{(N-M+2)}$ | 0 | 0 |
| 0 | 0 | 0 | 0 | 0 | 0 | ⋱ | ⋱ | ⋱ | ⋱ | 0 | 0 |
| 0 | 0 | 0 | 0 | 0 | 0 | 0 | $h_1^{(N-1)}$ | $h_2^{(N-1)}$ | ... | $h_M^{(N-1)}$ | 0 |
| 0 | 0 | 0 | 0 | 0 | 0 | 0 | 0 | $h_1^{(N)}$ | $h_2^{(N)}$ | ... | $h_M^{(N)}$ |

In the foregoing example, at least one non-zero element in the GF(q) exists on an oblique diagonal shown in $H_{left}^{N\times(N+M-1)}$. In addition, values of elements on any shown oblique diagonal may be the same, or may be partially or completely different. In this example, there is no special requirement on the submatrix $H_{right}^{N\times(K-N-M+1)}$ included in the foregoing H. For example, an element in $H_{right}^{N\times(K-N-M+1)}$ may be randomly obtained in the GF(q). It may be understood that when N=4 and M=2, $H_{left}^{N\times(N+M-1)}$ satisfying the form of Table 3 may be used to implement encoding shown in FIG. 5C.

In the implementation 1-2, another possible encoding matrix H satisfies:

$$H=[I_N H']=H_3$$

$I_N$ is an N*N-dimensional identity matrix. The matrix H' is $H_1$ or $H_2$, the matrix H' includes one or more column vectors in $H_1$, or the matrix H' includes one or more column vectors in $H_2$.

In the implementation 1-2, optionally, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

Optionally, in the implementation 1-2, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, or identification information of an original data unit (for example, an index of the original data unit) correspond-ing to an encoding start location. In a multi-hop system, the header information may further include identification infor-mation of a transmitting end.

In another possible implementation (implementation 2-1 for short) of the method 400, the T to-be-encoded data units include N original data units and P interleaved data units, each of the L to-be-encoded data unit groups includes at most M original data units and/or interleaved data units in the N original data units and the P interleaved data units, N is an integer greater than 1, P is an integer greater than 1, and M is an integer greater than 0 and less than N+P. This implementation may be understood as that in the method 400, T is equal to N+P, and the to-be-encoded data unit is an original data unit and/or an interleaved data unit. N, P, L, and M may be collectively referred to as encoding parameters.

In the implementation 2-1, Part 410 of the method 400 may be implemented as: obtaining the N original data units and the P interleaved data units. For example, the N original data units are obtained by dividing PDUs from a protocol layer. The protocol layer may be an RLC layer, a PDCP layer, an RRC layer, a BAP layer, a MAC layer, an appli-cation layer, or the like in a communication protocol. For another example, the N original data units may be received from another apparatus (for example, another network device or terminal). The P interleaved data units may be obtained by interleaving or re-arranging all or some of the N original data units. For example, the P interleaved data units may be obtained by interleaving all or some of the N original data units by using an interleaved matrix.

In the implementation 2-1, optionally, the quantity L of the to-be-encoded data unit groups satisfies N+P≤L≤N+P+ M−1. Optionally, in Part 420 of the method 400, the obtain-ing one or more encoded data units that are in a one-to-one correspondence with each of the L to-be-encoded data unit groups is implemented as: obtaining one encoded data unit that is in a one-to-one correspondence with each of the L to-be-encoded data unit groups.

In the implementation 2-1, optionally, each of the L to-be-encoded data unit groups does not simultaneously include the first data unit and the last data unit in the N+P original data units and interleaved data units, which may be understood as that a cyclic shift (that is, an end-around cyclic shift) is not performed when the sliding window slides. Alternatively, one or more of the L to-be-encoded data unit groups include the first data unit and the last data unit in the N+P original data units and interleaved data units, which may be understood as that a cyclic shift is performed on the sliding window. Whether the first data unit or the last data unit is an original data unit or an interleaved data unit depends on arrangement of the original data units and the interleaved data units. This is not limited in this application.

The foregoing implementation 2-1 may be understood as interleaving the N original data units and then obtaining the to-be-encoded data unit groups through division. In addition to reducing correlation of the encoded data, interleaving can further improve the capability of the encoded data against the channel fading and the channel change, to further improve the receiving reliability of the encoded data and improve the spectral efficiency.

Optionally, in the implementation 2-1, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

Optionally, in the implementation 2-1, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In a possible implementation method of the implementa-tion 2-1, the L to-be-encoded data unit groups may be obtained in a sliding window manner, and each of the L to-be-encoded data unit groups is encoded separately to obtain one encoded data unit that is in a one-to-one corre-spondence with each of the L to-be-encoded data unit groups. It may be understood that the L to-be-encoded data unit groups obtained in the sliding window manner include all original data units and interleaved data units in the N original data units and the P interleaved data units. In this case, M may be understood as a maximum quantity of original data units and/or interleaved data units that can be included in a sliding window.

Optionally, when each of the L to-be-encoded data unit groups does not simultaneously include the first data unit and the last data unit in the N+P original data units and interleaved data units, it may be understood as that a cyclic shift (that is, an end-around cyclic shift) is not performed when the sliding window slides. When one or more of the L to-be-encoded data unit groups include the first data unit and the last data unit in the N+P original data units and interleaved data units, it may be understood as that a cyclic shift is performed on the sliding window.

Figure 6A:
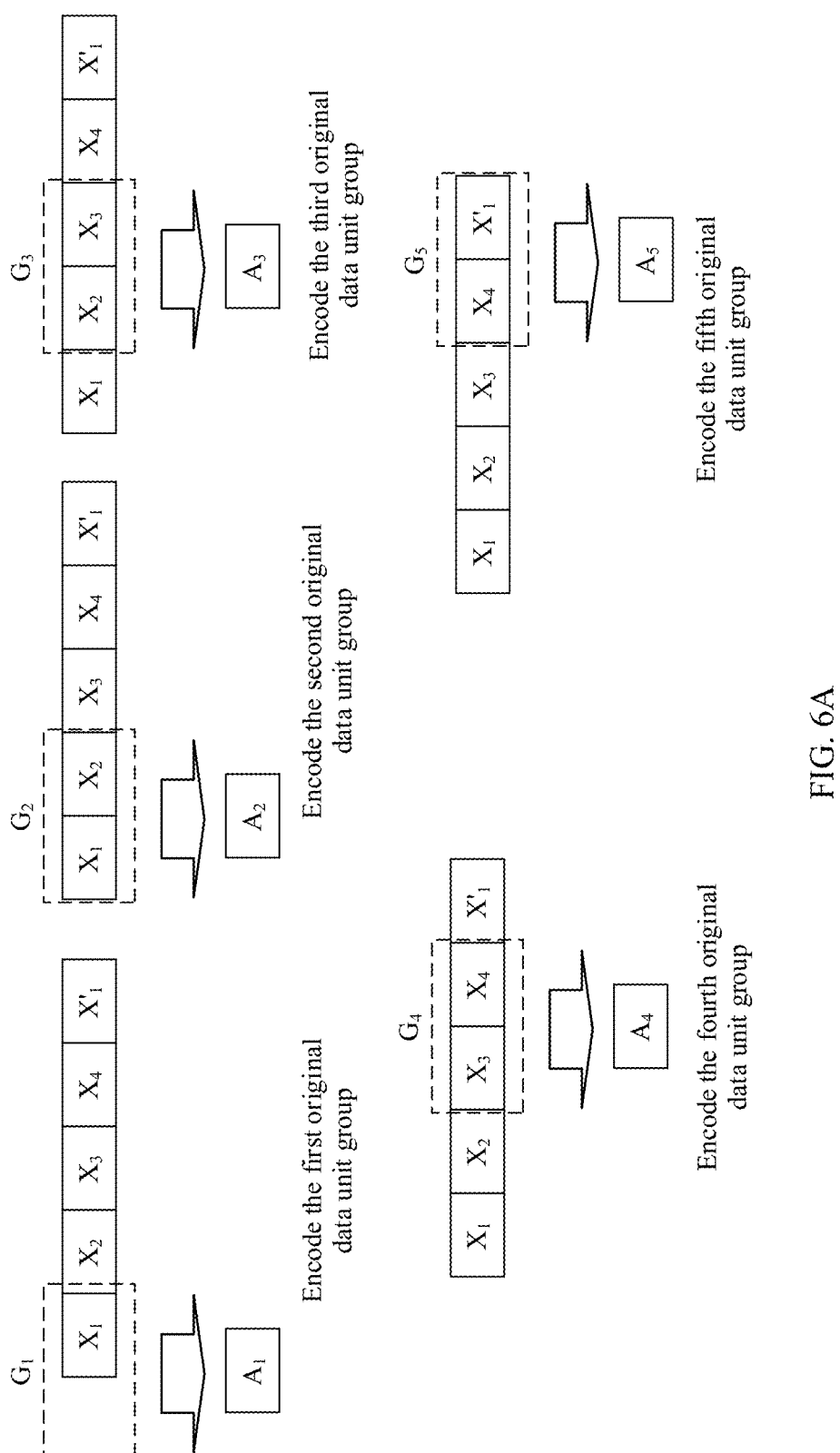

In FIG. 6A, an example in which N=4 original data units, P=1 interleaved data unit, each to-be-encoded data unit group includes at most M=2 original data units and/or interleaved data units in the N=4 original data units and the P=1 interleaved data unit, there are L=N+P=5 to-be-encoded data unit groups, and a cyclic shift is not performed on a sliding window is used to describe a specific implementation of the foregoing implementation 2-1 in a sliding window manner.

In FIG. 6A, the N=4 original data units are respectively represented as $X_1$, $X_2$, $X_3$, $X_4$, the P=1 interleaved data unit is represented as $X_1'$, a dashed-line box represents the sliding window, and $G_1$, $G_2$, $G_3$, $G_4$, $G_5$ respectively represent the L=N+P=5 to-be-encoded data unit groups. The first to-be-encoded data unit group $G_1$ includes an original data unit $X_1$, the second to-be-encoded data unit group $G_2$ includes original data units $X_1$ and $X_2$, the third to-be-encoded data unit group $G_3$ includes original data units $X_2$ and $X_3$, the fourth to-be-encoded data unit group $G_4$ includes original data units $X_3$ and $X_4$, and the fifth to-be-encoded data unit group $G_5$ includes an original data unit $X_4$ and an interleaved data unit $X_1'$. Original data units and/or interleaved data units included in the five to-be-encoded data unit groups in FIG. 6A may also be understood as original data units and/or interleaved data units included in the sliding window. The sliding window shown in FIG. 6A can include at most M=2 original data units and/or interleaved data units, and the sliding window slides rightward at a granularity of an original data unit or an interleaved data unit starting from a location including only $X_1$, to obtain the five to-be-encoded data unit groups $G_1$, $G_2$, $G_3$, $G_4$, $G_5$.

In FIG. 6A, the five to-be-encoded data unit groups $G_1$, $G_2$, $G_3$, $G_4$, $G_5$ each are encoded separately to obtain one encoded data unit that is in a one-to-one correspondence with each to-be-encoded data unit group. Specifically, the original data unit $X_1$ in $G_1$ is encoded to obtain an encoded data unit $A_1$ corresponding to $G_1$, the original data units $X_1$ and $X_2$ in $G_2$ are encoded to obtain an encoded data unit $A_2$ corresponding to $G_2$, the original data units $X_2$ and $X_3$ in $G_3$ are encoded to obtain an encoded data unit $A_3$ corresponding to $G_3$, the original data units $X_3$ and $X_4$ in $G_4$ are encoded to obtain an encoded data unit $A_4$ corresponding to $G_4$, and the original data unit $X_4$ and the interleaved data unit $X_1'$ in $G_5$ are encoded to obtain an encoded data unit $A_5$ corresponding to $G_5$.

For example, an encoding kernel $[h_1, h_2, \ldots, h_M]$ may be used to encode the to-be-encoded data unit group, and an element in the encoding kernel $[h_1, h_2, \ldots, h_M]$ may be an element in the GF(q). When M=2, based on an encoding kernel $[h_1, h_2]$, $G_1$ is encoded to obtain an encoded data unit $A_1 = X_1 \times h_1$, $G_2$ is encoded to obtain an encoded data unit $A_2 = X_2 \times h_1 + X_1 \times h_2$, $G_3$ is encoded to obtain an encoded data unit $A_3 = X_3 \times h_1 + X_2 \times h_2$, $G_4$ is encoded to obtain an encoded data unit $A_4 = X_4 \times h_1 + X_3 \times h_2$, and $G_5$ is encoded to obtain an encoded data unit $A_5 = X_1' \times h_1 + X_4 \times h_2$.

Figure 6B:
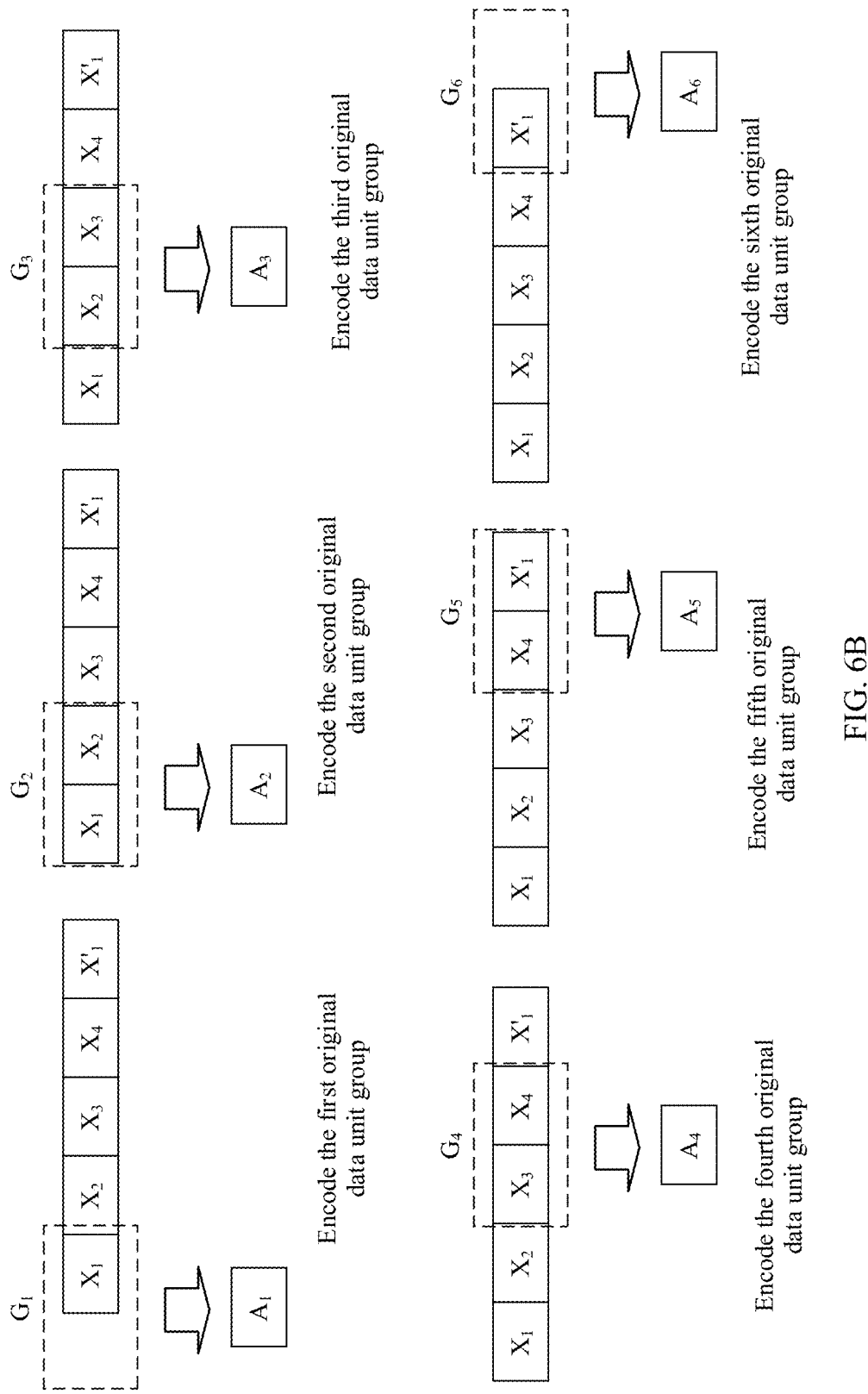

In FIG. 6B, an example in which N=4 original data units, P=1 interleaved data unit, each to-be-encoded data unit group includes at most M=2 original data units and/or interleaved data units in the N=4 original data units and the P=1 interleaved data unit, there are L=N+P+M−1=6 to-be-encoded data unit groups, and a cyclic shift is not performed on a sliding window is used to describe another specific implementation of the foregoing implementation 2-1 in a sliding window manner.

A difference between FIG. 6B and FIG. 6A lies in that the sliding window slides one more time, the sixth to-be-encoded data unit group $G_6$ is added, and $G_6$ includes an interleaved data unit $X_1'$.

In FIG. 6B, the six to-be-encoded data unit groups $G_1$, $G_2$, $G_3$, $G_4$, $G_5$, $G_6$ each are encoded separately to obtain one encoded data unit that is in a one-to-one correspondence with each to-be-encoded data unit group. Specifically, an original data unit $X_1$ in $G_1$ is encoded to obtain an encoded data unit $A_1$ corresponding to $G_1$, original data units $X_1$ and $X_2$ in $G_2$ are encoded to obtain an encoded data unit $A_2$ corresponding to $G_2$, original data units $X_2$ and $X_3$ in $G_3$ are encoded to obtain an encoded data unit $A_3$ corresponding to $G_3$, original data units $X_3$ and $X_4$ in $G_4$ are encoded to obtain an encoded data unit $A_4$ corresponding to $G_4$, an original data unit $X_4$ and an interleaved data unit $X_1'$ in $G_5$ are encoded to obtain an encoded data unit $A_5$ corresponding to $G_5$, and the interleaved data unit $X_1'$ in $G_6$ is encoded to obtain an encoded data unit $A_6$ corresponding to $G_6$.

For example, an encoding kernel $[h_1, h_2, \ldots, h_M]$ may be used to encode the to-be-encoded data unit group, and an element in the encoding kernel $[h_1, h_2, \ldots, h_M]$ may be an element in the GF(q). When M=2, based on an encoding kernel $[h_1, h_2]$, $G_1$ is encoded to obtain an encoded data unit $A_1 = X_1 \times h_1$, $G_2$ is encoded to obtain an encoded data unit $A_2 = X_2 \times h_1 + X_1 \times h_2$, $G_3$ is encoded to obtain an encoded data unit $A_3 = X_3 \times h_1 + X_2 \times h_2$, $G_4$ is encoded to obtain an encoded data unit $A_4 = X_4 \times h_1 + X_3 \times h_2$, $G_5$ is encoded to obtain an encoded data unit $A_5 = X_1' \times h_1 + X_4 \times h_2$, and $G_6$ is encoded to obtain an encoded data unit $A_6 = X_1' \times h_2$.

Figure 6C:
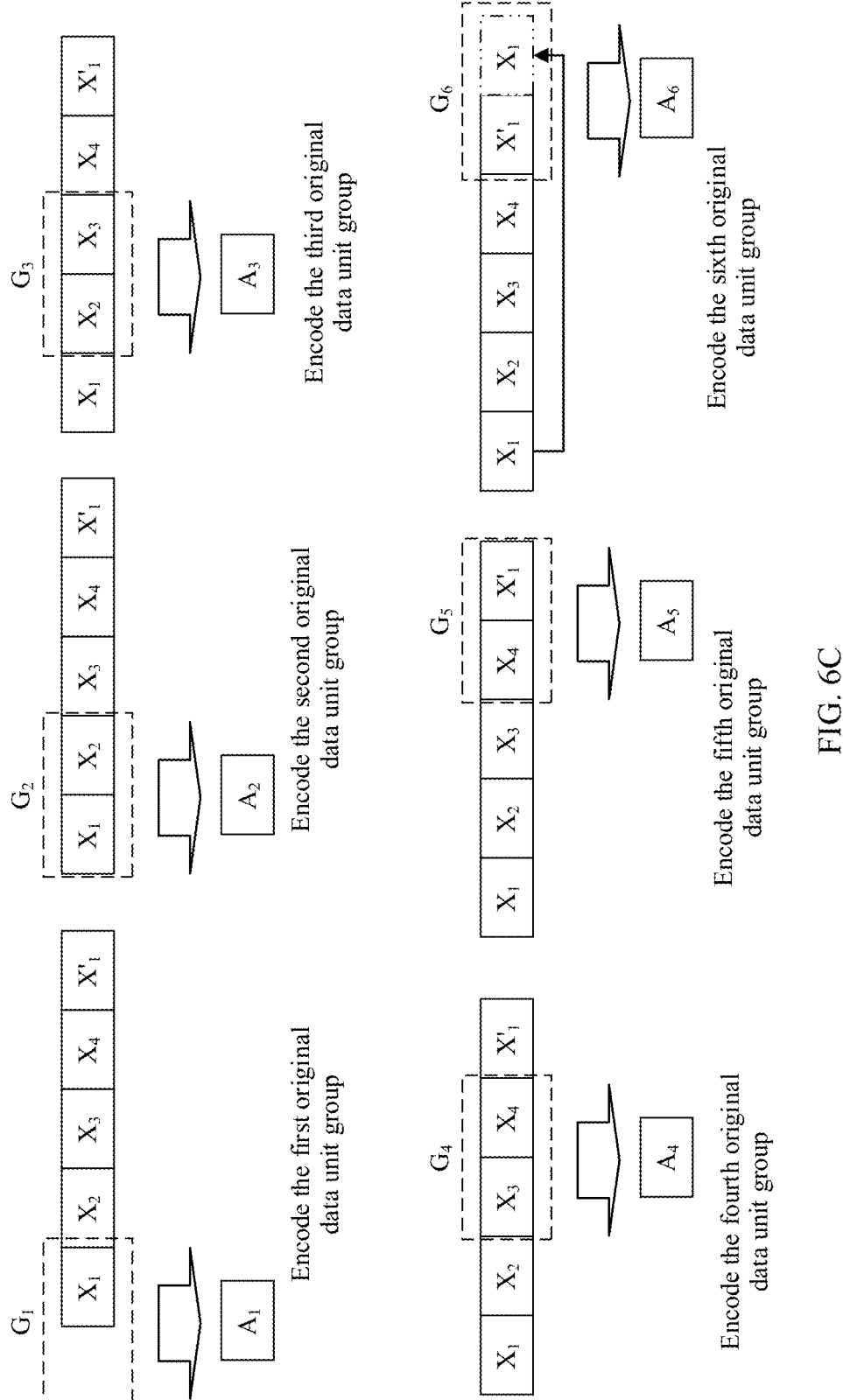

In FIG. 6C, an example in which N=4 original data units, P=1 interleaved data unit, each to-be-encoded data unit group includes at most M=2 original data units and/or interleaved data units in the N=4 original data units and the P=1 interleaved data unit, there are L=N+P+M−1=6 to-be-encoded data unit groups, and a cyclic shift is performed on a sliding window is used to describe another specific implementation of the foregoing implementation 2-1 in a sliding window manner.

A difference between FIG. 6C and FIG. 6B lies in that the sixth to-be-encoded data unit group $G_6$ includes an interleaved data unit $X_1'$ and an original data unit $X_1$. This may be considered that the cyclic shift is performed when the sliding window is shifted to a location of the sixth to-be-encoded data unit group $G_6$, that is, the first original data unit $X_1$ is cyclically shifted to the sixth to-be-encoded data unit group $G_6$.

In FIG. 6C, the six to-be-encoded data unit groups $G_1$, $G_2$, $G_3$, $G_4$, $G_5$, $G_6$ each are encoded separately to obtain one encoded data unit that is in a one-to-one correspondence with each to-be-encoded data unit group. Specifically, the original data unit $X_1$ in $G_1$ is encoded to obtain an encoded data unit $A_1$ corresponding to $G_1$, original data units $X_1$ and $X_2$ in $G_2$ are encoded to obtain an encoded data unit $A_2$ corresponding to $G_2$, original data units $X_2$ and $X_3$ in $G_3$ are encoded to obtain an encoded data unit $A_3$ corresponding to $G_3$, original data units $X_3$ and $X_4$ in $G_4$ are encoded to obtain an encoded data unit $A_4$ corresponding to $G_4$, the original data unit $X_4$ and the interleaved data unit $X_1'$ in $G_5$ are encoded to obtain an encoded data unit $A_5$ corresponding to $G_5$, and the interleaved data unit $X_1'$ and the original data unit $X_1$ in $G_6$ are encoded to obtain an encoded data unit $A_6$ corresponding to $G_6$.

For example, an encoding kernel $[h_1, h_2, \ldots, h_M]$ may be used to encode the to-be-encoded data unit group, and an element in the encoding kernel $[h_1, h_2, \ldots, h_M]$ may be an element in the GF(q). When M=2, based on an encoding kernel $[h_1, h_2]$, $G_1$ is encoded to obtain an encoded data unit $A_1 = X_1 \times h_1$, $G_2$ is encoded to obtain an encoded data unit $A_2 = X_2 \times h_1 + X_1 \times h_2$, $G_3$ is encoded to obtain an encoded data unit $A_3 = X_3 \times h_1 + X_2 \times h_2$, $G_4$ is encoded to obtain an encoded data unit $A_4 = X_4 \times h_1 + X_3 \times h_2$, $G_5$ is encoded to obtain an encoded data unit $A_5 = X_1' \times h_1 + X_4 \times h_2$, and $G_6$ is encoded to obtain an encoded data unit $A_6 = X_1' \times h_1 + X_1' \times h_2$.

In FIG. 6A to FIG. 6C, the original data unit $X_1$ and the interleaved data unit $X_1$ may be respectively understood as the first data unit and the last data unit in the foregoing implementation 2-1. However, in this application, the arrangement of the original data unit and the interleaved data unit in FIG. 6A to FIG. 6C is merely used as an example to illustrate the foregoing implementation 2-1. The arrangement of the original data unit and the interleaved data unit is not limited in this application. When the original data unit and the interleaved data unit have another arrangement, the first data unit and the last data unit may alternatively be other data units. For example, the first data unit and the last data unit may be respectively an original data unit and an original data unit, the first data unit and the last data unit may be respectively an interleaved data unit and an interleaved data unit, the first data unit and the last data unit may be respectively an interleaved data unit and an original data unit, or the first data unit and the last data unit may be respectively an original data unit and an interleaved data unit.

When an alternative implementation 420-A is used in Part 420, in another possible implementation (implementation 2-2 for short) of the method 400, the T to-be-encoded data units include N original data units $X_1, X_2, \ldots, X_N$ and P interleaved data units $X_1', X_2', \ldots, X_P'$, the N original data units and the P interleaved data units are encoded to obtain K encoded data units $A_1, A_2, \ldots, A_K$, K is greater than or equal to N+P, and the K encoded data units satisfy:

$$[A_1, A_2, \ldots, A_K] = [X_1, X_2, \ldots, X_N, X_1', X_2', \ldots, X_P'] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than N+P. When the submatrix is a square matrix, the foregoing oblique diagonals include a main diagonal of the square matrix and an oblique diagonal parallel to the main diagonal. In this case, it may be considered that the T to-be-encoded data units $O_1, O_2, \ldots, O_T$ in the method 400 are the N original data units $X_1, X_2, \ldots, X_N$ and the P interleaved data units $X_1', X_2', \ldots, X_P'$. It may be understood that an arrangement sequence of the N original data units and the P interleaved data units in $[X_1, X_2, \ldots, X_N, X_1', X_2', \ldots, X_P']$ is not limited in this application, and $[X_1, X_2, \ldots, X_N, X_1', X_2', \ldots, X_P']$ indicates that the N original data units and the P interleaved data units are included. However, the N+P data units may be arranged in any sequence. This is not limited in this application. R=N/K may be understood as a code rate. N, K, R, and M may be collectively referred to as encoding parameters.

In the implementation 2-2, for a possible implementation of Part 410 of the method 400, refer to the descriptions in the implementation 2-1. Details are not described herein again.

In the implementation 2-2, a possible encoding matrix H satisfies:

$$H = [H_{left}^{(N+P) \times (N+P)} H_{right}^{(N+P) \times (K-N-P)}] = H_4$$

The encoding matrix H (which may be denoted as $H_4$) is an (N+P)*K-dimensional matrix, and includes an (N+P)*(N+P)-dimensional submatrix $H_{left}^{(N+P) \times (N+P)}$ and an (N+P)*(K-N-P)-dimensional submatrix $H_{right}^{(N+P) \times (K-N-P)}$. Non-zero elements in the GF(q) exist on a main diagonal of the submatrix $H_{left}^{(N+P) \times (N+P)}$ and M-1 oblique diagonals parallel to the main diagonal. For example, $H_{left}^{(N+P) \times (N+P)}$ has a form similar to that of the matrix shown in Table 1, but dimensions are changed from N*N dimensions shown in Table 1 to (N+P)*(N+P) dimensions. In this example, there is no special requirement on the submatrix $H_{right}^{(N+P) \times (K-N-P)}$ included in the foregoing H. For example, an element in $H_{right}^{(N+P) \times (K-N-P)}$ may be randomly obtained in the GF(q). It may be understood that when N=4, P=1, and M=2, $H_{left}^{(N+P) \times (N+P)}$ satisfying the form of Table 1 may be used to implement encoding shown in FIG. 6A.

In the implementation 2-2, another possible encoding matrix H satisfies:

$$H = [H_{left}^{(N+P) \times (N+P+M-1)} H_{right}^{(N+P) \times (K-N-P-M+1)}] = H_5$$

The encoding matrix H (which may be denoted as $H_5$) is an (N+P)*K-dimensional matrix, and includes an (N+P)*(N+P+M-1)-dimensional submatrix $H_{left}^{(N+P) \times (N+P+M-1)}$ and an (N+P)*(K-N-P-M+1)-dimensional submatrix $H_{right}^{(N+P) \times (K-N-P-M+1)}$. A non-zero element in the GF(q) exists on M oblique diagonals of the submatrix $H_{left}^{(N+P) \times (N+P+M-1)}$.

For example, $H_{left}^{(N+P) \times (N+P+M-1)}$ has a form similar to that of the matrix shown in Table 2, but dimensions are changed from N*(N+M-1) dimensions shown in Table 2 to (N+P)*(N+P+M-1) dimensions. In this example, there is no special requirement on the submatrix $H_{right}^{(N+P) \times (K-N-P-M+1)}$ included in the foregoing H. For example, an element in $H_{right}^{(N+P) \times (K-N-P-M+1)}$ may be randomly obtained in the GF(q). It may be understood that when N=4, P=1, and M=2, $H_{left}^{(N+P) \times (N+P+M-1)}$ satisfying the form of Table 2 may be used to implement encoding shown in FIG. 6B.

For another example, $H_{left}^{(N+P) \times (N+P+M-1)}$ has a form similar to that of the matrix shown in Table 3, but dimensions are changed from N*(N+M-1) dimensions shown in Table 3 to (N+P)*(N+P+M-1) dimensions. In this example, there is no special requirement on the submatrix $H_{right}^{(N+P) \times (K-N-P-M+1)}$ included in the foregoing H. For example, an element in $H_{right}^{(N+P) \times (K-N-P-M+1)}$ may be randomly obtained in the GF(q). It may be understood that when N=4, P=1, and M=2, $H_{left}^{(N+P) \times (N+P+M-1)}$ satisfying the form of Table 3 may be used to implement encoding shown in FIG. 6C.

In the implementation 2-2, another possible encoding matrix H satisfies:

$$H = [I_{N+P} H'] = H_6$$

$I_{N+P}$ is an (N+P)*(N+P)-dimensional identity matrix. The matrix H' is $H_4$ or $H_5$, the matrix H' includes one or more column vectors in $H_4$, or the matrix H' includes one or more column vectors in $H_5$.

In the implementation 2-2, optionally, the N original data units are included in B original data blocks, and B is an integer greater than 1. In the optional implementation, inter-block joint encoding can be performed on original data units included in two or more original data blocks, and therefore inter-block transmission error correction can be supported, to further improve encoding reliability and a capability of data transmission against a channel random error, and further improve the spectral efficiency.

Optionally, in the implementation 2-2, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In another possible implementation (implementation 3-1 for short) of the method 400, the T to-be-encoded data units include B original data blocks, each of the L to-be-encoded data unit groups includes at most M original data blocks in the B original data blocks, B is an integer greater than 1, and M is an integer greater than 0 and less than B. This implementation may be understood as that in the method 400, T is equal to B, and the to-be-encoded data unit is an original data block. The original data block may be usually understood as a to-be-encoded data unit larger than an original data unit. For example, the B original data blocks may include original data units, where a $b^{th}$ original data block includes $N_b$ original data units, and b is an integer greater than 0 and less than or equal to B. Alternatively, the original data block may include an original data unit and an interleaved data unit, where a $b^{th}$ original data block includes $N_b$ original data units and interleaved data units, and b is an integer greater than 0 and less than or equal to B. B, L, $N_b$, and M may be collectively referred to as encoding parameters. When the original data block includes an interleaved data unit, interleaving can further improve the capability of the encoded data against the channel fading and the channel change, to further improve the receiving reliability of the encoded data and improve the spectral efficiency.

In the implementation 3-1, Part 410 of the method 400 may be implemented as: obtaining the B original data blocks. For example, the B original data blocks are obtained by dividing PDUs from a protocol layer. The protocol layer may be an RLC layer, a PDCP layer, an RRC layer, a BAP layer, a MAC layer, an application layer, or the like in a communication protocol. For another example, the B original data blocks may be received from another apparatus (for example, another network device or terminal). When the B original data blocks include an interleaved data unit, the interleaved data unit may be obtained by interleaving or re-arranging all or some original data units included in the original data blocks. For example, the interleaved data unit in the original data blocks may be obtained by interleaving all or some original data units in the original data blocks by using an interleaved matrix.

In the implementation 3-1, optionally, the quantity L of the to-be-encoded data unit groups satisfies B≤L≤B+M−1. Optionally, in Part 420 of the method 400, the obtaining one or more encoded data units that are in a one-to-one correspondence with each of the L to-be-encoded data unit groups is implemented as: obtaining a plurality of encoded data units that are in a one-to-one correspondence with each of the L to-be-encoded data unit groups.

In the implementation 3-1, optionally, each of the L to-be-encoded data unit groups does not simultaneously include the first original data block and the last original data block in the B original data blocks. Alternatively, the one or more of the L to-be-encoded data unit groups include the first original data block and the last original data block in the B original data blocks.

The foregoing implementation 3-1 may be understood as dividing the B original data blocks into the L to-be-encoded data unit groups, and separately encoding the L to-be-encoded data unit groups, where L satisfies B≤L≤B+M−1. In this implementation, M may also be understood as an inter-block convolution depth. In this implementation 3-1, selective inter-block joint encoding can be performed on original data units included in two or more original data blocks, and therefore inter-block transmission error correction can be supported, to further improve encoding reliability and a capability of data transmission against a channel random error, and further improve the spectral efficiency.

Optionally, in the implementation 3-1, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In a possible implementation method of the implementation 3-1, the L to-be-encoded data unit groups may be obtained in a sliding window manner, and each of the L to-be-encoded data unit groups is encoded separately to obtain a plurality of encoded data units that are in a one-to-one correspondence with each of the L to-be-encoded data unit groups. It may be understood that the L to-be-encoded data unit groups obtained in the sliding window manner include all original data blocks in the B original data blocks. In this case, M may be understood as a maximum quantity of original data blocks that can be included in a sliding window.

Optionally, when each of the L to-be-encoded data unit groups does not simultaneously include the first original data block and the last original data block in the B original data blocks, it may be understood as that a cyclic shift (that is, an end-around cyclic shift) is not performed when the sliding window slides. When one or more of the L to-be-encoded data unit groups include the first original data block and the last original data block in the B original data blocks, it may be understood as that a cyclic shift is performed on the sliding window.

When the original data unit in the original data block is encoded, a plurality of different implementations may be used.

For example, the method for encoding the original data unit in the implementation 1-1 may be used. For details, refer to the descriptions in the implementation 1-1. Details are not described herein again.

For another example, the original data unit in the original data block may be encoded by using RLNC or a systematic code.

For another example, the original data unit in the original data block may alternatively be encoded in an overlapping encoding manner. The overlapping (overlapping) encoding means that all original data units in a part of original data blocks in a plurality of original data blocks are encoded and a part of original data units in the other part of original data blocks in the plurality of original data blocks. A specific encoding manner may be the RLNC, the systematic code, or the method described in the implementation 1-1.

Figure 7A:
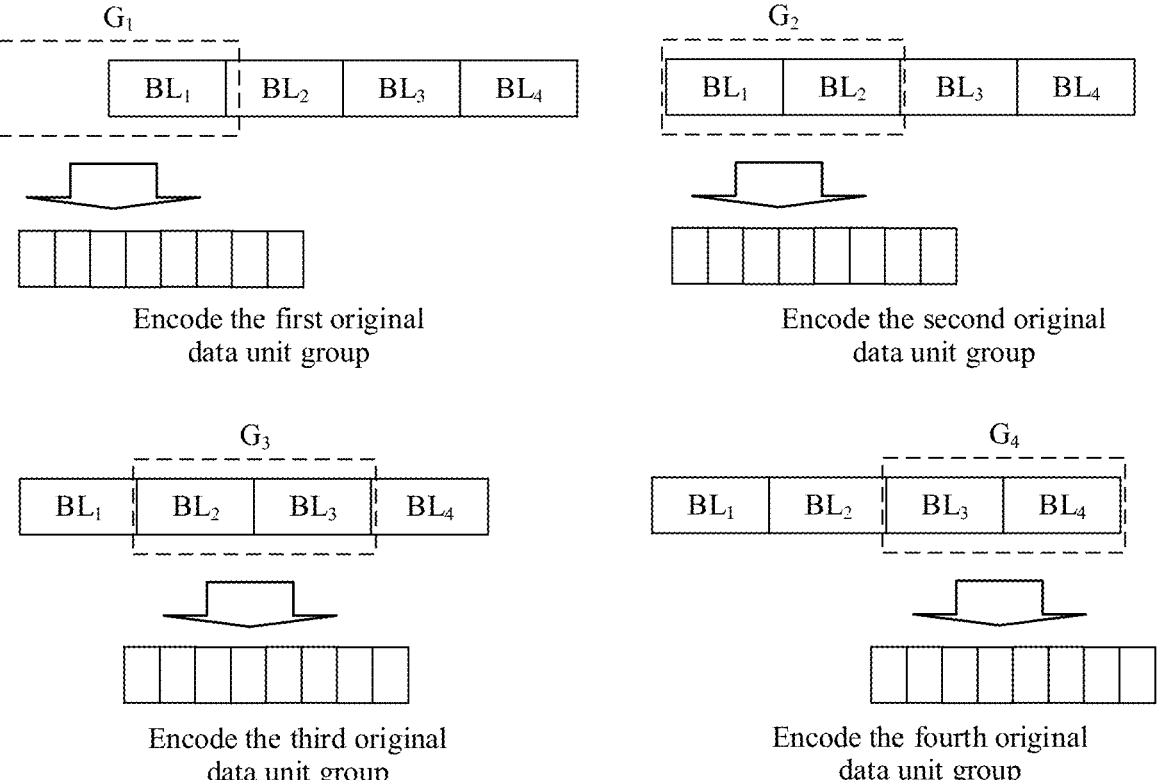

In FIG. 7A, an example in which B=4 original data blocks, each to-be-encoded data unit group includes at most M=2 original data blocks in the B=4 original data blocks, there are L=B=4 to-be-encoded data unit groups, and a cyclic shift is not performed on a sliding window is used to describe a specific implementation of the foregoing implementation 3-1 in a sliding window manner.

In FIG. 7A, the B=4 original data blocks are respectively represented as $BL_1$, $BL_2$, $BL_3$, $BL_4$, a $b^{th}$ original data block $BL_b$ includes $N_b$ original data units (1≤b≤4, and $N_b$>1), a dashed-line box represents the sliding window, and $G_1$, $G_2$, $G_3$, $G_4$ respectively represent the L=B=4 to-be-encoded data unit groups. The first to-be-encoded data unit group $G_1$ includes an original data block $BL_1$, the second to-be-encoded data unit group $G_2$ includes original data blocks $BL_1$ and $BL_2$, the third to-be-encoded data unit group $G_3$ includes original data blocks $BL_2$ and $BL_3$, and the fourth to-be-encoded data unit group $G_4$ includes original data blocks $BL_3$ and $BL_4$. Original data blocks included in the four to-be-encoded data unit groups in FIG. 7A may also be understood as original data blocks included in the sliding window. The sliding window shown in FIG. 7A can include at most M=2 original data blocks, and the sliding window slides rightward at a granularity of an original data block starting from a location including only $BL_1$, to obtain the four to-be-encoded data unit groups $G_1$, $G_2$, $G_3$, $G_4$.

In FIG. 7A, the four to-be-encoded data unit groups $G_1$, $G_2$, $G_3$, $G_4$ each are encoded separately to obtain a plurality of encoded data units that are in a one-to-one correspondence with each to-be-encoded data unit group. Specifically, the original data block $BL_1$ in $G_1$ is encoded to obtain a plurality of encoded data units corresponding to $G_1$, the original data blocks $BL_1$ and $BL_2$ in $G_2$ are encoded to obtain a plurality of encoded data units corresponding to $G_2$, the original data blocks $BL_2$ and $BL_3$ in $G_3$ are encoded to obtain a plurality of encoded data units corresponding to $G_3$, and the original data blocks $BL_3$ and $BL_4$ in $G_4$ are encoded to obtain a plurality of encoded data units corresponding to $G_4$. In FIG. 7A, an example in which a quantity of the plurality of encoded data units that are obtained through encoding and that correspond to each to-be-encoded data unit group is 8 is used to illustrate this implementation. It may be understood that this application does not limit the quantity of the plurality of encoded data units that are obtained in this implementation and that correspond to each to-be-encoded data unit group, and does not limit whether quantities of the plurality of encoded data units that are obtained and that correspond to various to-be-encoded data unit groups are the same. For example, quantities of the plurality of encoded data units that are obtained and that correspond to various to-be-encoded data unit groups may be the same, or may be partially the same, or may be completely different.

Figure 7B:
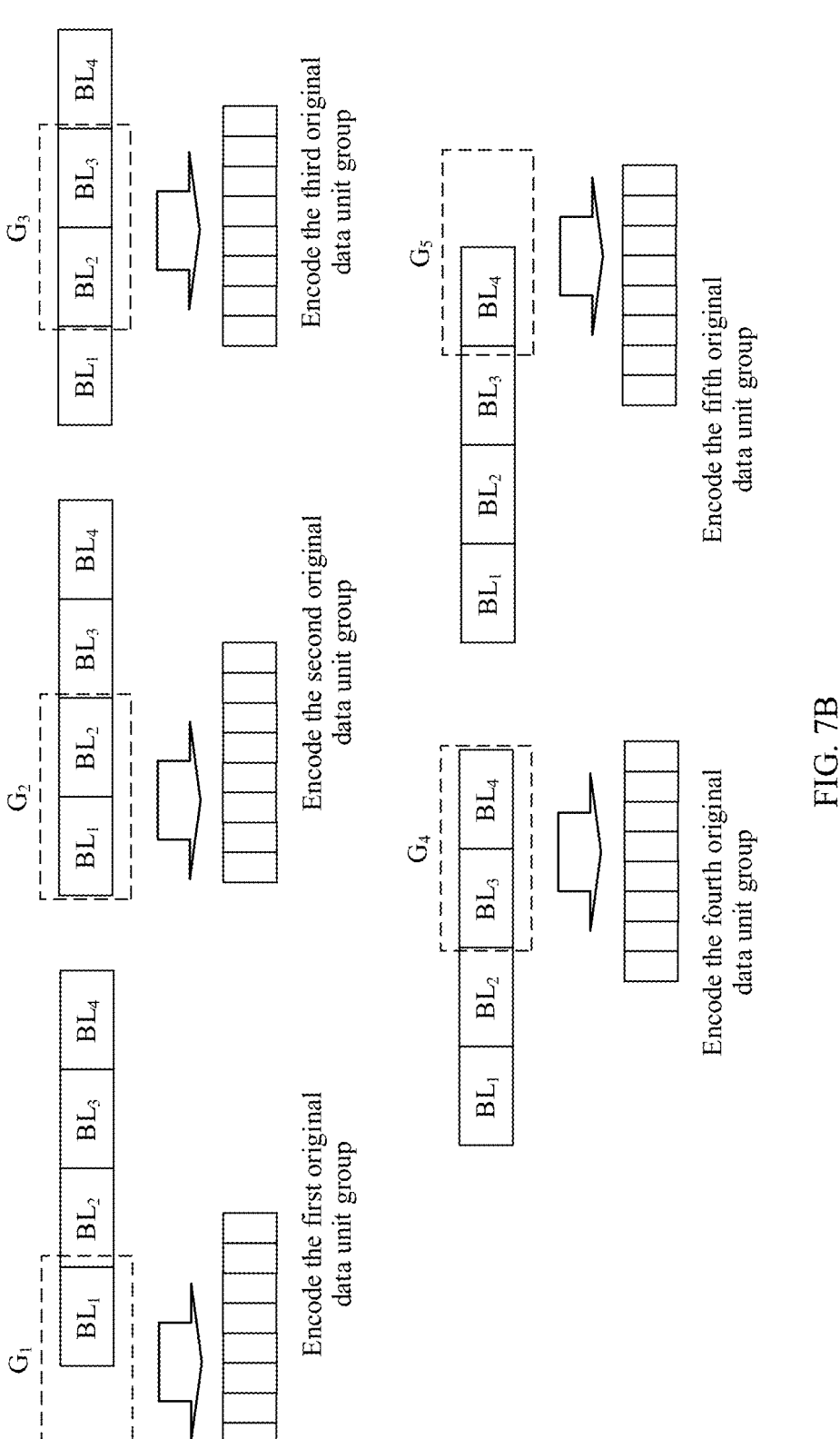

In FIG. 7B, an example in which B=4 original data blocks, each to-be-encoded data unit group includes at most M=2 original data blocks in the B=4 original data blocks, there are L=B+M−1=5 to-be-encoded data unit groups, and a cyclic shift is not performed on a sliding window is used to describe another specific implementation of the foregoing implementation 3-1 in a sliding window manner.

A difference between FIG. 7B and FIG. 7A lies in that the sliding window slides one more time, the fifth to-be-encoded data unit group $G_5$ is added, and $G_5$ includes an original data block $BL_4$.

In FIG. 7B, the five to-be-encoded data unit groups $G_1$, $G_2$, $G_3$, $G_4$, $G_5$ each are encoded separately to obtain a plurality of encoded data units that are in a one-to-one correspondence with each to-be-encoded data unit group. Specifically, an original data block $BL_1$ in $G_1$ is encoded to obtain a plurality of encoded data units corresponding to $G_1$, original data blocks $BL_1$ and $BL_2$ in $G_2$ are encoded to obtain a plurality of encoded data units corresponding to $G_2$, original data blocks $BL_2$ and $BL_3$ in $G_3$ are encoded to obtain a plurality of encoded data units corresponding to $G_3$, original data blocks $BL_3$ and $BL_4$ in $G_4$ are encoded to obtain a plurality of encoded data units corresponding to $G_4$, and the original data block $BL_4$ in $G_5$ is encoded to obtain a plurality of encoded data units corresponding to $G_5$.

Figure 7C:
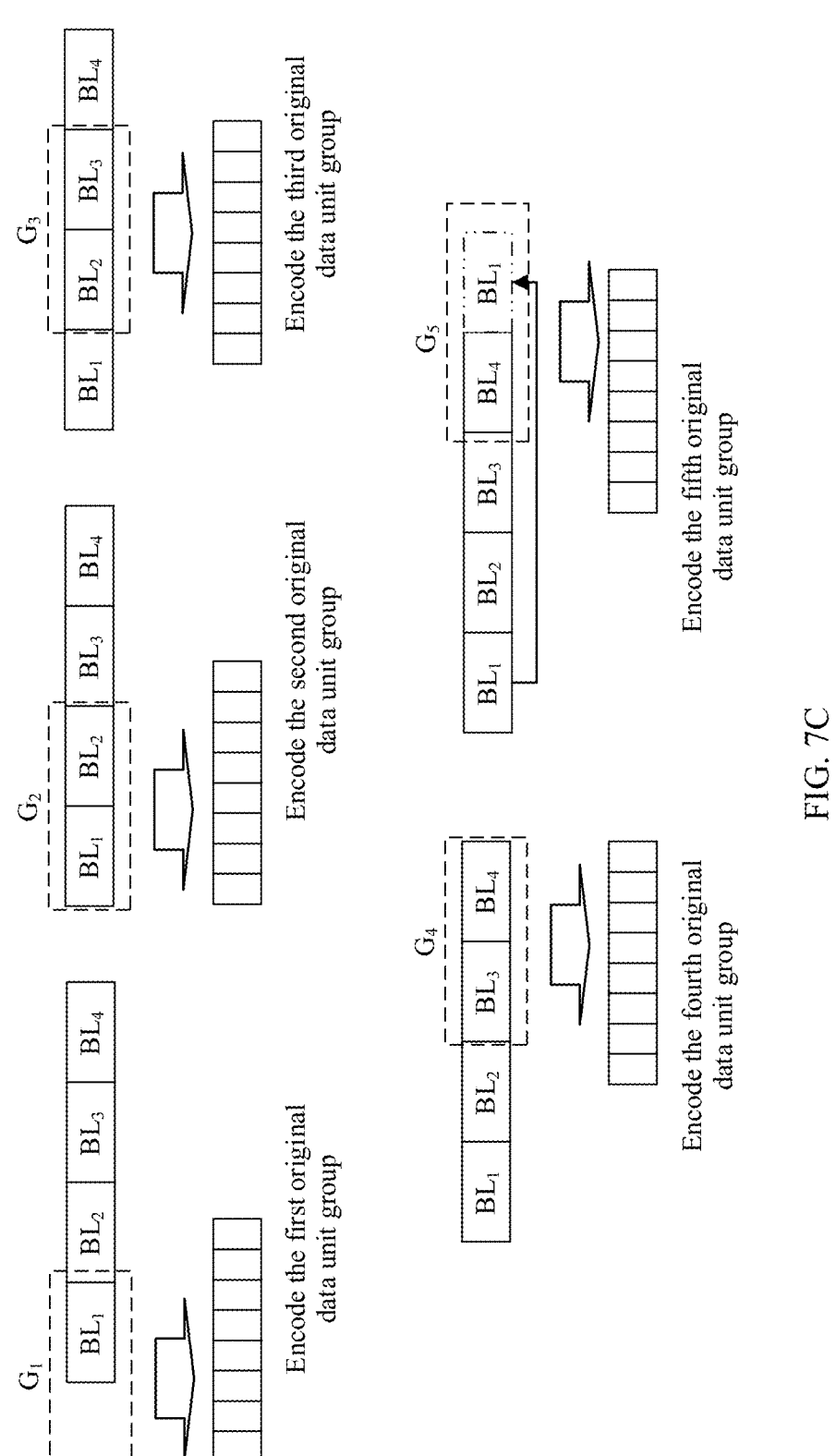

In FIG. 7C, an example in which B=4 original data blocks, each to-be-encoded data unit group includes at most M=2 original data blocks in the B=4 original data blocks, there are L=B+M−1=5 to-be-encoded data unit groups, and a cyclic shift is performed on a sliding window is used to describe another specific implementation of the foregoing implementation 3-1 in a sliding window manner.

A difference between FIG. 7C and FIG. 7B lies in that the fifth to-be-encoded data unit group $G_5$ includes original data blocks $BL_4$ and $BL_1$. This may be considered that the cyclic shift is performed when the sliding window is shifted to a location of the fifth to-be-encoded data unit group $G_5$, that is, the first original data block $BL_1$ is cyclically shifted to the fifth to-be-encoded data unit group $G_5$.

In FIG. 7C, the five to-be-encoded data unit groups $G_1$, $G_2$, $G_3$, $G_4$, $G_5$ each are encoded separately to obtain a plurality of encoded data units that are in a one-to-one correspondence with each to-be-encoded data unit group. Specifically, the original data block $BL_1$ in $G_1$ is encoded to obtain a plurality of encoded data units corresponding to $G_1$, original data blocks $BL_1$ and $BL_2$ in $G_2$ are encoded to obtain a plurality of encoded data units corresponding to $G_2$, original data blocks $BL_2$ and $BL_3$ in $G_3$ are encoded to obtain a plurality of encoded data units corresponding to $G_3$, original data blocks $BL_3$ and $BL_4$ in $G_4$ are encoded to obtain a plurality of encoded data units corresponding to $G_4$, and the original data blocks $BL_4$ and $BL_1$ in $G_5$ are encoded to obtain a plurality of encoded data units corresponding to $G_5$.

When an alternative implementation 420-B is used in Part 420, in another possible implementation (implementation 3-2 for short) of the method 400, the T to-be-encoded data units include B>1 original data blocks $BL_1$, . . . , $BL_B$ including original data units, or the T to-be-encoded data units include B>1 original data blocks $BL_1$, . . . , $BL_B$ ing H. For example, an element in $H_{right}^{B\times(D-B)}$ may be randomly obtained in the GF(q). A non-zero matrix including elements in the GF(q) exists on a main diagonal of the submatrix $H_{left}^{B\times B}$ and M−1 oblique diagonals parallel to the main diagonal. For example, the submatrix $H_{left}^{B\times B}$ satisfies an example form of the following Table 4:

TABLE 4

| | | | | | | | | |
|---|---|---|---|---|---|---|---|---|
| $H_1^{(1)}$ | $H_2^{(1)}$ | ... | $H_M^{(1)}$ | 0 | 0 | 0 | 0 | 0 |
| 0 | $H_1^{(2)}$ | $H_2^{(2)}$ | ... | $H_M^{(2)}$ | 0 | 0 | 0 | 0 |
| 0 | 0 | ⋱ | ⋱ | ⋱ | ⋱ | 0 | 0 | 0 |
| 0 | 0 | 0 | $H_1^{(b)}$ | $H_2^{(b)}$ | ... | $H_M^{(b)}$ | 0 | 0 |
| 0 | 0 | 0 | 0 | ⋱ | ⋱ | ⋱ | ⋱ | 0 |
| 0 | 0 | 0 | 0 | 0 | $H_1^{(B-M+1)}$ | $H_2^{(B-M+1)}$ | ... | $H_M^{(B-M+1)}$ |
| 0 | 0 | 0 | 0 | 0 | 0 | $H_1^{(B-M+2)}$ | $H_2^{(B-M+2)}$ ... | $H_{M-1}^{(B-M+2)}$ |
| 0 | 0 | 0 | 0 | 0 | 0 | ⋱ | ⋱ | ⋮ |
| 0 | 0 | 0 | 0 | 0 | 0 | 0 | $H_1^{(B-1)}$ | $H_2^{(B-1)}$ |
| 0 | 0 | 0 | 0 | 0 | 0 | 0 | 0 | $H_1^{(B)}$ | including original data units and an interleaved data unit. The B original data blocks are encoded to obtain D encoded data blocks $C_1$, $C_2$, . . . , $C_D$ including encoded data units, where D is greater than or equal to B, and the D encoded data blocks satisfy:

$$[C_1, C_2, \ldots, C_D] = [BL_1, \ldots, BL_B] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than B. When the submatrix is a square matrix, the foregoing oblique diagonals include a main diagonal of the square matrix and an oblique diagonal parallel to the main diagonal. In this case, it may be considered that the T to-be-encoded data units $O_1$, $O_2$, . . . , $O_T$ in the method 400 are the B original data blocks $BL_1$, . . . , $BL_B$. B, D, and M may be collectively referred to as encoding parameters. When the original data block includes an interleaved data unit, interleaving can further improve the capability of the encoded $H_{left}^{B\times B}$ shown in Table 4 includes B*B submatrices, where 0 represents an all-zero-element submatrix, $H_m^{(b)}$ where $1 \leq m \leq M$, $1 \leq b \leq B$ represents a matrix whose row quantity is $N_b$ and column quantity is at least $N_b$ or column quantity is $K_d$, $N_b$ represents a quantity of original data units included in an original data block b, and $K_d$ represents a quantity of encoded data units included in an encoded data block d, where $1 \leq d \leq D$, $N_b \leq K_d$. For different m and/or b, H may be a same matrix, or may be different matrices. $H_m^{(b)}$ may have a plurality of different specific implementations. For example, $H_m^{(b)}$ may have the following several possible forms.

Implementation 1 for $H_m^{(b)}$: $H_m^{(b)}$ satisfies $$H_m^{(b)} = [H_{left}^{Nb\times Nb} H_{right}^{Nb\times(kd-Nb)}]$$

$H_{right}^{Nb\times(kd-Nb)}$ is an $N_b \times (K_d - N_b)$-dimensional matrix, and $H_{left}^{Nb\times Nb}$ is an $N_b \times N_b$-dimensional oblique diagonal matrix. For example, $H_{left}^{Nb\times Nb}$ satisfies an example form of the following Table 5:

TABLE 5

| | | | | | | | | |
|---|---|---|---|---|---|---|---|---|
| $h_1^{(1)}$ | $h_2^{(1)}$ | ... | $h_{Mb}^{(1)}$ | 0 | 0 | 0 | 0 | 0 |
| 0 | $h_1^{(2)}$ | $h_2^{(2)}$ | ... | $h_{Mb}^{(2)}$ | 0 | 0 | 0 | 0 |
| 0 | 0 | ⋱ | ⋱ | ⋱ | ⋱ | 0 | 0 | 0 |
| 0 | 0 | 0 | $h_1^{(n)}$ | $h_2^{(n)}$ | ... | $h_{Mb}^{(n)}$ | 0 | 0 |
| 0 | 0 | 0 | 0 | ⋱ | ⋱ | ⋱ | ⋱ | 0 |
| 0 | 0 | 0 | 0 | 0 | $h_1^{(Nb-Mb+1)}$ | $h_2^{(Nb-Mb+1)}$ | ... | $h_{Mb}^{(Nb-Mb+1)}$ |
| 0 | 0 | 0 | 0 | 0 | 0 | $h_1^{(Nb-Mb+2)}$ | $h_2^{(Nb-Mb+2)}$ ... | $h_{Mb-1}^{(Nb-Mb+2)}$ |
| 0 | 0 | 0 | 0 | 0 | 0 | ⋱ | ⋱ | ⋮ |
| 0 | 0 | 0 | 0 | 0 | 0 | 0 | $h_1^{(Nb-1)}$ | $h_2^{(Nb-1)}$ |
| 0 | 0 | 0 | 0 | 0 | 0 | 0 | 0 | $h_1^{(Nb)}$ | data against the channel fading and the channel change, to further improve the receiving reliability of the encoded data and improve the spectral efficiency.

In the implementation 3-2, for a possible implementation of Part 410 of the method 400, refer to the descriptions in the implementation 3-1. Details are not described herein again.

In the implementation 3-2, a possible encoding matrix H satisfies:

$$H = [H_{left}^{B\times B} H_{right}^{B\times(D-B)}] = H_7$$

The encoding matrix H (which may be denoted as $H_7$) is a B*D-dimensional matrix, and includes a B*B-dimensional submatrix $H_{left}^{B\times B}$ and a B*(D−B)-dimensional submatrix $H_{right}^{B\times(D-B)}$. In this example, there is no special requirement on the submatrix $H_{right}^{B\times(D-B)}$ included in the forego- $M_b$ represents a convolution depth corresponding to an original data block b, where $1 \leq M_b < N_b$. In the foregoing example, elements on a main diagonal of $H_{left}^{Nb\times Nb}$ and $M_b - 1$ oblique diagonals parallel to the main diagonal may be abbreviated as $\{h_i^{(1)}, h_i^{(2)}, \ldots, h_i^{(Nb-i+1)}\}$, $1 \leq i \leq M_b$, where when i=1, $\{h_i^{(1)}, h_i^{(2)}, \ldots h_i^{(Nb-i+1)}\}$ indicates an element on the main diagonal; when i=2, . . . $M_b$, $\{h_i^{(1)}, h_i^{(2)}, \ldots, h_i^{(Nb-i+1)}\}$ indicates an element on the $M_b - 1$ oblique diagonals parallel to the main diagonal. For any $1 \leq i \leq M_b$, there is at least one non-zero element in the GF(q) in $\{h_i^{(1)}, h_i^{(2)}, \ldots, h_i^{(Nb-i+1)}\}$. In addition, for any $1 \leq i \leq M_b$, values of $N_b - i + 1$ elements in $\{h_i^{(1)}, h_i^{(2)}, \ldots, h_i^{(Nb-i+1)}\}$ may be the same, or may be partially or completely different. When for any $1 \leq i \leq M_b$, values of $N_b - i + 1$ elements in $\{h_i^{(1)}, h_i^{(2)}, \ldots,$

43

$h_i^{(N_b-i+1)}$} are the same, $H_{left}^{N_b×N_b}$ is a Toeplitz matrix. In this example, there is no special requirement on the submatrix $H_{right}^{N_b×(k_d-N_b)}$ included in the foregoing $H_m^{(b)}$. For example, an element in $H_{right}^{N_b×(K_d-N_b)}$ may be randomly obtained in the GF(q).

Implementation 2 for $H_m^{(b)}$: $H_m^{(b)}$ satisfies $$H_m^{(b)}=[H_{left}^{N_b×(N_b+M_b-1)} H_{right}^{N_b×(k_d-N_b-M_b+1)}]$$

$H_{right}^{N_b×(K_d-N_b-M_b+1)}$ is an $N_b×(K_d-N_b-M_b+1)$-dimensional matrix, $M_b$ represents a convolution depth corresponding to an original data block b, where $1≤M_b<N_b$, and $H_{left}^{N_b×(N_b+M_b-1)}$ is an $N_b×(N_b+M_b-1)$-dimensional matrix. For example, $H_{left}^{N_b×(N_b+M_b-1)}$ satisfies an example form of the following Table 6:

TABLE 6

| | | | | | | | | | | | |
|---|---|---|---|---|---|---|---|---|---|---|---|
| $h_1^{(1)}$ | $h_2^{(1)}$ | ... | $h_{M_b}^{(1)}$ | 0 | 0 | 0 | 0 | 0 | 0 | 0 | 0 |
| 0 | $h_1^{(2)}$ | $h_2^{(2)}$ | ... | $h_{M_b}^{(2)}$ | 0 | 0 | 0 | 0 | 0 | 0 | 0 |
| 0 | 0 | ⋱ | ⋱ | ⋱ | ⋱ | 0 | 0 | 0 | 0 | 0 | 0 |
| 0 | 0 | 0 | $h_1^{(n)}$ | $h_2^{(n)}$ | ... | $h_{M_b}^{(n)}$ | 0 | 0 | 0 | 0 | 0 |
| 0 | 0 | 0 | 0 | ⋱ | ⋱ | ⋱ | 0 | 0 | 0 | 0 | 0 |
| 0 | 0 | 0 | 0 | o | $h_1^{(N_b-M_b+1)}$ | $h_2^{(N_b-M_b+1)}$ | ... | $h_{M_b}^{(N_b-M_b+1)}$ | 0 | 0 | 0 |
| 0 | 0 | 0 | 0 | 0 | 0 | $h_1^{(N_b-M_b+2)}$ | $h_2^{(N_b-M_b+b)}$ ... | $h_{M_b-1}^{(N_b-M_b+2)}$ | $h_{M_b}^{(N_b-M_b+2)}$ | 0 | 0 |
| 0 | 0 | 0 | 0 | 0 | 0 | ⋱ | ⋱ | ⋱ | ⋱ | 0 | 0 |
| 0 | 0 | 0 | 0 | 0 | 0 | 0 | $h_1^{(N_b-1)}$ | $h_2^{(N_b-1)}$ | ... | $h_{M_b}^{(N_b-2)}$ | 0 |
| 0 | 0 | 0 | 0 | 0 | 0 | 0 | 0 | $h_1^{(N_b)}$ | $h_2^{(N_b)}$ | ... | $h_{M_b}^{(N_b)}$ |

In the foregoing example, an element on an $i^{th}$ oblique diagonal in $H_{left}^{N_b×(N_b+M_b-1)}$ may be abbreviated as {$h_i^{(1)}$, $h_i^{(2)}$, ..., $h_i^{(N_b)}$}, $1≤i≤M_b$. For any $1≤i≤M_b$, there is at least one non-zero element in the GF(q) in {$h_i^{(1)}$, $h_i^{(2)}$, ..., $h_i^{(N_b)}$}. In addition, for any $1≤i≤M_b$, values of $N_b$ elements in {$h_i^{(1)}$, $h_i^{(2)}$, ..., $h_i^{(N_b)}$} may be the same, or may be partially or completely different. In this example, there is no special requirement on the submatrix $H_{right}^{N_b×(K_d-N_b-M_b+1)}$ included in the foregoing $H_m^{(b)}$. For example, an element in $H_{right}^{N_b×(K_d-N_b-M_b+1)}$ may be randomly obtained in the GF(q).

For another example, $H_{left}^{N_b×(N_b+M_b-1)}$ satisfies an example form of the following Table 7:

TABLE 7

| | | | | | | | | | | | |
|---|---|---|---|---|---|---|---|---|---|---|---|
| $h_1^{(1)}$ | $h_2^{(1)}$ | ... | $h_{M_b}^{(1)}$ | 0 | 0 | 0 | 0 | 0 | $h_1^{(N_b+1)}$ | ... | $h_{M_b-1}^{(N_b+1)}$ |
| 0 | $h_1^{(2)}$ | $h_2^{(2)}$ | ... | $h_{M_b}^{(2)}$ | 0 | 0 | 0 | 0 | 0 | ⋱ | $h_1^{(N_b+M_b-1)}$ |
| 0 | 0 | ⋱ | ⋱ | ⋱ | ⋱ | 0 | 0 | 0 | 0 | 0 | $h_1^{(N_b+M_b-1)}$ |
| 0 | 0 | 0 | $h_1^{(n)}$ | $h_2^{(n)}$ | ... | $h_{M_b}^{(n)}$ | 0 | 0 | 0 | 0 | 0 |
| 0 | 0 | 0 | 0 | ⋱ | ⋱ | ⋱ | 0 | 0 | 0 | 0 | 0 |
| 0 | 0 | 0 | 0 | o | $h_1^{(N_b-M_b+1)}$ | $h_2^{(N_b-M_b+1)}$ | ... | $h_{M_b}^{(N_b-M_b+1)}$ | 0 | 0 | 0 |
| 0 | 0 | 0 | 0 | 0 | 0 | $h_1^{(N_b-M_b+2)}$ | $h_2^{(N_b-M_b+2)}$ ... | $h_{M_b-1}^{(N_b-M_b+2)}$ | $h_{M_b}^{(N_b-M_b+2)}$ | 0 | 0 |
| 0 | 0 | 0 | 0 | 0 | 0 | ⋱ | ⋱ | ⋱ | ⋱ | 0 | 0 |
| 0 | 0 | 0 | 0 | 0 | 0 | 0 | $h_1^{(N_b-1)}$ | $h_2^{(N_b-1)}$ | ... | $h_{M_b}^{(N_b-1)}$ | 0 |
| 0 | 0 | 0 | 0 | 0 | 0 | 0 | 0 | $h_1^{(N_b)}$ | $h_2^{(N_b)}$ | ... | $h_{M_b}^{(N_b)}$ |

In the foregoing example, at least one non-zero element in the GF(q) exists on an oblique diagonal shown in $H_{left}^{N_b×(N_b+M_b-1)}$. In addition, values of elements on any shown oblique diagonal may be the same, or may be partially or completely different. In this example, there is no special requirement on the submatrix $H_{right}^{N_b×(K_d-N_b-M_b+1)}$ included in the foregoing $H_m^{(b)}$. For example, an element in $H_{right}^{N_b×(K_d-N_b-M_b+1)}$ may be randomly obtained in the GF(q).

Implementation 3 for $H_m^{(b)}$: $H_m^{(b)}$ satisfies $$H_m^{(b)}=\begin{bmatrix} h_{11} & \cdots & h_{1K_d} \\ \vdots & \ddots & \vdots \\ h_{N_b1} & \cdots & h_{N_bK_d} \end{bmatrix}$$

An element $h_{nk}$($1≤n≤N_b$, $1≤k≤K_d$) included in $H_m^{(b)}$ is an element in the GF(q), for example, may be randomly obtained from elements in the GF(q).

Implementation 4 for $H_m^{(b)}$: $H_m^{(b)}$ satisfies $$H_m^{(b)}=\begin{bmatrix} 1 & \cdots & 0 & h_{11} & \cdots & h_{1(K_d-N_b)} \\ \vdots & \ddots & \vdots & \vdots & \ddots & \vdots \\ 0 & \cdots & 1 & h_{N_b1} & \cdots & h_{N_b(K_d-N_b)} \end{bmatrix}$$

An element $h_{nk}$ ($1≤n≤N_b$, $1≤k≤K_d-N_b$) included in $H_m^{(b)}$ is an element in the GF(q), for example, may be randomly obtained from elements in the GF(q).

Implementation 5 for $H_m^{(b)}$: When a plurality of original data blocks participate in encoding together, any one of the foregoing implementations 1 to 4 for $H_m^{(b)}$ may be used for a part of the original data blocks $H_m^{(b)}$, and the other part of the original data blocks $H_m^{(b)}$ may satisfy $$H_m^{(b)} = \begin{bmatrix} & 0_{N_b-N_l} & \\ h_{11} & \cdots & h_{1K_d} \\ \vdots & \ddots & \vdots \\ h_{N_l1} & \cdots & h_{N_lK_d} \end{bmatrix}$$

$0_{N_b-N_l}$ represents an $(N_b-N_l)\times(N_b-N_l)$-dimensional all-zero matrix, and $N_l$ is an integer greater than 0 and less than $N_b$. For different m, values of $N_l$ may be the same or may be different. A part $$\begin{matrix} h_{11} & \cdots & h_{1K_d} \\ \vdots & \ddots & \vdots \\ h_{N_l1} & \cdots & h_{N_lK_d} \end{matrix}$$

except $0_{N_b-N_l}$ in $H_m^{(b)}$ may satisfy any one of the foregoing implementations 1 to 4 for $H_m^{(b)}$ in form.

In the implementation 3-2, another possible encoding matrix H satisfies:

$$H=[H_{left}^{B\times(B+M-1)} H_{right}^{B\times(D-B-M+1)}]=H_8$$

The encoding matrix H (which may be denoted as $H_8$) is a B*D-dimensional matrix, and includes a B*(B+M−1)-dimensional submatrix $H_{left}^{B\times(B+M-1)}$ and a B*(D−B−M+1)-dimensional submatrix $H_{right}^{B\times(D-B-M+1)}$. A non-zero matrix including an element in the GF(q) exists on M oblique diagonals of the submatrix $H_{left}^{B\times(B+M-1)}$. For example, the submatrix $H_{left}^{B\times(B+M-1)}$ satisfies an example form of the following Table 8:

TABLE 8

| | | | | | | | | | | | |
|---|---|---|---|---|---|---|---|---|---|---|---|
| $H_1^{(1)}$ | $H_2^{(1)}$ | ⋯ | $H_M^{(1)}$ | 0 | 0 | 0 | 0 | 0 | 0 | 0 | 0 |
| 0 | $H_1^{(2)}$ | $H_2^{(2)}$ | ⋯ | $H_M^{(2)}$ | 0 | 0 | 0 | 0 | 0 | 0 | 0 |
| 0 | 0 | ⋱ | ⋱ | ⋱ | ⋱ | 0 | 0 | 0 | 0 | 0 | 0 |
| 0 | 0 | 0 | $H_1^{(b)}$ | $H_2^{(b)}$ | ⋯ | $H_M^{(b)}$ | 0 | 0 | 0 | 0 | 0 |
| 0 | 0 | 0 | 0 | ⋱ | ⋱ | ⋱ | ⋱ | 0 | 0 | 0 | 0 |
| 0 | 0 | 0 | 0 | 0 | $H_1^{(B-M+1)}$ | $H_2^{(B-M+1)}$ | ⋯ | $H_M^{(B-M+1)}$ | 0 | 0 | 0 |
| 0 | 0 | 0 | 0 | 0 | 0 | $H_1^{(B-M+2)}$ | $H_2^{(B-M+2)}$ ⋯ | $H_{M-1}^{(B-M+2)}$ | $H_M^{(B-M+2)}$ | 0 | 0 |
| 0 | 0 | 0 | 0 | 0 | 0 | ⋱ | ⋱ | ⋱ | ⋮ | 0 | 0 |
| 0 | 0 | 0 | 0 | 0 | 0 | 0 | $H_1^{(B-1)}$ | $H_2^{(B-1)}$ | ⋯ | $H_M^{(B-1)}$ | 0 |
| 0 | 0 | 0 | 0 | 0 | 0 | 0 | 0 | $H_1^{(B)}$ | $H_2^{(B)}$ | ⋯ | $H_M^{(B)}$ |

$H_{left}^{B\times(B+M-1)}$ shown in Table 8 includes B*(B+M−1) submatrices, where 0 represents an all-zero-element submatrix, $H_m^{(b)}$, where $1\le m\le M$, $1\le b\le B$ represents a matrix whose row quantity is $N_b$ and column quantity is at least $N_b$ or column quantity is $K_d$, $N_b$ represents a quantity of original data units included in an original data block b, and $K_d$ represents a quantity of encoded data units included in an encoded data block d, where $1\le d\le D$, $N_b\le K_d$. For different m and/or b, $H_m^{(b)}$ may be a same matrix, or may be different matrices. $H_m^{(b)}$ may have a plurality of different specific implementations. For example, $H_m^{(b)}$ may have a form described in any one of the foregoing implementations 1 to 5 for $H_m^{(b)}$. Details are not described herein again.

For another example, $H_{left}^{B\times(B+M-1)}$ satisfies an example form of the following Table 9:

TABLE 9

| | | | | | | | | | | | |
|---|---|---|---|---|---|---|---|---|---|---|---|
| $H_1^{(1)}$ | $H_2^{(1)}$ | ⋯ | $H_M^{(1)}$ | 0 | 0 | 0 | 0 | 0 | $H_1^{(B+1)}$ | ⋯ | $H_{M-1}^{(B+1)}$ |
| 0 | $H_1^{(2)}$ | $H_2^{(2)}$ | ⋯ | $H_M^{(2)}$ | 0 | 0 | 0 | 0 | 0 | ⋱ | ⋮ |
| 0 | 0 | ⋱ | ⋱ | ⋱ | ⋱ | 0 | 0 | 0 | 0 | 0 | $H_1^{(B+M-1)}$ |
| 0 | 0 | 0 | $H_1^{(b)}$ | $H_2^{(b)}$ | ⋯ | $H_M^{(b)}$ | 0 | 0 | 0 | 0 | 0 |
| 0 | 0 | 0 | 0 | ⋱ | ⋱ | ⋱ | ⋱ | 0 | 0 | 0 | 0 |
| 0 | 0 | 0 | 0 | o | $H_1^{(B-M+1)}$ | $H_2^{(B-M+1)}$ | ⋯ | $H_M^{(B-M+1)}$ | 0 | 0 | 0 |
| 0 | 0 | 0 | 0 | 0 | 0 | $H_1^{(B-M+2)}$ | $H_2^{(B-M+2)}$ | $H_{M-1}^{(B-M+2)}$ | $H_M^{(B-M+2)}$ | 0 | 0 |
| 0 | 0 | 0 | 0 | 0 | 0 | ⋱ | ⋱ | ⋮ | ⋱ | 0 | 0 |
| 0 | 0 | 0 | 0 | 0 | 0 | 0 | $H_1^{(B-1)}$ | $H_2^{(B-1)}$ | ⋯ | $H_M^{(B-1)}$ | 0 |
| 0 | 0 | 0 | 0 | 0 | 0 | 0 | 0 | $H_1^{(B)}$ | $H_2^{(B)}$ | ⋯ | $H_M^{(B)}$ |

$H_{left}^{B \times (B+M-1)}$ shown in Table 9 includes B*(B+M−1) submatrices, where 0 represents an all-zero-element submatrix, $H_m^{(b)}$, where 1≤m≤M, 1≤b≤B+M−1 represents a matrix whose row quantity is $N_b$ and column quantity is at least $N_b$ or column quantity is $K_d$, $N_b$ represents a quantity of original data units included in an original data block b, and $K_d$ represents a quantity of encoded data units included in an encoded data block d, where 1≤d≤D, $N_b \le K_d$. For different m and/or b, $H_m^{(b)}$ may be a same matrix, or may be different matrices. $H_m^{(b)}$ may have a plurality of different specific implementations. For example, $H_m^{(b)}$ may have a form described in any one of the foregoing implementations 1 to 5 for $H_m^{(b)}$. Details are not described herein again.

In the implementation 3-2, another possible encoding matrix H satisfies:

$$H = [I_B H'] = H_9$$

The B*B-dimensional matrix $I_B$ includes B*B $N_b \times N_b$-dimensional identity matrices, $N_b$ represents a quantity of original data units included in an original data block b, 1≤b≤B, and quantities of original data units included in different original data blocks may be the same or may be different. The matrix H' is $H_7$ or $H_8$, the matrix H' includes one or more column vectors in $H_7$, or the matrix H' includes one or more column vectors in $H_8$.

Optionally, in the implementation 3-2, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In another possible implementation (implementation 4-1 for short) of the method 400, the T to-be-encoded data units include B original data blocks and Q interleaved data blocks, each of the L to-be-encoded data unit groups includes at most M original data blocks and/or interleaved data blocks in the B original data blocks and the Q interleaved data blocks, B is an integer greater than 1, Q is an integer greater than 1, and M is an integer greater than 0 and less than B+Q. This implementation may be understood as that in the method 400, T is equal to B+Q, and the to-be-encoded data unit is an original data block and/or an interleaved data block. The original data block includes an original data unit, and the interleaved data block includes an interleaved data unit. B, Q, L, and M may be collectively referred to as encoding parameters.

In the implementation 4-1, Part 410 of the method 400 may be implemented as: obtaining the B original data blocks and the Q interleaved data blocks. For example, the B original data blocks are obtained by dividing PDUs from a protocol layer. The protocol layer may be an RLC layer, a PDCP layer, an RRC layer, a BAP layer, a MAC layer, an application layer, or the like in a communication protocol. For another example, the B original data blocks may be received from another apparatus (for example, another network device or terminal). For example, the interleaved data block may be obtained by interleaving or re-arranging all or some original data units included in the original data block. For example, the interleaved data block may be obtained by interleaving all or some original data units in the original data block by using an interleaved matrix.

In the implementation 4-1, optionally, the quantity L of the to-be-encoded data unit groups satisfies B+Q≤L≤B+Q+M−1. Optionally, in Part 420 of the method 400, the obtaining one or more encoded data units that are in a one-to-one correspondence with each of the L to-be-encoded data unit groups is implemented as: obtaining a plurality of encoded data units that are in a one-to-one correspondence with each of the L to-be-encoded data unit groups.

In the implementation 4-1, optionally, each of the L to-be-encoded data unit groups does not simultaneously include the first data block and the last data block in the B+Q original data blocks and interleaved data blocks, which may be understood as that a cyclic shift (that is, an end-around cyclic shift) is not performed when the sliding window slides. Alternatively, the one or more of the L to-be-encoded data unit groups include the first data block and the last data block in the B+Q original data blocks and interleaved data blocks, which may be understood as that a cyclic shift is performed on the sliding window. Whether the first data block or the last data block is an original data block or an interleaved data block depends on arrangement of the original data blocks and the interleaved data blocks. This is not limited in this application.

Optionally, in the implementation 4-1, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

The foregoing implementation 4-1 may be understood as interleaving the original data units in the B original data blocks and then obtaining the to-be-encoded data unit groups through division. With reference to inter-block encoding, in addition to supporting inter-block transmission error correction, interleaving can further improve the capability of the encoded data against the channel fading and the channel change, to further improve the receiving reliability of the encoded data and improve the spectral efficiency.

In a possible implementation method of the implementation 4-1, the L to-be-encoded data unit groups may be obtained in a sliding window manner, and each of the L to-be-encoded data unit groups is encoded separately to obtain one encoded data unit that is in a one-to-one correspondence with each of the L to-be-encoded data unit groups. It may be understood that the L to-be-encoded data unit groups obtained in the sliding window manner include all original data blocks and interleaved data blocks in the B original data blocks and the Q interleaved data blocks. In this case, M may be understood as a maximum quantity of original data blocks and/or interleaved data blocks that can be included in a sliding window.

Optionally, when each of the L to-be-encoded data unit groups does not simultaneously include the first data block and the last data block in the B+Q original data blocks and interleaved data blocks, it may be understood as that a cyclic shift (that is, an end-around cyclic shift) is not performed when the sliding window slides. When one or more of the L to-be-encoded data unit groups include the first data block and the last data block in the B+Q original data blocks and interleaved data blocks, it may be understood as that a cyclic shift is performed on the sliding window.

Different implementations may be used when the original data unit in the original data block is encoded, and/or the interleaved data unit in the interleaved data block is encoded.

For example, the method for encoding the original data unit in the implementation 1-1 may be used to encode the original data unit in the original data block and/or encode the interleaved data unit in the interleaved data block. For details, refer to the descriptions in the implementation 1-1. Details are not described herein again.

For another example, the original data unit in the original data block and/or the interleaved data unit in the interleaved data block may be encoded by using RLNC or a systematic code.

For another example, the original data unit in the original data block and/or the interleaved data unit in the interleaved data block may alternatively be encoded in an overlapping encoding manner. Overlapping (overlapping) encoding means that all data units in a part of data blocks in a plurality of data blocks and a part of data units in the other part of data blocks in the plurality of data blocks are encoded. A specific encoding manner may be the RLNC, the systematic code, or the method described in the implementation 1-1.

Figure 8A:
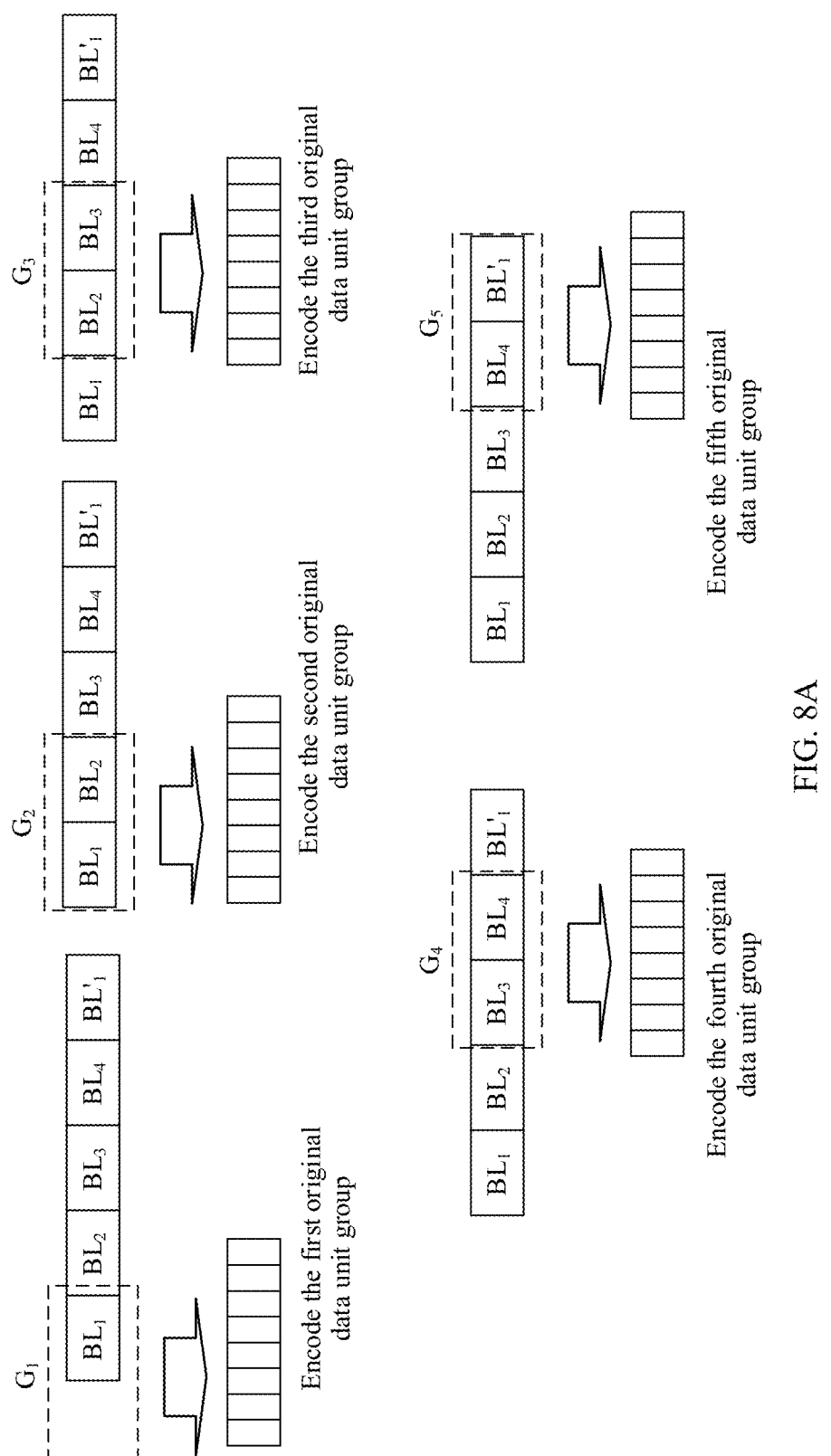

In FIG. 8A, an example in which B=4 original data blocks, Q=1 interleaved data block, each to-be-encoded data unit group includes at most M=2 original data blocks and/or interleaved data blocks in the B=4 original data blocks and the Q=1 interleaved data block, there are L=B+Q=5 to-be-encoded data unit groups, and a cyclic shift is not performed on a sliding window is used to describe a specific implementation of the foregoing implementation 4-1 in a sliding window manner.

In FIG. 8A, the B=4 original data blocks are respectively represented as $BL_1$, $BL_2$, $BL_3$, $BL_4$, the Q=1 interleaved data block is represented as $BL_1'$, a dashed-line box represents the sliding window, and $G_1$, $G_2$, $G_3$, $G_4$, $G_5$ respectively represent the L=B+Q=5 to-be-encoded data unit groups. The first to-be-encoded data unit group $G_1$ includes an original data block $BL_1$, the second to-be-encoded data unit group $G_2$ includes original data blocks $BL_1$ and $BL_2$, the third to-be-encoded data unit group $G_3$ includes original data blocks $BL_2$ and $BL_3$, the fourth to-be-encoded data unit group $G_4$ includes original data blocks $BL_3$ and $BL_4$, and the fifth to-be-encoded data unit group $G_5$ includes an original data block $BL_4$ and an interleaved data block $BL_1'$. Original data blocks and/or interleaved data blocks included in the five to-be-coded data unit groups in FIG. 8A may also be understood as original data blocks and/or interleaved data blocks included in the sliding window. The sliding window shown in FIG. 8A can include at most M=2 original data blocks and/or interleaved data blocks, and the sliding window slides rightward at a granularity of an original data block or an interleaved data block starting from a location including only $BL_1$, to obtain the five to-be-encoded data unit groups $G_1$, $G_2$, $G_3$, $G_4$, $G_5$.

In FIG. 8A, the five to-be-encoded data unit groups $G_1$, $G_2$, $G_3$, $G_4$, $G_5$ each are encoded separately to obtain a plurality of encoded data units that are in a one-to-one correspondence with each to-be-encoded data unit group. Specifically, the original data block $BL_1$ in $G_1$ is encoded to obtain a plurality of encoded data units corresponding to $G_1$, the original data blocks $BL_1$ and $BL_2$ in $G_2$ are encoded to obtain a plurality of encoded data units corresponding to $G_2$, the original data blocks $BL_2$ and $BL_3$ in $G_3$ are encoded to obtain a plurality of encoded data units corresponding to $G_3$, the original data blocks $BL_3$ and $BL_4$ in $G_4$ are encoded to obtain a plurality of encoded data units corresponding to $G_4$, and the original data block $BL_4$ and the interleaved data block $BL_1'$ in $G_5$ are encoded to obtain a plurality of encoded data units corresponding to $G_5$. In FIG. 8A, an example in which a quantity of the plurality of encoded data units that are obtained through encoding and that correspond to each to-be-encoded data unit group is 8 is used to illustrate this implementation. It may be understood that this application does not limit the quantity of the plurality of encoded data units that are obtained in this implementation and that correspond to each to-be-encoded data unit group, and does not limit whether the quantities of the plurality of encoded data units that are obtained and that correspond to various to-be-encoded data unit groups are the same. For example, the quantities of the plurality of encoded data units that are obtained and that correspond to various to-be-encoded data unit groups may be the same, or may be partially the same, or may be completely different.

Figure 8B:
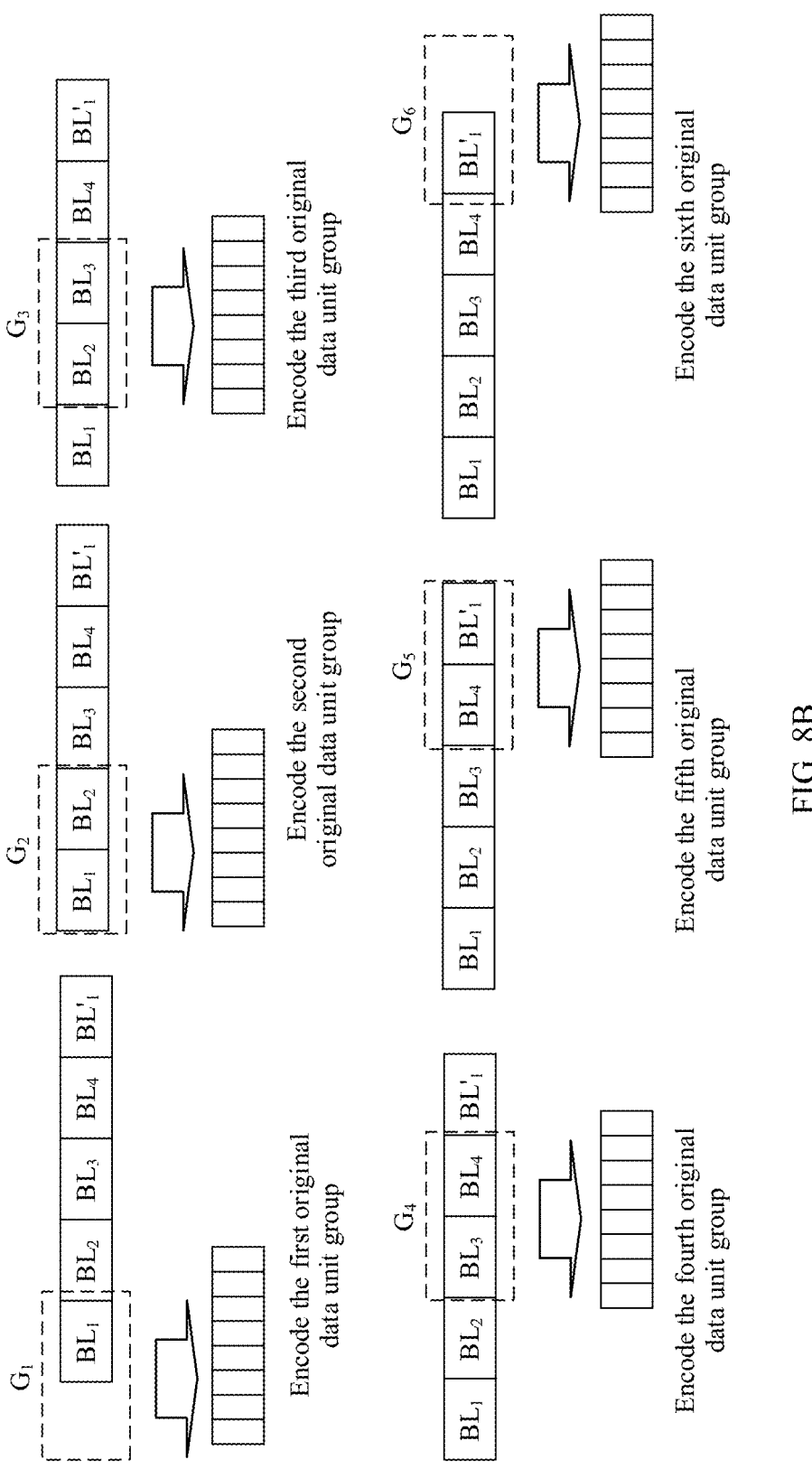

In FIG. 8B, an example in which B=4 original data blocks, Q=1 interleaved data block, each to-be-encoded data unit group includes at most M=2 original data blocks and/or interleaved data blocks in the B=4 original data blocks and the Q=1 interleaved data block, there are L=B+Q+M−1=6 to-be-encoded data unit groups, and a cyclic shift is not performed on a sliding window is used to describe another specific implementation of the foregoing implementation 4-1 in a sliding window manner.

A difference between FIG. 8B and FIG. 8A lies in that the sliding window slides one more time, the sixth to-be-encoded data unit group $G_6$ is added, and $G_6$ includes an interleaved data block $BL_1'$.

In FIG. 8B, the six to-be-encoded data unit groups $G_1$, $G_2$, $G_3$, $G_4$, $G_5$, $G_6$ each are encoded separately to obtain a plurality of encoded data units that are in a one-to-one correspondence with each to-be-encoded data unit group. Specifically, an original data block $BL_1$ in $G_1$ is encoded to obtain a plurality of encoded data units corresponding to $G_1$, original data blocks $BL_1$ and $BL_2$ in $G_2$ are encoded to obtain a plurality of encoded data units corresponding to $G_2$, original data blocks $BL_2$ and $BL_3$ in $G_3$ are encoded to obtain a plurality of encoded data units corresponding to $G_3$, original data blocks $BL_3$ and $BL_4$ in $G_4$ are encoded to obtain a plurality of encoded data units corresponding to $G_4$, the original data block $BL_4$ and the interleaved data block $BL_1'$ in $G_5$ are encoded to obtain a plurality of encoded data units corresponding to $G_5$, and the interleaved data block $BL_1'$ in $G_6$ is encoded to obtain a plurality of encoded data units corresponding to $G_6$.

Figure 8C:
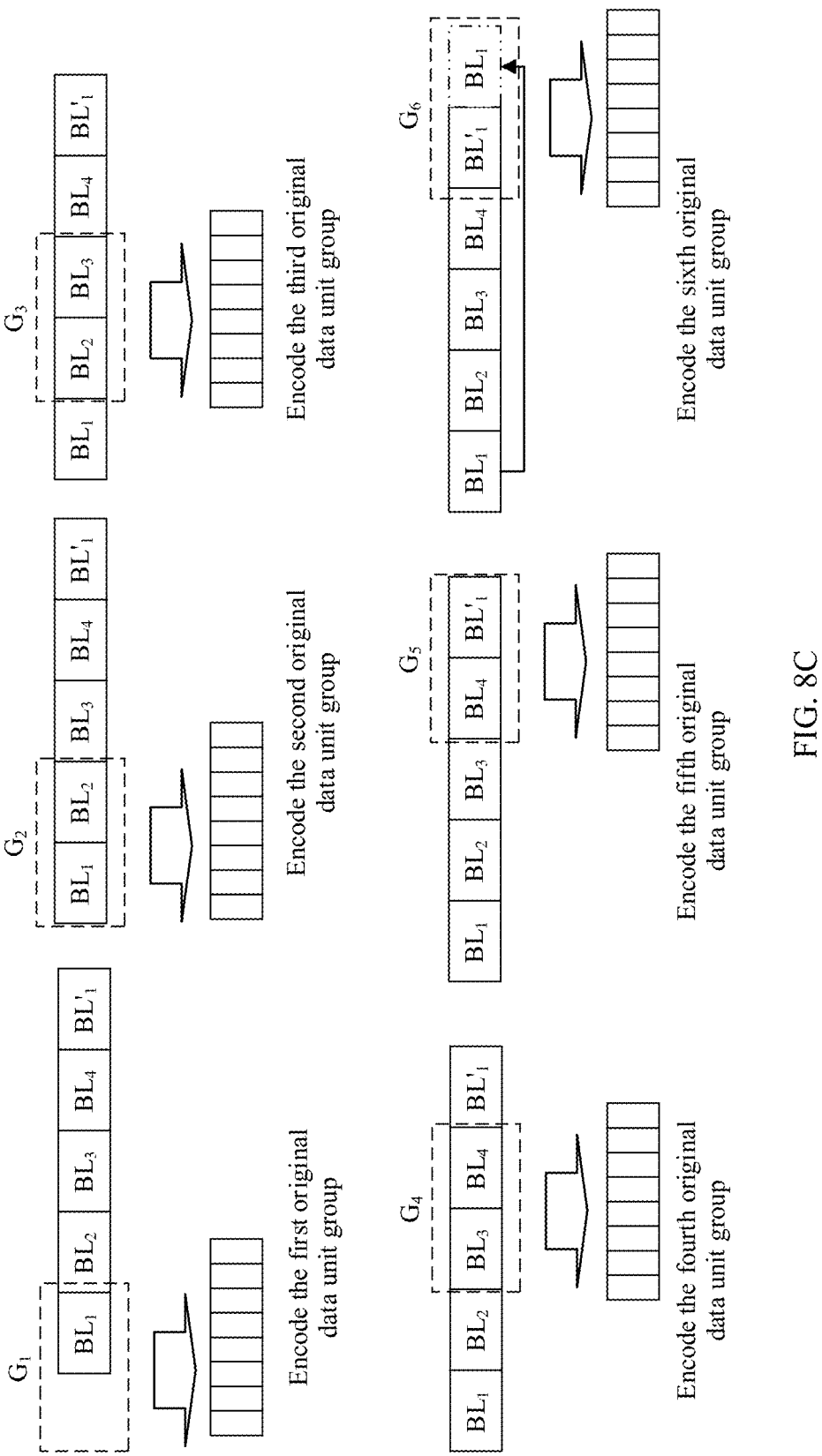

In FIG. 8C, an example in which B=4 original data blocks, Q=1 interleaved data block, each to-be-encoded data unit group includes at most M=2 original data blocks and/or interleaved data blocks in the B=4 original data blocks and the Q=1 interleaved data block, there are L=B+Q+M−1=6 to-be-encoded data unit groups, and a cyclic shift is performed on a sliding window is used to describe another specific implementation of the foregoing implementation 4-1 in a sliding window manner.

A difference between FIG. 8C and FIG. 8B lies in that the sixth to-be-encoded data unit group $G_6$ includes an interleaved data block $BL_1'$ and an original data block $BL_1$. This may be considered that the cyclic shift is performed when the sliding window is shifted to a location of the sixth to-be-encoded data unit group $G_6$, that is, the first original data block $BL_1$ is cyclically shifted to the sixth to-be-encoded data unit group $G_6$.

In FIG. 8C, the six to-be-encoded data unit groups $G_1$, $G_2$, $G_3$, $G_4$, $G_5$, $G_6$ each are encoded separately to obtain a plurality of encoded data units that are in a one-to-one correspondence with each to-be-encoded data unit group. Specifically, the original data block $BL_1$ in $G_1$ is encoded to obtain a plurality of encoded data units corresponding to $G_1$, original data blocks $BL_1$ and $BL_2$ in $G_2$ are encoded to obtain a plurality of encoded data units corresponding to $G_2$, original data blocks $BL_2$ and $BL_3$ in $G_3$ are encoded to obtain a plurality of encoded data units corresponding to $G_3$, original data blocks $BL_3$ and $BL_4$ in $G_4$ are encoded to obtain a plurality of encoded data units corresponding to $G_4$, the original data block $BL_4$ and the interleaved data block $BL_1'$ in $G_5$ are encoded to obtain a plurality of encoded data units corresponding to $G_5$, and the interleaved data block $BL_1'$ and the original data block $BL_1$ in $G_6$ are encoded to obtain a plurality of encoded data units corresponding to $G_6$.

In FIG. 8A to FIG. 8C, the original data block $BL_1$ and the interleaved data block $BL_1'$ may be respectively understood as the first data block and the last data block in the foregoing implementation 4-1. However, in this application, the arrangement of the original data block and the interleaved data block in FIG. 8A to FIG. 8C is merely used as an example to illustrate the foregoing implementation 4-1. The arrangement of the original data block and the interleaved data block is not limited in this application. When the original data block and the interleaved data block have another arrangement, the first data block and the last data block may alternatively be other data blocks. For example, the first data block and the last data block may be respectively an original data block and an original data block, the first data block and the last data block may be respectively an interleaved data block and an interleaved data block, the first data block and the last data block may be respectively an interleaved data block and an original data block, or the first data block and the last data block may be respectively an original data block and an interleaved data block.

When an alternative implementation 420-B is used in Part 420, in another possible implementation (implementation 4-2 for short) of the method 400, the T to-be-encoded data units include B original data blocks $BL_1$, . . . , $BL_B$ and Q interleaved data blocks $BL_1'$, . . . , $BL_Q'$. An original data block b in the B original data blocks includes $N_b$ original data units, and an interleaved data block q' in the Q interleaved data blocks includes $N_{q'}$ interleaved data units. The B original data blocks and the Q interleaved data blocks are encoded to obtain D encoded data blocks $C_1$, $C_2$, . . . , $C_D$ including encoded data units, where D is greater than or equal to B+Q, and the D encoded data blocks satisfy:

$$[C_1, C_2, \ldots, C_D] = [BL_1, \ldots, BL_B, BL_1', \ldots, BL_Q'] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than B+Q. When the submatrix is a square matrix, the foregoing oblique diagonals include a main diagonal of the square matrix and an oblique diagonal parallel to the main diagonal. In this case, it may be considered that the T to-be-encoded data units $O_1$, $O_2$, . . . , $O_T$ in the method 400 are the B original data blocks $BL_1$, . . . , $BL_B$ and the Q interleaved data blocks $BL_1'$, . . . , $BL_Q'$. It may be understood that an arrangement sequence of the B original data blocks and the Q interleaved data blocks in $[BL_1, \ldots, BL_B, BL_1', BL_Q']$ is not limited in this application, and $[BL_1, \ldots, BL_B, BL_1', \ldots, BL_Q']$ indicates that the B original data blocks and the Q interleaved data blocks are included. However, the B+Q data blocks may be arranged in any sequence. This is not limited in this application. B, Q, $N_b$, $N_{q'}$, D, and M may be collectively referred to as encoding parameters.

In the implementation 4-2, for a possible implementation of Part 410 of the method 400, refer to the descriptions in the implementation 4-1. Details are not described herein again.

In the implementation 4-2, a possible encoding matrix H satisfies:

$$H = [H_{left}^{(B+Q)\times(B+Q)} H_{right}^{(B+Q)\times(D-B-Q)}] = H_{10}$$

The encoding matrix H (which may be denoted as $H_{10}$) is a (B+Q)*D-dimensional matrix, and includes a (B+Q)*(B+Q)-dimensional submatrix $H_{left}^{(B+Q)\times(B+Q)}$ and a (B+Q)*(D−B−Q)-dimensional submatrix $H_{right}^{(B+Q)\times(D-B-Q)}$. A non-zero matrix including elements in the GF(q) right exists on a main diagonal of the submatrix $H_{left}^{(B+Q)\times(B+Q)}$ and M−1 oblique diagonals parallel to the main diagonal. For example, $H_{left}^{(B+Q)\times(B+Q)}$ has a form similar to that of the matrix shown in Table 4, but dimensions are changed from B*B dimensions shown in Table 4 to (B+Q)*(B+Q) dimensions. In this example, there is no special requirement on the submatrix $H_{right}^{(B+Q)\times(D-B-Q)}$ included in the foregoing H. For example, an element in $H_{right}^{(B+Q)\times(D-B-Q)}$ may be randomly obtained in the GF(q).

In the implementation 4-2, another possible encoding matrix H satisfies:

$$H = [H_{left}^{(B+Q)\times(B+Q+M-1)} H_{right}^{(B+Q)\times(D-B-Q-M+1)}] = H_{11}$$

The encoding matrix H (which may be denoted as $H_{11}$) is a (B+Q)*D-dimensional matrix, and includes a (B+Q)*(B+Q+M−1)-dimensional submatrix $H_{left}^{(B+Q)\times(B+Q+M-1)}$ and a (B+Q)*(D−B−Q−M+1)-dimensional submatrix $H_{right}^{(B+Q)\times(D-B-Q-M+1)}$. A non-zero matrix including an element in the GF(q) exists on M oblique diagonals of the submatrix $H_{left}^{(B+Q)\times(B+Q+M-1)}$. For example, $H_{left}^{(B+Q)\times(B+Q+M-1)}$ has a form similar to that of the matrix shown in Table 8, but dimensions are changed from B*(B+M−1) dimensions shown in Table 8 to (B+Q)*(B+Q+M−1) dimensions. For another example, $H_{left}^{(B+Q)\times(B+Q+M-1)}$ has a form similar to that of the matrix shown in Table 9, but dimensions are changed from B*(B+M−1) dimensions shown in Table 9 to (B+Q)*(B+Q+M−1) dimensions. In this example, there is no special requirement on the submatrix $H_{right}^{(B+Q)\times(D-B-Q-M+1)}$ included in the foregoing H. For example, an element in $H_{right}^{(B+Q)\times(D-B-Q-M+1)}$ may be randomly obtained in the GF(q).

In the implementation 4-2, another possible encoding matrix H satisfies:

$$H = [I_{B+Q} H'] = H_{12}$$

A (B+Q)*(B+Q)-dimensional matrix $I_{B+Q}$ includes (B+Q)* (B+Q) ($N_b$+$N_{q'}$)×($N_b$+$N_{q'}$)-dimensional identity matrices. The matrix H' is $H_{10}$ or $H_{11}$, the matrix H' includes one or more column vectors in $H_{10}$, or the matrix H' includes one or more column vectors in $H_{11}$.

Optionally, in the implementation 4-2, header information may be further added to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In the method 400, optionally, the T to-be-encoded data units include an error data unit. There are one or more error data units. Each of the L to-be-encoded data unit groups does not include the error data unit, or the one or more of the L to-be-encoded data unit groups include the error data unit. When one or more of the L to-be-encoded data unit groups include the error data unit, the method 400 further includes: generating and outputting first indication information indicating the error data unit, where the first indication information may be carried in the header information. The method may be understood as that the method 400 is performed by a relay apparatus or a forwarding apparatus, for example, may be a relay network device, a relay terminal, a forwarding network device, or a forwarding terminal, or may be a processor, a chip, or a chip system in the relay network device, the relay terminal, the forwarding network device, or the forwarding terminal. The relay apparatus first receives to-be-forwarded data units. However, due to fading of a wireless channel, the relay apparatus may fail to correctly receive some of the to-be-forwarded data units. These to-be-forwarded data units that are not correctly received by the relay apparatus may be understood as the error data units in the foregoing method. According to the foregoing method, the relay apparatus can appropriately re-encode to-be-forwarded data when forwarding the data, to improve the receiving reliability of the encoded data and improve the spectral efficiency in a relay forwarding scenario.

When each of the L to-be-encoded data unit groups does not include the error data units, and in a possible implementation of Part 420, each of the L to-be-encoded data unit groups is separately encoded to generate one or more encoded data units that are in a one-to-one correspondence with each of the L to-be-encoded data unit groups, an encoded data unit corresponding to the error data unit is not generated. In this implementation, optionally, the method further includes: generating and outputting second indication information, where the second indication information indicates that the encoded data unit corresponding to the error data unit is incomplete, and the second indication information may be carried in the header information, or may be carried in a control PDU, or may be carried in a MAC control element (CE). The second indication information enables a receiving apparatus to complete decoding of received data when the encoded data unit corresponding to the error data unit is absent.

For example, the relay apparatus receives and encodes to-be-encoded data units $X_1, X_2, X_3, X_4, X_5, X_6, X_7, X_8, X_9$ to obtain encoded data units $A_1, A_2, A_3, A_4, A_5, A_6, A_7, A_8, A_9, A_{10}$, and forwards the encoded data units. However, the relay apparatus fails to receive $X_6$. Therefore, when performing encoding and forwarding, the relay apparatus does not generate an encoded data unit corresponding to $X_6$. For example, it is assumed that the relay apparatus uses an encoding matrix H shown in the following Table 10:

TABLE 10

| $h_1$ | $h_2$ | 0 | 0 | $h_3$ | 0 | 0 | 0 | 0 | 0 |
|---|---|---|---|---|---|---|---|---|---|
| 0 | $h_1$ | $h_2$ | 0 | 0 | $h_3$ | 0 | 0 | 0 | 0 |
| 0 | 0 | $h_1$ | $h_2$ | 0 | 0 | $h_3$ | 0 | 0 | 0 |
| 0 | 0 | 0 | $h_1$ | $h_2$ | 0 | 0 | $h_3$ | 0 | 0 |
| 0 | 0 | 0 | 0 | $h_1$ | $h_2$ | 0 | 0 | $h_3$ | 0 |
| 0 | 0 | 0 | 0 | 0 | $h_1$ | $h_2$ | 0 | 0 | 0 |
| 0 | 0 | 0 | 0 | 0 | 0 | $h_1$ | $h_2$ | 0 | 0 |
| 0 | 0 | 0 | 0 | 0 | 0 | 0 | $h_1$ | $h_2$ | 0 |
| 0 | 0 | 0 | 0 | 0 | 0 | 0 | 0 | $h_1$ | $h_1$ |

The encoded data units $A_1, A_2, A_3, A_4, A_5, A_6, A_7, A_8, A_9, A_{10}$ satisfy: $A_1=X_1 \times h_1$, $A_2=X_2 \times h_1+X_1 \times h_2$, $A_3=X_3 \times h_1+X_2 \times h_2$, $A_4=X_4 \times h_1+X_3 \times h_2$, $A_5=X_5 \times h_1+X_4 \times h_2+X_1 \times h_3$, $A_6=X_6 \times h_1+X_5 \times h_2+X_2 \times h_3$, $A_7=X_7 \times h_1+X_6 \times h_2+X_3 \times h_3$, $A_8=X_8 \times h_1+X_7 \times h_2+X_4 \times h_3$, $A_9=X_9 \times h_1+X_8 \times h_2+X_5 \times h_3$ and $A_{10}=X_9 \times h_1$. Because $X_6$ fails to be received, encoded data units $A_6$ and $A_7$ corresponding to $X_6$ may not be generated, or it may be understood as that $A_6$ and $A_7$ are not sent, or it may be understood as that $A_6=0$ and $A_7=0$ are generated and sent. The relay apparatus may generate and output second indication information, where the second indication information indicates that the encoded data units corresponding to $X_6$ are incomplete, and the receiving apparatus may complete decoding of received data based on the second indication information. When the encoded data units $A_6$ and $A_7$ corresponding to $X_6$ are not generated or sent, the second indication information may be carried in a control PDU or a MAC CE. When $A_6=0$ and $A_7=0$ are generated and sent, the second indication information may be carried in the header information of $A_6$ and/or $A_7$, or may be carried in a control PDU or a MAC CE.

When each of the L to-be-encoded data unit groups does not include the error data unit, and in a possible implementation of Part 420, each of the L to-be-encoded data unit groups is separately encoded to generate one or more encoded data units that are in a one-to-one correspondence with each of the L to-be-encoded data unit groups, the error data unit is set to 0, or it may also be understood as that the error data unit does not participate in encoding. In this implementation, optionally, the method further includes: generating and outputting third indication information, where the third indication information indicates the error data unit, and the third indication information may be carried in the header information, or may be carried in a control PDU, or may be carried in a MAC CE. The third indication information enables the receiving apparatus to complete decoding of received data when the error data unit is absent.

For example, the relay apparatus receives and encodes to-be-encoded data units $X_1, X_2, X_3, X_4, X_5, X_6, X_7, X_8, X_9$ to obtain encoded data units $A_1, A_2, A_3, A_4, A_5, A_6, A_7, A_8, A_9, A_{10}$, and forwards the encoded data units. However, the relay apparatus fails to receive $X_6$. Therefore, when the relay apparatus performs encoding and forwarding, $X_6$ does not participate in encoding, or it may be understood as that $X_6$ is set to zero during encoding. For example, if the relay apparatus uses the encoding matrix H shown in Table 10, the encoded data units $A_1$, $A_2$, $A_3$, $A_4$, $A_5$, $A_6$, $A_7$, $A_8$, $A_9$, $A_{10}$ satisfy: $A_1 = X_1 \times h_1$, $A_2 = X_2 \times h_1 + X_1 \times h_2$, $A_3 = X_3 \times h_1 + X_2 \times h_2$, $A_4 = X_4 \times h_1 + X_3 \times h_2$, $A_5 = X_5 \times h_1 + X_4 \times h_2 + X_1 \times h_3$, $A_6 = X_6 \times h_1 + X_5 \times h_2 + X_2 \times h_3$, $A_7 = X_7 \times h_1 + X_6 \times h_2 + X_3 \times h_3$, $A_8 = X_8 \times h_1 + X_7 \times h_2 + X_4 \times h_3$, $A_9 = X_9 \times h_1 + X_8 \times h_2 + X_5 \times h_3$, and $A_{10} = X_9 \times h_1$. Because $X_6$ fails to be received, $X_6$ does not participate in encoding, or it may be understood as that $X_6$ is set to zero during encoding, that is, encoded data units $A_6$ and $A_7$ related to $X_6$ satisfy $A_6 = X_5 \times h_2 + X_2 \times h_3$ and $A_7 = X_7 \times h_1 + X_3 \times h_3$ respectively. The relay apparatus may generate and output third indication information, for example, add the third indication information to header information of $A_6$ and/or $A_7$, or the third indication information may be carried in a control PDU or a MAC CE. The third indication information indicates $X_6$. For example, the third indication information may be identification information of $X_6$. The receiving apparatus may complete decoding of the received data based on the third indication information.

When one or more of the L to-be-encoded data unit groups include the error data unit, and in another possible implementation of Part 420, each of the L to-be-encoded data unit groups is encoded separately to generate one or more encoded data units that are in a one-to-one correspondence with each of the L to-be-encoded data unit groups, the error data unit participates in encoding. In this implementation, first indication information indicating the error data unit is further generated and output. The first indication information may be carried in the header information, or may be carried in a control PDU, or may be carried in a MAC CE. The first indication information enables the receiving apparatus to complete decoding of received data when the encoded data unit corresponding to the error data unit is included.

For example, the relay apparatus receives and encodes to-be-encoded data units $X_1$, $X_2$, $X_3$, $X_4$, $X_5$, $X_6$, $X_7$, $X_8$, $X_9$ to obtain encoded data units $A_1$, $A_2$, $A_3$, $A_4$, $A_5$, $A_6$, $A_7$, $A_8$, $A_9$, $A_{10}$, and forwards the encoded data units. However, the relay apparatus fails to receive $X_6$. When the relay apparatus performs encoding and forwarding, $X_6$ still participates in encoding, or it may be understood as that $X_6$ is not set to zero during encoding. For example, if the relay apparatus uses the encoding matrix H shown in Table 10, the encoded data units $A_1$, $A_2$, $A_3$, $A_4$, $A_5$, $A_6$, $A_7$, $A_8$, $A_9$, $A_{10}$ satisfy: $A_1 = X_1 \times h_1$, $A_2 = X_2 \times h_1 + X_1 \times h_2$, $A_3 = X_3 \times h_1 + X_2 \times h_2$, $A_4 = X_4 \times h_1 + X_3 \times h_2$, $A_5 = X_5 \times h_1 + X_4 \times h_2 + X_1 \times h_3$, $A_6 = X_6 \times h_1 + X_5 \times h_2 + X_2 \times h_3$, $A_7 = X_7 \times h_1 + X_6 \times h_2 + X_3 \times h_3$, $A_8 = X_8 \times h_1 + X_7 \times h_2 + X_4 \times h_3$, $A_9 = X_9 \times h_1 + X_8 \times h_2 + X_5 \times h_3$, and $A_{10} = X_9 \times h_1$. Although $X_6$ fails to be received, $X_6$ still participates in encoding. Therefore, encoded data units $A_6$ and $A_7$ related to $X_6$ satisfy $A_6 = X_6 \times h_1 + X_5 \times h_2 + X_2 \times h_3$ and $A_7 = X_7 \times h_1 + X_6 \times h_2 + X_3 \times h_3$ respectively, where $A_6$ indicates $X_6$ that is incorrectly received. The relay apparatus may generate and output first indication information, for example, add the first indication information to the header information of $A_6$ and/or $A_7$, or the first indication information may be carried in a control PDU or a MAC CE. The first indication information indicates $X_6$. For example, the first indication information may be identification information of $X_6$. The receiving apparatus may complete decoding of the received data based on the first indication information.

In correspondence to the methods provided in the foregoing method embodiments, an embodiment of this application further provides an apparatus. The apparatus includes corresponding modules configured to perform the foregoing embodiments. The modules may be software, hardware, or a combination of software and hardware.

Figures 9, 10:
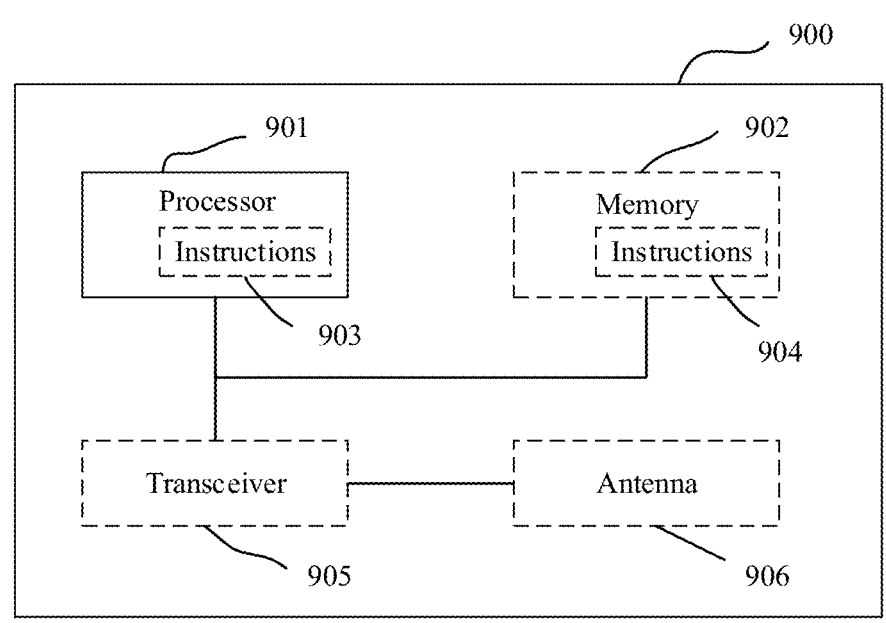
FIG. 9 is a schematic diagram of a structure of a communication apparatus according to an embodiment of this application.
FIG. 10 is a schematic diagram of a structure of a terminal according to an embodiment of this application.

FIG. 9 is a schematic diagram of a structure of an apparatus. The apparatus 900 may be a network device; may be a terminal; may be a chip, a chip system, a processor, or the like that supports the network device in implementing the foregoing methods; or may be a chip, a chip system, a processor, or the like that supports the terminal in implementing the foregoing methods. The apparatus may be configured to implement the methods described in the foregoing method embodiments. For details, refer to the descriptions in the foregoing method embodiments.

The apparatus 900 may include one or more processors 901. The processor 901 may also be referred to as a processing unit, and may implement a control function. The processor 901 may be a general-purpose processor, a dedicated processor, or the like. For example, the processor 901 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 901 may also store instructions and/or data 903, and the instructions and/or the data 903 may be run by the processor, so that the apparatus 900 performs the methods described in the foregoing method embodiments.

In another optional design, the processor 901 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In another possible design, the apparatus 900 may include a circuit. The circuit may implement a sending, receiving, or communication function in the foregoing method embodiments.

Optionally, the apparatus 900 may include one or more memories 902. The memory may store instructions 904, and the instructions may be executed by the processor, so that the apparatus 900 performs the methods described in the foregoing method embodiments. Optionally, the memory may further store data. Optionally, the processor may also store instructions and/or data. The processor and the memory may be separately disposed or may be integrated together. For example, the correspondence described in the foregoing method embodiments may be stored in the memory or stored in the processor.

Optionally, the apparatus 900 may further include a transceiver 905 and/or an antenna 906. The processor 901 may be referred to as a processing unit and controls the apparatus 900. The transceiver 905 may be referred to as a transceiver unit, a transceiver machine, a transceiver circuit, a transceiver apparatus, a transceiver module, or the like, and is configured to implement sending and receiving functions.

Optionally, the apparatus 900 in this embodiment of this application may be configured to perform the method described in FIG. 4 in embodiments of this application.

The processor and the transceiver described in this application may be implemented in an integrated circuit (IC), an analog IC, a radio frequency integrated circuit RFIC, a mixed signal IC, an application-specific integrated circuit (application-specific integrated circuit, ASIC), a printed circuit board (printed circuit board, PCB), an electronic device, or the like. The processor and the transceiver may also be fabricated by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal. However, the range of the apparatus described in this application is not limited thereto, and the structure of the apparatus may not be limited to FIG. 9. The apparatus may be an independent device or a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) another device, or the like.

FIG. 10 is a schematic diagram of a structure of a terminal. The terminal device is applicable to the scenario shown in FIG. 1. For ease of description, FIG. 10 shows only main components of the terminal device. As shown in FIG. 10, the terminal 1000 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, and a keyboard, is mainly configured to: receive data input by a user and output data to the user.

After the terminal is powered on, the processor may read a software program in a storage unit, interpret and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal, the radio frequency circuit receives the radio frequency signal through the antenna, further converts the radio frequency signal into a baseband signal, and outputs the baseband signal to the processor. The processor converts the baseband signal into data, and processes the data.

For ease of description, FIG. 10 shows only one memory and one processor. In an actual implementation, the terminal may have a plurality of processors and a plurality of memories. The memory may also be referred to as a storage medium, a storage device, or the like. This is not limited in embodiments of the present disclosure.

In an optional implementation, the processor may include a baseband processor and a central processing unit. The baseband processor is configured to process the communication protocol and the communication data. The central processing unit is mainly configured to: control the entire terminal device, execute the software program, and process the data of the software program. The processor in FIG. 10 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal may include a plurality of baseband processors to adapt to different network standards, and the terminal may include a plurality of central processing units to enhance a processing capability of the terminal. All the components of the terminal may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have receiving and sending functions may be considered as a transceiver unit 1011 of the terminal 1000, and the processor having a processing function may be considered as a processing unit 1012 of the terminal 1000. As shown in FIG. 10, the terminal 1000 includes the transceiver unit 1011 and the processing unit 1012. The transceiver unit may also be referred to as a transceiver, a transceiver machine, a transceiver apparatus, or the like. Optionally, a component for implementing a receiving function in the transceiver unit 1011 may be considered as a receiving unit, and a component for implementing a sending function in the transceiver unit 1011 may be considered as a sending unit. In other words, the transceiver unit 1011 includes the receiving unit and the sending unit. For example, the receiving unit may also be referred to as a receiver, a receive machine, or a receiving circuit, and the sending unit may also be referred to as a transmitter, a transmit machine, or a transmitting circuit. Optionally, the receiving unit and the sending unit may be one integrated unit, or may be a plurality of independent units. The receiving unit and the sending unit may be in one geographical location, or may be distributed in a plurality of geographical locations.

Figure 11:
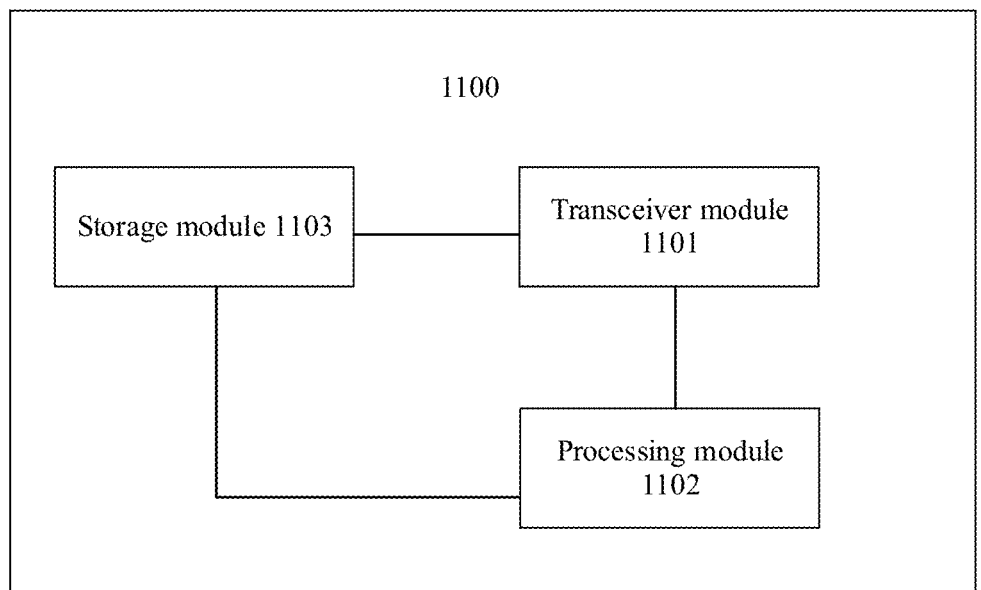
FIG. 11 is a schematic diagram of another communication apparatus according to an embodiment of this application.

As shown in FIG. 11, another embodiment of this application provides an apparatus 1100. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the methods in the method embodiments of this application. The apparatus 1100 may include a processing module 1102 (also referred to as a processing unit). Optionally, the apparatus 1100 may further include a transceiver module 1101 (also referred to as a transceiver unit) and/or a storage module 1103 (also referred to as a storage unit).

In a possible design, one or more modules in FIG. 11 may be implemented by one or more processors, may be implemented by one or more processors and memories, may be implemented by one or more processors and transceivers, or may be implemented by one or more processors, memories, and transceivers. This is not limited in embodiments of this application. The processor, the memory, and the transceiver may be disposed separately, or may be integrated.

The apparatus has a function of implementing the terminal described in embodiments of this application. For example, the apparatus includes a corresponding module, unit, or means (means) used for the terminal to perform the steps that are related to the terminal and that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments. Alternatively, the apparatus has a function of implementing the network device described in embodiments of this application. For example, the apparatus includes a corresponding module, unit, or means (means) used for the network device to perform the steps that are related to the network device and that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments.

Optionally, the modules in the apparatus 1100 in an embodiment of this application may be configured to perform the method described in FIG. 4 in embodiments of this application.

In a possible design, the apparatus 1100 may include a processing module 1102 and a transceiver module 1101. The processing module 1102 is configured to: obtain T to-be-encoded data units, and separately encode each of the L to-be-encoded data unit groups to obtain one or more encoded data units that are in a one-to-one correspondence with each of the L to-be-encoded data unit groups. The L to-be-encoded data unit groups include all the T to-be-encoded data units, each of the L to-be-encoded data unit groups includes at most M to-be-encoded data units in the T to-be-encoded data units, T is an integer greater than 1, L is an integer greater than or equal to T, and M is an integer greater than 0 and less than T. Optionally, L satisfies $T \leq L \leq T+M-1$. The transceiver module 1101 is configured to output the encoded data units. It may be understood that a specific encoding type is not limited in this application. For example, the encoding type may be block encoding, convolutional encoding, or random linear encoding, or the encoding type may be network encoding (for example, block network encoding, convolutional network encoding, or random linear network coding). The apparatus 1100 may be a terminal, or may be a component (for example, a processor, a chip, or a chip system) of the terminal. Alternatively, the apparatus 1100 may be a network device, or may be a component (for example, a processor, a chip, or a chip system) of the network device.

Based on the foregoing apparatus, to-be-encoded data units are divided into a plurality of to-be-encoded data unit groups for separate encoding, and a quantity of to-be-encoded data units included in each to-be-encoded data unit group is less than a quantity of all to-be-encoded data units. In the method, the to-be-encoded data units are selectively encoded, so that correlation of encoded data can be reduced, and a capability of the encoded data against channel fading and channel change can be improved, to improve receiving reliability of the encoded data and improve spectral efficiency.

Optionally, each of the L to-be-encoded data unit groups does not simultaneously include the first to-be-encoded data unit and the last to-be-encoded data unit in the T to-be-encoded data units, or one or more of the L to-be-encoded data unit groups include the first to-be-encoded data unit and the last to-be-encoded data unit in the T to-be-encoded data units.

In some possible implementations of the apparatus 1100, the T to-be-encoded data units include N original data units, each of the L to-be-encoded data unit groups includes at most M original data units in the N original data units, N is an integer greater than 1, and M is an integer greater than 0 and less than N. N, L, and M may be collectively referred to as encoding parameters. Optionally, the quantity L of the to-be-encoded data unit groups satisfies $N \leq L \leq N+M-1$. Optionally, a specific implementation of the obtaining one or more encoded data units that are in a one-to-one correspondence with each of the L to-be-encoded data unit groups is: obtaining one encoded data unit that is in a one-to-one correspondence with each of the L to-be-encoded data unit groups. Optionally, each of the L to-be-encoded data unit groups does not simultaneously include the first original data unit and the last original data unit in the N original data units. Alternatively, the one or more of the L to-be-encoded data unit groups include the first original data unit and the last original data unit in the N original data units. Optionally, the N original data units are included in B original data blocks, and B is an integer greater than 1. Optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, or identification information of an original data unit (for example, an index of the original data unit) corresponding to an encoding start location. In a multi-hop system, the header information may further include identification information of a transmitting end.

In some possible implementations of the apparatus 1100, the processing module 1102 may obtain the L to-be-encoded data unit groups in a sliding window manner, and separately encode each of the L to-be-encoded data unit groups to obtain one encoded data unit that is in a one-to-one correspondence with each of the L to-be-encoded data unit groups. Optionally, when each of the L to-be-encoded data unit groups does not simultaneously include the first original data unit and the last original data unit in the N original data units, it may be understood as that a cyclic shift (that is, an end-around cyclic shift) is not performed when the sliding window slides. When one or more of the L to-be-encoded data unit groups include the first original data unit and the last original data unit in the N original data units, it may be understood as that a cyclic shift is performed on the sliding window.

In some possible implementations of the apparatus 1100, the T to-be-encoded data units include N original data units and P interleaved data units, each of the L to-be-encoded data unit groups includes at most M original data units and/or interleaved data units in the N original data units and the P interleaved data units, N is an integer greater than 1, P is an integer greater than 1, and M is an integer greater than 0 and less than N+P. N, P, L, and M may be collectively referred to as encoding parameters. Optionally, the quantity L of the to-be-encoded data unit groups satisfies $N+P \leq L \leq N+P+M-1$. Optionally, the processing module 1102 is configured to obtain one encoded data unit that is in a one-to-one correspondence with each of the L to-be-encoded data unit groups. Optionally, each of the L to-be-encoded data unit groups does not simultaneously include the first data unit and the last data unit in the N+P original data units and interleaved data units, which may be understood as that a cyclic shift (that is, an end-around cyclic shift) is not performed when the sliding window slides. Alternatively, the one or more of the L to-be-encoded data unit groups include the first data unit and the last data unit in the N+P original data units and interleaved data units, which may be understood as that a cyclic shift is performed on the sliding window. Optionally, the N original data units are included in B original data blocks, and B is an integer greater than 1. Optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In some possible implementations of the apparatus 1100, the processing module 1102 may obtain the L to-be-encoded data unit groups in a sliding window manner, and separately encode each of the L to-be-encoded data unit groups to obtain one encoded data unit that is in a one-to-one correspondence with each of the L to-be-encoded data unit groups. It may be understood that the L to-be-encoded data unit groups obtained in the sliding window manner include all original data units and interleaved data units in the N original data units and the P interleaved data units. Optionally, when each of the L to-be-encoded data unit groups does not simultaneously include the first data unit and the last data unit in the N+P original data units and interleaved data units, it may be understood as that a cyclic shift (that is, an end-around cyclic shift) is not performed when the sliding window slides. When one or more of the L to-be-encoded data unit groups include the first data unit and the last data unit in the N+P original data units and interleaved data units, it may be understood as that a cyclic shift is performed on the sliding window.

In some possible implementations of the apparatus 1100, the T to-be-encoded data units include B original data blocks, each of the L to-be-encoded data unit groups includes at most M original data blocks in the B original data blocks, B is an integer greater than 1, and M is an integer greater than 0 and less than B. The original data block may be usually understood as a to-be-encoded data unit larger than an original data unit. For example, the B original data blocks may include original data units, where a $b^{th}$ original data block includes $N_b$ original data units, and b is an integer greater than 0 and less than or equal to B. Alternatively, the original data block may include an original data unit and an interleaved data unit, where a $b^{th}$ original data block includes $N_b$ original data units and interleaved data units, and b is an integer greater than 0 and less than or equal to B. B, L, $N_b$, and M may be collectively referred to as encoding parameters. Optionally, the quantity L of the to-be-encoded data unit groups satisfies $B \leq L \leq B+M-1$. Optionally, the processing module 1102 is configured to obtain a plurality of encoded data units that are in a one-to-one correspondence with each of the L to-be-encoded data unit groups. Optionally, each of the L to-be-encoded data unit groups does not simultaneously include the first original data block and the last original data block in the B original data blocks. Alternatively, the one or more of the L to-be-encoded data unit groups include the first original data block and the last original data block in the B original data blocks. Optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In some possible implementations of the apparatus 1100, the processing module 1102 may obtain the L to-be-encoded data unit groups in a sliding window manner, and separately encode each of the L to-be-encoded data unit groups to obtain a plurality of encoded data units that are in a one-to-one correspondence with each of the L to-be-encoded data unit groups. It may be understood that the L to-be-encoded data unit groups obtained in the sliding window manner include all original data blocks in the B original data blocks. Optionally, when each of the L to-be-encoded data unit groups does not simultaneously include the first original data block and the last original data block in the B original data blocks, it may be understood as that a cyclic shift (that is, an end-around cyclic shift) is not performed when the sliding window slides. When one or more of the L to-be-encoded data unit groups include the first original data block and the last original data block in the B original data blocks, it may be understood as that a cyclic shift is performed on the sliding window.

In some possible implementations of the apparatus 1100, the T to-be-encoded data units include B original data blocks and Q interleaved data blocks, each of the L to-be-encoded data unit groups includes at most M original data blocks and/or interleaved data blocks in the B original data blocks and the Q interleaved data blocks, B is an integer greater than 1, Q is an integer greater than 1, and M is an integer greater than 0 and less than B+Q. The original data block includes an original data unit, and the interleaved data block includes an interleaved data unit. B, Q, L, and M may be collectively referred to as encoding parameters. Optionally, the quantity L of the to-be-encoded data unit groups satisfies B+Q≤L≤B+Q+M−1. Optionally, the processing module 1102 is configured to obtain a plurality of encoded data units that are in a one-to-one correspondence with each of the L to-be-encoded data unit groups. Optionally, each of the L to-be-encoded data unit groups does not simultaneously include the first data block and the last data block in the B+Q original data blocks and interleaved data blocks, which may be understood as that a cyclic shift (that is, an end-around cyclic shift) is not performed when the sliding window slides. Alternatively, the one or more of the L to-be-encoded data unit groups include the first data block and the last data block in the B+Q original data blocks and interleaved data blocks, which may be understood as that a cyclic shift is performed on the sliding window. Optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In some possible implementations of the apparatus 1100, the processing module 1102 may obtain the L to-be-encoded data unit groups in a sliding window manner, and separately encode each of the L to-be-encoded data unit groups to obtain one encoded data unit that is in a one-to-one correspondence with each of the L to-be-encoded data unit groups. It may be understood that the L to-be-encoded data unit groups obtained in the sliding window manner include all original data blocks and interleaved data blocks in the B original data blocks and the Q interleaved data blocks. Optionally, when each of the L to-be-encoded data unit groups does not simultaneously include the first data block and the last data block in the B+Q original data blocks and interleaved data blocks, it may be understood as that a cyclic shift (that is, an end-around cyclic shift) is not performed when the sliding window slides. When one or more of the L to-be-encoded data unit groups include the first data block and the last data block in the B+Q original data blocks and interleaved data blocks, it may be understood as that a cyclic shift is performed on the sliding window.

In some possible implementations of the apparatus 1100, optionally, the T to-be-encoded data units include an error data unit, and there are one or more error data units. Each of the L to-be-encoded data unit groups does not include the error data unit, or the one or more of the L to-be-encoded data unit groups include the error data unit. When one or more of the L to-be-encoded data unit groups include the error data unit, the processing module 1102 is further configured to generate and output first indication information indicating the error data unit, where the first indication information may be carried in the header information. Optionally, the transceiver module 1101 is further configured to send or output the first indication information.

When each of the L to-be-encoded data unit groups does not include the error data unit, and the processing module 1102 is configured to separately encode each of the L to-be-encoded data unit groups to generate one or more encoded data units that are in a one-to-one correspondence with each of the L to-be-encoded data unit groups, the processing module 1102 does not generate an encoded data unit corresponding to the error data unit. Optionally, the processing module 1102 is further configured to generate second indication information, where the second indication information indicates that the encoded data unit corresponding to the error data unit is incomplete, and the second indication information may be carried in the header information, or may be carried in a control protocol data unit (PDU), or may be carried in a media access control (MAC) control element (CE). Optionally, the transceiver module 1101 is further configured to send or output the second indication information.

When each of the L to-be-encoded data unit groups does not include the error data unit, and the processing module 1102 is configured to separately encode each of the L to-be-encoded data unit groups to generate one or more encoded data units that are in a one-to-one correspondence with each of the L to-be-encoded data unit groups, the processing module 1102 may further set the error data unit to 0, or it may be understood as that the error data unit does not participate in encoding. Optionally, the processing module 1102 is further configured to generate third indication information, where the third indication information indicates the error data unit, and the third indication information may be carried in the header information, or may be carried in a control PDU, or may be carried in a MAC CE. Optionally, the transceiver module 1101 is further configured to send or output the third indication information.

When one or more of the L to-be-encoded data unit groups include the error data unit, and the processing module 1102 is configured to separately encode each of the L to-be-encoded data unit groups to generate one or more encoded data units that are in a one-to-one correspondence with each of the L to-be-encoded data unit groups, the error data unit participates in encoding. The processing module 1102 is further configured to generate the foregoing first indication information indicating the error data unit, where the first indication information may be carried in the header information, or may be carried in a control PDU, or may be carried in a MAC CE. Optionally, the transceiver module 1101 is further configured to send or output the first indication information.

In another possible design, the apparatus 1100 may include a processing module 1102. The processing module

1102 is configured to: obtain T to-be-encoded data units, and encode the T to-be-encoded data units $O_1, O_2, \ldots, O_T$ to obtain K encoded data units $A_1, A_2, \ldots, A_K$, where T is an integer greater than 1, K is greater than or equal to T, and the K encoded data units satisfy:

$$[A_1, A_2, \ldots, A_K]=[O_1, O_2, \ldots, O_T] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than T. When the submatrix is a square matrix, the foregoing oblique diagonals include a main diagonal of the square matrix and an oblique diagonal parallel to the main diagonal.

In some possible implementations of the apparatus 1100, the T to-be-encoded data units include N original data units $X_1, X_2, \ldots, X_N$, the processing module 1102 is configured to encode the N original data units to obtain K encoded data units $A_1, A_2, \ldots, A_K$, K is greater than or equal to N, and the K encoded data units satisfy:

$$[A_1, A_2, \ldots, A_K]=[X_1, X_2, \ldots, X_N] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than N. When the submatrix is a square matrix, the foregoing oblique diagonals include a main diagonal of the square matrix and an oblique diagonal parallel to the main diagonal. R=N/K may be understood as a code rate. N, K, R, and M may be collectively referred to as encoding parameters.

For example, a possible encoding matrix H satisfies:

$$H=[H_{left}^{N \times N} H_{right}^{N \times (K-N)}]=H_1$$

The encoding matrix H (which may be denoted as $H_1$) is an N*K-dimensional matrix, and includes an N*N-dimensional submatrix $H_{left}^{N \times N}$ and an N*(K−N)-dimensional submatrix $H_{right}^{N \times (K-N)}$. Non-zero elements in the GF(q) exist on a main diagonal of the submatrix $H_{left}^{N \times N}$ and M−1 oblique diagonals parallel to the main diagonal.

For another example, another possible encoding matrix H satisfies:

$$H=[H_{left}^{N \times (N+M-1)} H_{right}^{N \times (K-N-M+1)}]=H_2$$

The encoding matrix H (which may be denoted as $H_2$) is an N*K-dimensional matrix, and includes an N*(N+M−1)-dimensional submatrix $H_{left}^{N \times (N+M-1)}$ and an N*(K−N−M+1)-dimensional submatrix $H_{right}^{N \times (K-N-M+1)}$. A non-zero element in the GF(q) exists on M oblique diagonals of the submatrix $H_{left}^{N \times (N+M-1)}$.

For another example, another possible encoding matrix H satisfies:

$$H=[I_N H']=H_3$$

$I_N$ is an N*N-dimensional identity matrix. The matrix H' is $H_1$ or $H_2$, the matrix H' includes one or more column vectors in $H_1$, or the matrix H' includes one or more column vectors in $H_2$.

In the foregoing implementation, optionally, the N original data units are included in B original data blocks, and B is an integer greater than 1. Optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, or identification information of an original data unit (for example, an index of the original data unit) corresponding to an encoding start location. In a multi-hop system, the header information may further include identification information of a transmitting end.

In some possible implementations of the apparatus 1100, the T to-be-encoded data units include N original data units $X_1, X_2, \ldots, X_N$ and P interleaved data units $X_1', X_2', \ldots, X_P'$, the processing module 1102 is configured to encode the N original data units and the P interleaved data units to obtain K encoded data units $A_1, A_2, \ldots, A_K$, K is greater than or equal to N+P, and the K encoded data units satisfy:

$$[A_1, A_2, \ldots, A_K]=[X_1, X_2, \ldots, X_N, X_1', X_2', \ldots, X_P'] \times H$$

H represents an encoding matrix, H includes an element in a GF(q), q is an integer greater than 0, and H includes at least one submatrix, where a non-zero element in the GF(q) exists on an oblique diagonal of the submatrix. Optionally, a quantity of the foregoing oblique diagonals is M, and M is an integer greater than 0 and less than N+P. When the submatrix is a square matrix, the foregoing oblique diagonals include a main diagonal of the square matrix and an oblique diagonal parallel to the main diagonal. R=N/K may be understood as a code rate. N, K, R, and M may be collectively referred to as encoding parameters.

For example, a possible encoding matrix H satisfies:

$$H=[H_{left}^{(N+P) \times (N+P)} H_{right}^{(N+P) \times (K-N-P)}]=H_4$$

The encoding matrix H (which may be denoted as $H_4$) is an (N+P)*K-dimensional matrix, and includes an (N+P)*(N+P)-dimensional submatrix $H_{left}^{(N+P) \times (N+P)}$ and an (N+P)*(K−N−P)-dimensional submatrix $H_{right}^{(N+P) \times (K-N-P)}$. Non-zero elements in the GF(q) exist on a main diagonal of the submatrix $H_{left}^{(N+P) \times (N+P)}$ and M−1 oblique diagonals parallel to the main diagonal.

For another example, another possible encoding matrix H satisfies:

$$H=[H_{left}^{(N+P) \times (N+P+M-1)} H_{right}^{(N+P) \times (K-N-P-N+1)}]=H_5$$

The encoding matrix H (which may be denoted as $H_5$) is an (N+P)*K-dimensional matrix, and includes an (N+P)*(N+P+M−1)-dimensional submatrix $H_{left}^{(N+P) \times (N+P+M-1)}$ and an (N+P)*(K−N−P−M+1)-dimensional submatrix $H_{right}^{(N+P) \times (K-N-P-M+1)}$. A non-zero element in the GF(q) exists on M oblique diagonals of the submatrix $H_{left}^{(N+P) \times (N+P+M-1)}$.

For another example, another possible encoding matrix H satisfies:

$$H=[I_{N+P} H']=H_6$$

$I_{N+P}$ is an (N+P)*(N+P)-dimensional identity matrix. The matrix H' is $H_4$ or $H_5$, the matrix H' includes one or more column vectors in $H_4$, or the matrix H' includes one or more column vectors in $H_5$.

In the foregoing implementation, optionally, the N original data units are included in B original data blocks, and B is an integer greater than 1. Optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In another possible design, the apparatus 1100 may include a processing module 1102. The processing module 1102 is configured to: obtain T to-be-encoded data units, and encode the T to-be-encoded data units $O_1, O_2, \ldots, O_T$ to obtain D encoded data blocks $C_1, C_2, \ldots, C_D$ including encoded data units. T is an integer greater than 1, D is greater than or equal to T, and the D encoded data blocks satisfy:

$$[C_1, C_2, \ldots, C_D] = [O_1, O_2, \ldots, O_T] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than T. When the submatrix is a square matrix, the foregoing oblique diagonals include a main diagonal of the square matrix and an oblique diagonal parallel to the main diagonal.

In some possible implementations of the apparatus 1100, the T to-be-encoded data units include B>1 original data blocks $BL_1, \ldots, BL_B$ including original data units, or the T to-be-encoded data units include B>1 original data blocks $BL_1, \ldots, BL_B$ including original data units and an interleaved data unit. The processing module 1102 is configured to encode the B original data blocks to obtain D encoded data blocks $C_1, C_2, \ldots, C_D$ including encoded data units, where D is greater than or equal to B, and the D encoded data blocks satisfy:

$$[C_1, C_2, \ldots, C_D] = [BL_1, \ldots, BL_B] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than B. When the submatrix is a square matrix, the foregoing oblique diagonals include a main diagonal of the square matrix and an oblique diagonal parallel to the main diagonal. B, D, and M may be collectively referred to as encoding parameters.

For example, a possible encoding matrix H satisfies:

$$H = [H_{left}^{B \times B} H_{right}^{B \times (D-B)}] = H_7$$

The encoding matrix H (which may be denoted as $H_7$) is a B*D-dimensional matrix, and includes a B*B-dimensional submatrix $H_{left}^{B \times B}$ and a B*(D−B)-dimensional submatrix $H_{right}^{B \times (D-B)}$. In this example, there is no special requirement on the submatrix $H_{right}^{B \times (D-B)}$ included in the foregoing H. For example, an element in $H_{right}^{B \times (D-B)}$ may be randomly obtained in the GF(q). A non-zero matrix including elements in the GF(q) exists on a main diagonal of the submatrix $H_{left}^{B \times B}$ and M−1 oblique diagonals parallel to the main diagonal.

For another example, another possible encoding matrix H satisfies:

$$H = [H_{left}^{B \times (B+M-1)} H_{right}^{B \times (D-B-M+1)}] = H_8$$

The encoding matrix H (which may be denoted as $H_8$) is a B*D-dimensional matrix, and includes a B*(B+M−1)-dimensional submatrix $H_{left}^{B \times (B+M-1)}$ and a B*(D−B−M+1)-dimensional submatrix $H_{right}^{B \times (D-B-M+1)}$. A non-zero matrix including an element in the GF(q) exists on M oblique diagonals of the submatrix $H_{left}^{B \times (B+M-1)}$.

For another example, another possible encoding matrix H satisfies:

$$H = [I_B H'] = H_9$$

The B*B-dimensional matrix $I_B$ includes B*B $N_b \times N_b$-dimensional identity matrices, $N_b$ represents a quantity of original data units included in an original data block b, $1 \leq b \leq B$, and quantities of original data units included in different original data blocks may be the same or may be different. The matrix H' is $H_7$ or $H_8$, the matrix H' includes one or more column vectors in $H_7$, or the matrix H' includes one or more column vectors in $H_8$.

In the foregoing implementation, optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

In some possible implementations of the apparatus 1100, the T to-be-encoded data units include B original data blocks $BL_1, \ldots, BL_B$ and Q interleaved data blocks $BL_1', \ldots, BL_Q'$. An original data block b in the B original data blocks includes $N_b$ original data units, and an interleaved data block q' in the Q interleaved data blocks includes $N_{q'}$ interleaved data units. The processing module 1102 is configured to encode the B original data blocks and the Q interleaved data blocks to obtain D encoded data blocks $C_1, C_2, \ldots, C_D$ including encoded data units, where D is greater than or equal to B+Q, and the D encoded data blocks satisfy:

$$[C_1, C_2, \ldots, CD] = [BL_1, \ldots, BL_B, BL_1', \ldots, BL_Q'] \times H$$

H represents an encoding matrix, H includes an element in a GF(q), q is an integer greater than 0, and H includes at least one submatrix, where a non-zero matrix including the element in the GF(q) exists on an oblique diagonal of the submatrix. Optionally, a quantity of the foregoing oblique diagonals is M, and M is an integer greater than 0 and less than B+Q. When the submatrix is a square matrix, the foregoing oblique diagonals include a main diagonal of the square matrix and an oblique diagonal parallel to the main diagonal. B, Q, $N_b$, $N_q$, D, and M may be collectively referred to as encoding parameters.

For example, a possible encoding matrix H satisfies:

$$H=[H_{left}{}^{(B+Q)\times(B+Q)}H_{right}{}^{(B+Q)\times(D-B-Q)}]=H_{10}$$

The encoding matrix H (which may be denoted as $H_{10}$) is a (B+Q)*D-dimensional matrix, and includes a (B+Q)*(B+Q)-dimensional submatrix $H_{left}{}^{(B+Q)\times(B+Q)}$ and a (B+Q)*(D−B−Q)-dimensional submatrix $H_{right}{}^{(B+Q)\times(D-B-Q)}$. A non-zero matrix including elements in the GF(q) exists on a main diagonal of the submatrix $H_{left}{}^{(B+Q)\times(B+Q)}$ and M−1 oblique diagonals parallel to the main diagonal.

For another example, another possible encoding matrix H satisfies:

$$H=[H_{left}{}^{(B+Q)\times(B+Q+M-1)}H_{right}{}^{(B+Q)\times(D-B-Q-M+1)}]=H_{11}$$

The encoding matrix H (which may be denoted as $H_{11}$) is a (B+Q)*D-dimensional matrix, and includes a (B+Q)*(B+Q+M−1)-dimensional submatrix $H_{left}{}^{(B+Q)\times(B+Q+M-1)}$ and a (B+Q)*(D−B−Q−M+1)-dimensional submatrix $H_{right}{}^{(B+Q)\times(D-B-Q-M+1)}$. A non-zero matrix including an element in the GF(q) exists on M oblique diagonals of the submatrix $H_{left}{}^{(B+Q)\times(B+Q+M-1)}$.

For another example, another possible encoding matrix H satisfies:

$$H=[I_{B+Q}H']=H_{12}$$

A (B+Q)*(B+Q)-dimensional matrix $I_{B+Q}$ includes (B+Q)*(B+Q) $(N_b+N_q)\times(N_b+N_q)$-dimensional identity matrices. The matrix H' is $H_{10}$ or $H_{11}$, the matrix H' includes one or more column vectors in $H_{10}$, or the matrix H' includes one or more column vectors in $H_{11}$.

In the foregoing implementation, optionally, the processing module 1102 may be further configured to add header information to the generated encoded data unit. The header information includes one or more of the following: information indicating one or more encoding parameters, information about a quantity of original data units included in an original data block corresponding to the encoded data unit, identification information (such as a block ID) of the original data block corresponding to the encoded data unit, identification information (such as a packet ID) of the encoded data unit in the corresponding original data block, encoding kernel indication information corresponding to the encoded data unit, coefficient column vector indication information (where a coefficient column vector is included in the encoding matrix) corresponding to the encoded data unit, identification information of an original data unit (for example, an index of the original data unit) corresponding to an encoding start location, or interleaving information. In a multi-hop system, the header information may further include identification information of a transmitting end.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding applications, but it should not be considered that the implementation goes beyond the scope of embodiments of this application.

It may be understood that, the processor in embodiments of this application may be an integrated circuit chip, and has a signal processing capability. In an implementation process, the steps in the foregoing method embodiments may be completed by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that the memory in embodiments of this application may be a transitory memory or a non-transitory memory, or may include a transitory memory and a non-transitory memory. The non-transitory memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memories in the system and method described in this specification include but are not limited to these memories and any memory of another appropriate type.

This application further provides a computer-readable medium. The computer-readable medium stores a computer program. When the computer program is executed by a computer, the function in any one of the foregoing method embodiments is implemented.

This application further provides a computer program product. When the computer program product is executed by a computer, the function in any one of the foregoing method embodiments is implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a location in this application are only used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural. The character "/" usually indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based on only A. B may alternatively be determined based on A and/or other information.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, appropriate deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-agree", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (random access memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely example implementations of this application, but are not intended to limit the protection scope of this application. Any variation or replacement readily figured out by a person skilled in the art within the technical scope disclosed in this application shall fall within the protection scope of this application.

What is claimed is:

1. An encoding method employing a network coding technique, comprising:

obtaining T to-be-encoded data units, wherein T is an integer greater than 1; and separately encoding each of L to-be-encoded data unit groups to obtain one or more encoded data units, wherein the L to-be-encoded data unit groups comprise the T to-be-encoded data units, each of the L to-be-encoded data unit groups comprises at most M to-be-encoded data units in the T to-be-encoded data units, L is an integer greater than T, and M is an integer greater than 0 and less than T; and outputting the encoded data units;

wherein the separately encoding each of L to-be-encoded data unit groups to obtain one or more encoded data units comprises encoding each to-be-encoded data unit group with an encoding kernel;

wherein the T to-be-encoded data units are divided into two or more to-be-encoded data unit groups in the L to-be-encoded data unit groups and the two or more to-be-encoded data unit groups comprising the T to-be-encoded data units are encoded by different encoding kernels respectively; and wherein the encoded data units are output along with encoding kernel indication information to indicate the different encoding kernels respectively.

2. The method according to claim 1, wherein the T to-be-encoded data units comprise N original data units, each of the L to-be-encoded data unit groups comprises at most M original data units in the N original data units, N is an integer greater than 1, and M is an integer greater than 0 and less than N.

3. The method according to claim 2, wherein L satisfies $N \leq L \leq N+M-1$; and wherein each of the L to-be-encoded data unit groups is encoded to obtain one encoded data unit.

4. The method according to claim 2, wherein the N original data units are comprised in B original data blocks, and B is an integer greater than 1.

5. The method according to claim 1, wherein the T to-be-encoded data units comprise B original data blocks, each of the L to-be-encoded data unit groups comprises at most M original data blocks in the B original data blocks, B is an integer greater than 1, and M is an integer greater than 0 and less than B.

6. The method according to claim 5, wherein L satisfies $B \leq L \leq B+M-1$; and wherein each of the L to-be-encoded data unit groups is encoded to obtain a plurality of encoded data units.

7. The method according to claim 1, wherein each of the L to-be-encoded data unit groups does not simultaneously comprise the first to-be-encoded data unit and the last to-be-encoded data unit in the T to-be-encoded data units.

8. An apparatus, comprising:

one or more processors; and a memory having instructions stored thereon that, when executed by the one or more processors, cause the apparatus to:

obtain T to-be-encoded data units, wherein T is an integer greater than 1; and separately encode each of L to-be-encoded data unit groups to obtain one or more encoded data units, wherein the L to-be-encoded data unit groups comprise the T to-be-encoded data units, each of the L to-be-encoded data unit groups comprises at most M to-be-encoded data units in the T to-be-encoded data units, L is an integer greater than T, and M is an integer greater than 0 and less than T; and output the encoded data units;

wherein the separately encoding each of L to-be-encoded data unit groups to obtain one or more encoded data units comprises encoding each to-be-encoded data unit group with an encoding kernel;

wherein the T to-be-encoded data units are divided into two or more to-be-encoded data unit groups in the L to-be-encoded data unit groups and the two or more to-be-encoded data unit groups comprising the T to-be-encoded data units are encoded by different encoding kernels respectively; and wherein the encoded data units are output along with encoding kernel indication information to indicate the different encoding kernels respectively.

9. The apparatus according to claim 8, wherein the T to-be-encoded data units comprise N original data units, each of the L to-be-encoded data unit groups comprises at most M original data units in the N original data units, N is an integer greater than 1, and M is an integer greater than 0 and less than N.

10. The apparatus according to claim 9, wherein L satisfies $N \leq L \leq N+M-1$; and the apparatus is caused to encode each of the L to-be-encoded data unit groups to obtain one encoded data unit.

11. The apparatus according to claim 9, wherein the N original data units are comprised in B original data blocks, and B is an integer greater than 1.

12. The apparatus according to claim 8, wherein the T to-be-encoded data units comprise B original data blocks, each of the L to-be-encoded data unit groups comprises at most M original data blocks in the B original data blocks, B is an integer greater than 1, and M is an integer greater than 0 and less than B.

13. The apparatus according to claim 12, wherein L satisfies $B \leq L \leq B+M-1$; and the apparatus is caused to encode each of the L to-be-encoded data unit groups to obtain a plurality of encoded data units.

14. The apparatus according to claim 8, wherein each of the L to-be-encoded data unit groups does not simultaneously comprise the first to-be-encoded data unit and the last to-be-encoded data unit in the T to-be-encoded data units.

15. A non-transitory computer readable medium storing instructions that are executable by a computer, and the instructions comprise instructions for:

obtaining T to-be-encoded data units, wherein T is an integer greater than 1; and separately encoding each of L to-be-encoded data unit groups to obtain one or more encoded data units, wherein the L to-be-encoded data unit groups comprise the T to-be-encoded data units, each of the L to-be-encoded data unit groups comprises at most M to-be-encoded data units in the T to-be-encoded data units, L is an integer greater than T, and M is an integer greater than 0 and less than T; and outputting the encoded data units;

wherein the separately encoding each of L to-be-encoded data unit groups to obtain one or more encoded data units comprises encoding each to-be-encoded data unit group with an encoding kernel;

wherein the T to-be-encoded data units are divided into two or more to-be-encoded data unit groups in the L to-be-encoded data unit groups and the two or more to-be-encoded data unit groups comprising the T to-be-encoded data units are encoded by different encoding kernels respectively; and wherein the encoded data units are output along with encoding kernel indication information to indicate the different encoding kernels respectively.

16. The non-transitory computer readable medium according to claim 15, wherein the T to-be-encoded data units comprise N original data units, each of the L to-be-encoded data unit groups comprises at most M original data units in the N original data units, N is an integer greater than 1, and M is an integer greater than 0 and less than N.

17. The non-transitory computer readable medium according to claim 16, wherein L satisfies $N \leq L \leq N+M-1$; and each of the L to-be-encoded data unit groups is encoded to obtain one encoded data unit.

18. The non-transitory computer readable medium according to claim 16, wherein the N original data units are comprised in B original data blocks, and B is an integer greater than 1.

19. The non-transitory computer readable medium according to claim 15, wherein the T to-be-encoded data units comprise B original data blocks, each of the L to-be-encoded data unit groups comprises at most M original data blocks in the B original data blocks, B is an integer greater than 1, and M is an integer greater than 0 and less than B.

20. The non-transitory computer readable medium according to claim 19, wherein L satisfies $B \leq L \leq B+M-1$; and each of the L to-be-encoded data unit groups is encoded to obtain a plurality of encoded data units.

\* \* \* \* \*